(12) United States Patent
Hirasawa et al.

(10) Patent No.: US 6,456,319 B1
(45) Date of Patent: Sep. 24, 2002

(54) IMAGE SENSING APPARATUS

(75) Inventors: Masahide Hirasawa, Sagamihara; Masakazu Kurobe, Kawasaki; Satoshi Nakayama, Yokohama, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/982,629

(22) Filed: Dec. 2, 1997

(30) Foreign Application Priority Data

| Dec. 3, 1996 | (JP) | 8-322714 |
| Dec. 3, 1996 | (JP) | 8-322716 |
| Dec. 16, 1996 | (JP) | 8-335777 |
| Dec. 17, 1996 | (JP) | 8-336840 |
| Dec. 26, 1996 | (JP) | 8-356507 |

(51) Int. Cl.$^7$ .......................................... H04N 5/253
(52) U.S. Cl. ........................ 348/97; 348/96; 348/102; 348/105
(58) Field of Search .................. 348/96, 97, 98, 348/99, 100, 101, 102, 103, 104, 105, 106–110, 207; 358/482, 483, 506

(56) References Cited

U.S. PATENT DOCUMENTS

| 3,769,457 A | * | 10/1973 | Valenta, Jr. et al. ........ 348/100 |
| 4,953,029 A | * | 8/1990 | Morimoto et al. ........... 348/221 |
| 5,293,242 A | * | 3/1994 | Mamiya ....................... 348/96 |
| 5,382,974 A | * | 1/1995 | Soeda et al. ................. 348/221 |
| 5,748,287 A | * | 5/1998 | Takahashi et al. ........... 358/487 |
| 5,757,430 A | * | 5/1998 | Maeda et al. .................. 348/96 |
| 5,767,989 A | * | 6/1998 | Sakaguchi .................... 348/96 |
| 5,861,911 A | * | 1/1999 | Oosaka et al. ................. 348/96 |
| 5,933,187 A | * | 8/1999 | Hirasawa et al. .............. 348/98 |

* cited by examiner

*Primary Examiner*—Wendy R. Garber
*Assistant Examiner*—Mitchell White
(74) *Attorney, Agent, or Firm*—Morgan & Finnegan LLP

(57) ABSTRACT

There is disclosed a video camera which has a normal moving image sensing mode, and a still image sensing mode for sensing an image on a negative film set in a film adapter attached as a still image. An optical image of a subject is photoelectrically converted into an image signal, and whether or not the subject is a negative film is detected on the basis of a predetermined signal component in the image signal. If it is detected that the subject is the negative film, the still image sensing mode starts while setting signal processing in a negative/positive conversion mode and setting the focal length of the lens system at the wide-angle position.

49 Claims, 45 Drawing Sheets

EXAMPLE OF ARRANGEMENT OF NOISE REDUCTION CIRCUIT

IN NORMAL IMAGE SENSING MODE

IN FILM IMAGE SENSING MODE

IMAGE SENSING APPARATUS

BACKGROUND OF THE INVENTION

The present invention relates to an image sensing apparatus represented by a video camera and, more particularly, to an image sensing apparatus having a function of reading an image from a negative film, a slide film, or the like.

Along with rapid improvements of the techniques of personal computers and their peripheral devices, for example, it has now become easy for an operator to capture and edit a taken picture on a memory in a personal computer, and to create a unique postcard or poster. Under this circumstance, the market demand in this technical field is increasing year by year.

When an image on a picture is input into a personal computer, image information on the picture must be converted into an electrical signal using a video camera or an electronic still video camera. Since pictures on photographic paper sheets have various sizes, it is troublesome for an operator to set the field angle and to determine how to illuminate each picture upon taking the picture using such camera. Also, a large-scale, dedicated image sensing apparatus such as a fixing base of a video camera, or the like is required.

To solve such problems, an adapter for mounting a negative (or positive) film is attached to an image sensing lens of the video camera, and an image projected via the adapter is sensed by the video camera. The sensed image is converted into a video signal, which is recorded on a magnetic tape or a memory in a personal computer, or is output to a monitor. This adapter is called a "film adapter" (this specification uses this name) or "film carrier holder", and a camera system with this adapter is called a photo video camera system or the like.

The film adapter is merely attached to the lens of a camera, and has only a function of allowing the user to mount a film. For this reason, when the film adapter is used, various setup processes are required. For example, image signal processing inside the camera must be switched in correspondence with a negative or positive image. If this setup process is ignored, a negative image is directly displayed on a monitor. Also, the frame of a film must be positioned accurately. If this setup process is neglected, an image on a film frame, which is moving in the adapter, or an image on a frame which is not set at a predetermined position, is displayed.

Hence, when the film adapter is attached to the conventional video camera and images on a negative film are taken as still images, various switch operations for attaining the above-mentioned setup processes (to be referred to as a "film image sensing mode" hereinafter) are required, resulting in meticulous operations.

However, when a switch for detecting attachment of the adapter is arranged on the video camera main body, the number of parts increases and results in a large camera size and high cost, the video camera main body must be drastically modified, and so on. Such problems are the first problems in the conventional camera attached with the film adapter.

On the other hand, some conventional cameras that can set the film image sensing mode often have two modes, i.e., "sequential shot mode" and "single shot mode". With these cameras, the photographer selects one of such image sensing modes in correspondence with his or her purpose at that time. The sequential shot mode has as its principal object to avoid a loss of an image sensing chance when a moving subject is captured as still images. When a still image is taken using the film adapter, the film as a subject completely stands still integrally with the camera, and identical still images are repetitively taken unless the sequential shot mode is canceled. That is, the switching function of the sequential and single shot modes, which function is convenient for the user, requires extra user operations. Such problem is the second problem of the prior art.

Problems posed when the film adapter is attached to the video camera or the like are not limited to those concerning the operability mentioned above.

More specifically, when the film adapter is not attached to a conventional camera that can mount a film adapter (when the camera is not in the film image sensing mode), the camera must be able to optimally take images of a normal subject as a normal video camera (i.e., the one without any film image sensing function), as a matter of course. For this reason, the signal processing circuit of the camera is set to assure a broad dynamic range, which is not so required in the film image sensing mode. That is, signals input to the video camera normally have a large level difference (dynamic range) depending on the subject to be taken, i.e., a film set in the film adapter or a normal subject. In order to execute normal video image sensing prior to the film image sensing mode and to optimally take images of a subject in the normal video image sensing, the dynamic range of the signal processing circuit of the video camera is set to cover a very broad range from a subject in a dark room to a very bright subject such as a seashore under direct sunlight. On the other hand, in the film image sensing mode using the film adapter, since illumination light coming from a backlight serves as a light source, changes in lightness (luminance level) of a subject (film) are very smaller than those in a normal image sensing mode (ranging from a bright seashore to a dark room). If the signal processing circuit is fixedly set in both the film image sensing mode and normal subject image sensing mode that have a large dynamic range difference, the performance of the signal processing circuit cannot be fully used especially in the film image sensing mode.

When images on a film are taken using a camera which sets an A/D converter in this manner, such A/D converter is not suitable for the film image sensing mode with a narrow input dynamic range, and the quality of images to be recorded or displayed on the monitor deteriorates. This is a problem (third problem) arising from circuit setups.

Another problem (fourth problem) arising from circuit setups will be explained below. This problem is posed since the conventional camera that can mount the film adapter has moving image-priority circuit setups.

The conventional camera that can mount the film adapter will be explained below with reference to FIGS. 1 and 2.

Referring to FIG. 1, reference numeral 2001 denotes a film adapter; 2002, a film; 2003, an imaging lens; 2004, an image sensing element for photoelectrically converting incoming light; 2005, a signal processing circuit for generating luminance and chrominance signals based on signals generated by the image sensing element 2004; 2006, a reversing circuit for converting a negative image into a positive image; 2007, a switching circuit for selecting whether or not that negative/positive reversing is to be done; 2008, a noise reduction circuit (N.R.) for reducing noise components in an image signal; and 2009, an encoder circuit for converting the luminance and chrominance signals into a video signal.

The film adapter 2001 has a light source for illuminating the film 2002. Light transmitted through the film 2002 is imaged on the image sensing element 2004 via the lens 2003. An optical signal incident on the image sensing element 2004 is photoelectrically converted, and the signal processing circuit 2005 generates luminance and chrominance signals based on the converted signals. In this case, when the film 2002 to be sensed is a positive film, the outputs from the signal processing circuit 2005 are directly input to the noise reduction circuit 2008 by the switching circuit 2007. On the other hand, when the film 2002 is a negative film, the outputs from the signal processing circuit 2005 are converted into those for a positive image by the reversing circuit 2006, and the converted signals are input to the noise reduction circuit 2008.

FIG. 2 is a block diagram showing the arrangement of the frame correlation noise reduction circuit 2008. In FIG. 2, reference numeral 2031 denotes a frame memory for storing an image signal for at least one frame; 2032 and 2033, multipliers for multiplying a signal by coefficients; and 2034 and 2035, adders for adding signals.

In the circuit shown in FIG. 2, let $(S_{in})_n$ be the signal input of the n-th frame, $(S_{out})_n$ be the signal output of the n-th frame, and $(S_{out})_{n-1}$ be the signal output of the (n−1)-th frame from the frame memory 2031. As shown in equation (1) below, the output $(S_{out})_n$ is obtained by adding the product of the input $(S_{in})_n$ and a coefficient k and the product of the output $(S_{out})_{-1}$ and a coefficient (1−k):

$$(S_{out})_n = k \cdot (S_{in})_n + (1-k) \cdot (S_{out})_{n-1} \quad (0 < k \leq 1) \tag{1}$$

Noise components produced between the (n−1)-th and n-th frames are reduced by multiplication by the coefficient (1−k).

The image signal in which noise components are reduced by the noise reduction circuit 2008 is converted into a standard television (TV) signal by the encoder circuit 2009.

However, in the conventional image sensing apparatus shown in FIG. 1, a small coefficient k must be set in the noise reduction circuit to improve the noise reduction effect. However, when a subject that moves fast is sensed, the resolution lowers as the coefficient k decreases. Since the video camera is normally used for sensing a moving subject, the coefficient k must be set at a numerical value close to 1 in consideration of the resolution. As a result, since the noise reduction effect is impaired, noise components become conspicuous when a still subject such as a film or the like is sensed via the film adapter. This is the fourth problem.

SUMMARY OF THE INVENTION

As described above, the conventional image sensing apparatus that can mount the film adapter has room for improvement in automatic detection of attachment of the adapter.

Furthermore, if attachment of the adapter can be detected, there is room for improvement in automatically setting the image sensing apparatus in an optimal image sensing condition when the film adapter is attached.

It is an object of the present invention to provide an image sensing apparatus which automatically selects a film image sensing mode when a film adapter is attached, can remove and solve the above-mentioned drawbacks and problems, has good operability, and can assure reliable operations.

In order to achieve the above object, an image sensing apparatus of the present invention, which has a moving image sensing mode and a still image sensing mode, and can sense a close subject, comprises image sensing means for outputting a first image signal by photoelectrically converting a subject image, detection means for detecting based on a predetermined signal component in the first image signal if a subject is close to the apparatus (for example, processing for determining if a color difference signal falls within a range 201 to be described later), and control means for switching the image sensing mode to the still image sensing mode when the detection means detects that the subject is close to the apparatus.

Therefore, when a negative film is subjected to image sensing using a video camera, a negative/positive reversing function of the video camera can be automatically enabled, and the video camera can be automatically set in the still image sensing mode, thus eliminating cumbersome operations and avoiding unnecessary scenes from being sensed in the moving image sensing mode due to operation errors.

According to one preferred aspect of the present invention, the detection means detects based on chrominance signal components in the first image signal if the subject is a negative film. Whether or not the subject is a negative film is detected based on chrominance signal components in a sensed image signal, and when a negative film is detected, luminance and chrominance signal components are converted into those for a positive image, and the converted signal components are output. In case of a video camera, a characteristic color difference vector of a negative film is detected using a white balance circuit as a technique unique to video cameras so as to automatically set the apparatus in the film image sensing mode and to automatically enable the negative/positive reversing function. Hence, the operator is relieved from any troublesome operations for manually setting the apparatus in the positive/negative reversing mode and the still image sensing mode, and any probability of operation errors.

According to one preferred aspect of the present invention, the apparatus comprises first luminance component generation means (corresponding to a YC signal generation circuit 502 in embodiments) for generating a luminance component based on the first image signal, first chrominance component generation means (corresponding to color difference generation circuits 505 and 1101 in the embodiments) for generating chrominance components based on the first image signal, second luminance component generation means (corresponding to a negative/positive reversing circuit 513 in the embodiments) for generating a luminance component by reversing light and dark portions in correspondence with a luminance level of the first image signal, and second chrominance component generation means (corresponding to the negative/positive reversing circuit 513 in the embodiments) for generating chrominance components in accordance with the chrominance components of the first image signal using a predetermined conversion scheme, and when the detection means detects that the subject is not a negative film, the control means controls to generate an image signal using output signals from the first luminance component generation means and first chrominance component generation means, and when the detection means detects that the subject is a negative film, the control means controls to generate an image signal using output signals from the second luminance component generation means and second chrominance component generation means (corresponding to processing for selecting one of a film image sensing mode and moving image sensing mode depending on whether or not a color difference signal falls within the range 201 in FIG. 12 in the processing of the flow chart shown in FIG. 13).

According to one preferred aspect of the present invention, a film adapter for holding a subject such as a film can be detachably attached to a predetermined position of a front portion of an image sensing optical system, and the film image sensing mode is enabled by attaching the film adapter. Therefore, since the film image sensing mode is enabled by attaching the film adapter, film image sensing can be easily done by a normal video camera without specially modifying the camera itself.

It is another object of the present invention to provide an image sensing apparatus comprising image sensing means for outputting a first image signal by photoelectrically converting an optical image formed via an image sensing optical system, signal processing means (corresponding to a camera signal processing circuit 409 in an embodiment) for generating an image signal by performing predetermined processing of the first image signal, and film image sensing means for sensing a film image by mounting a film image sensing adapter, the signal processing means comprising first luminance component generation means (corresponding to a YC signal generation circuit 502 in the embodiments) for generating a luminance component of the image signal in accordance with a luminance level of the first image signal, first chrominance component generation means (corresponding to the color difference generation circuits 505 and 1101 in the embodiments) for generating chrominance components of the image signal in accordance with chrominance components of the first image signal, second luminance component generation means (corresponding to a negative/positive reversing circuit 513 in the embodiments) for generating a luminance component of the image signal by reversing light and dark portions in accordance with a luminance level of the first image signal, second chrominance component generation means (corresponding to the negative/positive reversing circuit 513 in the embodiments) for generating chrominance components of the image signal in accordance with chrominance components of the first image signal using a predetermined conversion scheme, and control means (corresponding to processing in the flow chart of FIG. 13 by a camera control circuit 105) which can select one of a moving image sensing mode for sensing a moving image, and a film image sensing mode for sensing a photographic film image using the film image sensing means, and selects the film image sensing mode when an image signal is generated using output signals from the second luminance component generation means and second chrominance component generation means. Hence, when a video camera senses a negative film as a still image using a film adapter or the like, the video camera can be automatically set in the still image sensing mode upon enabling the negative/positive reversing function of the video camera. In this manner, the operator is relieved of any troublesome operations for manually setting the apparatus in the positive/negative reversing mode and the still image sensing mode, and can avoid unnecessary scenes from being sensed in the moving image mode set as a result of operation errors.

According to one preferred aspect of the present invention, the apparatus comprises color identification means (corresponding to processing executed by the camera control circuit 105 in the embodiments) for identifying a color of the subject on the basis of information associated with a color of the first image signal, and the control means selects on the basis of an identification result of the color identification means whether the image signal is generated by the first luminance component generation means and first chrominance component generation means, or by the second luminance component generation means and second chrominance component generation means, and selects the film image sensing mode upon selecting image signal generation using the second luminance component generation means and second chrominance component generation means. Hence, the characteristic color difference vector of a negative film is detected using a white balance circuit as a technique unique to video cameras, so that the apparatus can be automatically set in the film image sensing mode, and can automatically enable the negative/positive reversing function. In this manner, the operator can be relieved of any burdensome operations for setting the apparatus in the still image sensing mode after he or she sets the negative/positive reversing mode, and any probability of operation errors.

According to one preferred aspect of the present invention, the second luminance component generation means and second chrominance component generation means output a negative-to-positive reversed image signal.

It is still another object of the present invention to provide an image sensing apparatus comprising an image sensing optical system (corresponding to an inner focus lens shown in FIG. 6) which changes a position of a lens in correspondence with a subject distance, position detection means (corresponding to processing for counting driving pulses to be supplied to a magnification lens driver 413 and focus-compensation lens driver 415 in a lens/camera control circuit 418 shown in FIG. 5 in an embodiment) for detecting the position of the lens, image sensing means (corresponding to an image sensing element 407 in the embodiments) for outputting a first image signal by photoelectrically converting an optical image of a subject imaged via the image sensing optical system, and control means (mainly corresponding to processing in the flow chart of FIG. 14 by a camera control circuit 105 in the embodiments) which can select one of a plurality of image sensing modes including a moving image sensing mode for sensing a moving image and a film image sensing mode for sensing a close subject such as a film, and sets an image sensing mode in the film image sensing mode when the lens is located at a predetermined position. Hence, since the film image sensing mode is set in correspondence with the lens position, the film image sensing state using the film adapter can be accurately detected by detecting a specific lens position obtained from a closest distance in-focus condition of an image sensing lens. In this manner, the above-mentioned drawbacks can be removed and demerits of the prior art can be compensated for while preventing operation errors of the apparatus.

According to one preferred aspect of the present invention, the control means sets the film image sensing mode when the lens is located within a predetermined range on the closest distance side.

According to one preferred aspect of the present invention, the image sensing optical system comprises a magnification lens, and the control means (mainly corresponding to the camera control circuit 105 in the embodiments) sets the film image sensing mode when the magnification lens is located at a predetermined position on the wide-angle side, and the lens is located within a predetermined range on the closest distance side.

According to one preferred aspect of the present invention, a film adapter for holding a subject such as a film can be detachably attached to a predetermined position of a front portion of the image sensing optical system, and the film image sensing mode is enabled by attaching the film adapter. Therefore, since the film image sensing mode is enabled by attaching the film adapter, film image sensing can be easily done by a normal video camera without specially modifying the camera itself.

It is still another object of the present invention to provide an image sensing apparatus comprising an image sensing optical system (corresponding to an inner focus lens shown in FIG. 6) which changes a position of a lens in correspondence with a subject distance, position detection means (corresponding to processing for counting driving pulses to be supplied to a magnification lens driver 413 and focus-compensation lens driver 415 in a lens/camera control circuit 418 shown in FIG. 5 in an embodiment) for detecting the position of the lens, image sensing means (corresponding to an image sensing element 407 in the embodiments) for outputting a first image signal by photoelectrically converting an optical image of a subject imaged via the image sensing optical system, and control means (mainly corresponding to processing in the flow chart of FIG. 14 by a camera control circuit 105 in the embodiments) which can select one of a plurality of image sensing modes including a moving image sensing mode for sensing a moving image and a still image sensing mode for sensing a still image, and sets an image sensing mode in the still image sensing mode when the lens is located at a predetermined position (corresponding to a region 904 in FIG. 7 in the embodiments). More specifically, since the still image sensing mode is set depending on the lens position, the still image sensing mode that assumes film image sensing can be set detecting a specific lens position obtained from a closest distance in-focus condition of an image sensing lens. Thus, the above-mentioned drawbacks can be removed and demerits of the prior art can be compensated for while accurately detecting the film image sensing state and preventing operation errors of the apparatus.

According to one preferred aspect of the present invention, the control means sets the still image sensing mode when the lens is located with a predetermined range on the closest distance side (corresponding to the region 904 in FIG. 7 in the embodiments).

According to one preferred aspect of the present invention, the image sensing optical system comprises a magnification lens, and the control means sets the still image sensing mode when the magnification lens is located at a predetermined position on the wide-angle side (corresponding to a region 904 in FIG. 7 in the embodiments), and the lens is located within the predetermined range on the closest distance side.

According to one preferred aspect of the present invention, a film adapter (corresponding to a film adapter 3 in the embodiments) for holding a subject such as a film can be detachably attached to a predetermined position of a front portion of the image sensing optical system, and film image sensing is allowed in the still image sensing mode by attaching the film adapter. Therefore, since film image sensing is allowed by attaching the film adapter, film image sensing can be easily done by a normal video camera without specially modifying the camera itself.

It is still another object of the present invention to provide an image sensing apparatus comprising an image sensing optical system (corresponding to an inner focus lens shown in FIG. 6) which changes a position of a lens in correspondence with a subject distance, position detection means (corresponding to processing for counting driving pulses to be supplied to a magnification lens driver 413 and focus-compensation lens driver 415 in a lens/camera control circuit 418 shown in FIG. 5 in an embodiment) for detecting the position of the lens, image sensing means for outputting a first image signal by photoelectrically converting an optical image of a subject imaged via the image sensing optical system, signal processing means (corresponding to a camera signal processing circuit 409 in the embodiments) for generating an image signal on the basis of the first image signal, the signal processing means comprising first luminance component generation means (corresponding to a YC signal generation circuit 502 in the embodiments) for generating a luminance component of the image signal in accordance with a luminance component of the first image signal, first chrominance component generation means (corresponding to the color difference generation circuits 505 and 1101 in the embodiments) for generating chrominance components of the image signal in accordance with chrominance components of the first image signal, second luminance component generation means (corresponding to a negative/positive reversing circuit 513 in the embodiments) for generating a luminance component of the image signal by reversing light and dark portions in accordance with a luminance level of the first image signal, and second chrominance component generation means (corresponding to the negative/positive reversing circuit 513 in the embodiments) for generating chrominance components of the image signal in accordance with chrominance components of the first image signal using a predetermined conversion scheme, and control means (corresponding to processing in the flow chart of FIG. 15 by a camera control circuit 105 in the embodiments) which can select one of a moving image sensing mode for sensing an image of a normal subject and a film image sensing mode which allows to sense a film image, and switches an image sensing mode to the film image sensing mode when the lens is located at a predetermined position, and an image signal is generated using output signals from the second luminance component generation means and second chrominance component generation means. More specifically, since the image sensing mode is switched to the film image sensing mode in correspondence with the lens position, the film image sensing mode that assumes film image sensing can be set by detecting a specific lens position obtained from the closest distance in-focus condition of an image sensing lens. Thus, the above-mentioned drawbacks can be removed and demerits of the prior art can be compensated for while accurately detecting the film image sensing state and preventing operation errors of the apparatus. Since the specific position obtained from the closest distance in-focus condition of an image sensing lens is detected as well as the characteristic color difference vector of a negative film, the above-mentioned drawbacks can be removed and demerits of the prior art can be compensated for while accurately detecting the negative film image sensing state and preventing operation errors of the apparatus.

According to one preferred aspect of the present invention, the image signal generated using the output signals from the second luminance component generation means and second chrominance component generation means is a negative-to-positive reversed image signal, and the film image sensing mode is set to convert an image on a negative film into a positive image, and to output the positive image.

According to one preferred aspect of the present invention, a film adapter (corresponding to a film adapter 3 in the embodiments) for holding a subject such as a film can be detachably attached to a predetermined position of a front portion of the image sensing optical system, and the film image sensing mode is allowed by attaching the film adapter. Therefore, since film image sensing is allowed by attaching the film adapter, film image sensing can be easily done by a normal video camera without specially modifying the camera itself.

According to one preferred aspect of the present invention, the image sensing optical system comprises a magnification lens, and the control means sets the film image sensing mode when the magnification lens is located at a predetermined position on the wide-angle side, and the lens is located within a predetermined range on the closest distance side. Hence, when the magnification lens is located at the predetermined position on the wide-angle side and the lens is located within the predetermined range on the closest distance side, the film image sensing mode is set, thus realizing a system which utilizes the characteristics of the inner focus lens and has good operability.

It is still another object of the present invention to provide an image sensing apparatus which can select one of a moving image sensing mode and still image sensing mode, and can sense an image of a close subject such as a film, comprising image sensing means (corresponding to an image sensing element 407 in an embodiment) for outputting a first image signal by photoelectrically converting a subject image formed via an image sensing optical system, and control means (corresponding to processing in the flow chart of FIG. 16 by a camera control circuit 105 in the embodiments) for switching an image sensing mode to the still image sensing mode in accordance with user operation for sensing an image of the close subject such as the film.

Accordingly, since the image sensing mode is switched to the still image sensing mode in accordance with user operation for film image sensing, when a negative film image is sensed as a still image using a video camera, the video camera can be automatically set in the still image sensing mode by enabling, e.g., a negative/positive reversing function of the video camera. Hence, cumbersome operations can be alleviated, and unnecessary scenes can be prevented from being sensed in the moving image mode set due to operation errors.

It is still another object of the present invention to provide an image sensing apparatus comprising image sensing means (corresponding to an image sensing element 407 in an embodiment) for outputting a sensed image signal by photoelectrically converting a subject image formed via an image sensing optical system, and signal processing means (corresponding to a camera signal processing circuit in the embodiments) for generating a video signal by performing predetermined processing of the sensed image signal, the signal processing means comprising first luminance component generation means (corresponding to a YC signal generation circuit 502 or 1103 in an embodiment) for generating a luminance component of the video signal in accordance with a luminance level of the sensed image signal, first chrominance component generation means (corresponding to a color difference signal generation circuit 505 or 1101 in the embodiments) for generating chrominance components of the video signal in accordance with chrominance components of the sensed image signal, second luminance component generation means (corresponding to a negative/positive reversing circuit 512 or 1601 in the embodiments) for generating a luminance component of the video signal by reversing light and dark portions in accordance with the luminance level of the sensed image signal, second chrominance component generation means (corresponding to the negative/positive reversing circuit 512 or 1601 in the embodiments) for generating chrominance components of the video signal in accordance with the chrominance components of the sensed image signal using a predetermined conversion scheme, color identification means for identifying a color of the subject on the basis of information associated with a color in the sensed image signal, and selection means (corresponding to a camera control circuit 105, 902, 1102, 120, or 1401 in the embodiments) for selecting the first luminance component generation means and chrominance component generation means, or the second luminance component generation means and chrominance component generation means, that are to be used upon generating and outputting a video signal, in accordance with an identification result of the color identification means.

Hence, signal processing optimal to the state of the subject to be sensed can be automatically done in accordance with signal components in the sensed image signal.

It is still another object of the present invention to provide an image sensing apparatus comprising image sensing means for outputting a sensed image signal by photoelectrically converting a subject image formed via an image sensing optical system, and signal processing means for generating a video signal by performing predetermined processing of the sensed image signal, the signal processing means comprising first luminance component generation means for generating a luminance component of the video signal in accordance with a luminance level of the sensed image signal, first chrominance component generation means for generating chrominance components of the video signal in accordance with chrominance components of the sensed image signal, second luminance component generation means for generating a luminance component of the video signal by reversing light and dark portions in accordance with the luminance level of the sensed image signal, second chrominance component generation means for generating chrominance-components of the video signal in accordance with the chrominance components of the sensed image signal using a predetermined conversion scheme, color identification means for identifying a color of the subject on the basis of information associated with a color in the sensed image signal, first selection means for selecting the first luminance component generation means and chrominance component generation means, or the second luminance component generation means and chrominance component generation means, that are to be used upon generating and outputting a video signal, in accordance with an identification result of the color identification means, and second selection means (corresponding to a camera control circuit 902 in an embodiment) for inhibiting operation of the first selection means. Accordingly, signal processing optimal to the state of the subject to be sensed can be automatically done in accordance with signal components in the sensed image signal, and operation errors of that automatic selection function can be prevented, thus preferentially reflecting the photographer's will.

According to one preferred aspect of the present invention, the image sensing apparatus comprises third selection means (corresponding to the camera control circuit 902 in the embodiments) for, when the second selection means inhibits operation of the first selection means, selecting the first luminance component generation means and chrominance component generation means, or the second luminance component generation means and chrominance component generation means, that are to be used upon generating and outputting a video signal, independently of the first selection means.

According to one preferred aspect of the present invention, the image sensing apparatus comprises white balance adjustment means (corresponding to gain control circuits 503 and 504, and a camera control circuit 105, 902, 1102, 120, or 1401 in the embodiments) for generating color difference signals based on outputs from the first luminance component generation means and the first chrominance component generation means, and adjusting white balance by controlling gains of the color difference signals. Accordingly, negative film image sensing can be automatically detected, and a negative/positive reversing function is automatically executed by detecting, e.g., the characteristic color difference vector of a negative film using a white balance circuit as a technique unique to the video camera. When a negative film image is to be sensed using a film adapter or the like, the operator is free from any cumbersome operations for enabling the reversing function by operating a switch without arranging any film adapter mounting detection switch to the video camera. Also, since the means for disabling the automatic execution function of the negative/positive reversing function based on negative film detection is arranged, operation errors of the negative/positive reversing function caused by detection errors of a negative film, which tend to take place when a subject having a hue similar to the negative film is sensed, can be prevented.

According to one preferred aspect of the present invention, there is disclosed the image sensing apparatus wherein the second luminance component generation means and the second chrominance component generation means output a negative-to-positive reversed video signal.

According to one preferred aspect of the present invention, the image sensing apparatus comprises an image sensing optical system, and a film image sensing adapter (corresponding to a film adapter 803 in the embodiments) for holding a film at a predetermined position on a front surface of the image sensing optical system. Accordingly, a film image sensing apparatus which can execute film image sensing by attaching the film image sensing adapter to the image sensing optical system, can use the existing camera itself, does not require any bulky arrangement, allows a size reduction, simple operation, and cost reduction, and has good operability, can be realized.

According to one preferred aspect of the present invention, the color identification means determines a negative film on the basis of color difference signals generated based on the sensed image signal. Since a negative film is determined based on the color difference signals, R, G, and B signals, and the like generated based on the sensed image signal, selection by the selection means can be done in correspondence with the circuit arrangement of the video camera, and the degree of freedom in design can be increased.

According to one preferred aspect of the present invention, the color identification means determines a negative film on the basis of R, G, and B signals generated based on the sensed image signal.

According to one preferred aspect of the present invention, the color identification means determines a negative film on the basis of outputs from the first luminance component generation means and first chrominance component generation means.

According to one preferred aspect of the present invention, the color identification means determines a negative film on the basis of outputs from the second luminance component generation means and second chrominance component generation means. Hence, since a negative film can be determined on the basis of signals either before or after negative/positive reversing, means with higher reliability can be selected in accordance with situations and the circuit arrangement of the video camera, thus increasing the degree of freedom in design, and improving the reliability of negative film identification.

It is still another object of the present invention to provide an image sensing apparatus, which can select one of a moving image sensing mode and still image sensing mode, comprising image sensing means (corresponding to an image sensing element 407 in an embodiment) for outputting a sensed image signal by photoelectrically converting a subject image formed via an image sensing optical system (corresponding to lenses 402, 403, 405, and 406, and an iris 404 in the embodiments), first luminance component generation means (corresponding to a YC signal generation circuit 502 in the embodiments) for generating a luminance signal component on the basis of the sensed image signal, first chrominance component generation means (corresponding to the color difference generation circuits 505, 1101 in the embodiments) for generating chrominance signal components on the basis of the sensed image signal, second luminance component generation means (corresponding to a negative/positive reversing circuit 513 in the embodiments) for generating a luminance component by reversing light and dark portions in correspondence with a luminance level of the sensed image signal, second chrominance component generation means (corresponding to the negative/positive reversing circuit 513 in the embodiments) for generating chrominance components in accordance with chrominance components of the sensed image signal using a predetermined conversion scheme, and control means which can select one of the moving image sensing mode and the still image sensing mode, and selects the still image sensing mode when a video signal is generated using output signals from the second luminance component generation means and second chrominance component generation means (corresponding to processing for selecting one of a film image sensing mode and moving image sensing mode depending on whether or not a color difference signal falls within a range in the processing of the flow chart shown in FIG. 3 executed by a camera control circuit 105 in the embodiments). Hence, the image sensing mode can be automatically set in correspondence with the state of the signal processing circuit, thus effectively preventing operation errors and improving operability.

For example, when a negative film image is sensed using a video camera, the video camera can be automatically set in the still image sensing mode by enabling its negative/positive reversing function. Hence, complicated operations can be precluded, and unnecessary scenes can be prevented from being sensed in the moving image mode set by operation errors.

According to one preferred aspect of the present invention, the image sensing apparatus comprises color identification means (corresponding to processing in steps A302 and A303 in the flow chart corresponding to the processing executed by the camera control circuit 105 in the embodiments) for identifying a color of the subject in accordance with the chrominance component in the sensed image signal, and the control means selects the first luminance component generation means and first chrominance component generation means or the second luminance component generation means and second chrominance component generation means, that are to be used upon generating the video signal, in accordance with an output from the color identification means, and selects the still image sensing mode when the video signal is generated using the output signals from the second luminance component generation means and second chrominance component generation means. As described above, since the luminance and chrominance signal processing circuits are automatically switched on the basis of chrominance signal components in the sensed image signal, for example, when the subject is a negative film, luminance and chrominance signal components are converted to those for a positive image, and the image sensing mode can also be switched to the still image sensing mode suitable for film image sensing.

According to one preferred aspect of the present invention, the image sensing apparatus comprises an image sensing optical system which changes a position of a lens in correspondence with a subject distance, and position detection means (corresponding to processing for counting driving pulses to be supplied to a magnification lens driver 413 and focus-compensation lens driver 415 in a lens/camera control circuit 418 in the embodiments) for detecting the position of the lens, and the control means forcibly selects the still image sensing mode when the position detection means detects that the lens is located at a predetermined position, and the video signal is to be generated using output signals from the second luminance component generation means and second chrominance component generation means. In this manner, since the lens position information is used for setting the image sensing mode, the film image sensing mode (still image sensing mode) can be automatically set with high precision.

It is still another object of the present invention to provide an image sensing apparatus comprising image sensing means (corresponding to an image sensing element 407 in an embodiment) for outputting a sensed image signal by photoelectrically converting an optical image formed via an image sensing optical system, first luminance component generation means (corresponding to a YC signal generation circuit 502 in the embodiments) for generating a luminance component of a video signal in accordance with a luminance level of the sensed image signal, first chrominance component generation means (corresponding to the color difference generation circuits 505, 1101 in the embodiments) for generating chrominance components of the video signal in accordance with chrominance components of the sensed image signal, second luminance component generation means (corresponding to a negative/positive reversing circuit 513 in the embodiments) for generating a luminance component of the video signal by reversing light and dark portions in accordance with a luminance level of the sensed image signal, second chrominance component generation means (corresponding to the negative/positive reversing circuit 513 in the embodiments) for generating chrominance components of the video signal in accordance with chrominance components of the sensed image signal using a predetermined conversion scheme, and control means which can select one of a still image single shot mode for sensing a single still image, and a still image sequential shot mode for sequentially sensing the still images, and inhibits the still image sequential shot mode when the video signal is generated using output signals from the second luminance component generation means and second chrominance component generation means (corresponding to processing in the flow chart shown in FIG. 36 in the embodiments). In the image sensing apparatus which has a single shot mode and sequential shot mode in association with still image sensing, and has a plurality of sets of luminance signal generation means and chrominance signal generation means, switching and inhibition of the still image single shot mode and still image sequential shot mode are automatically controlled in correspondence with the luminance signal generation means and chrominance signal generation means to be used at that time. Accordingly, the image sensing mode can be automatically set in correspondence with the state of the signal processing circuit, thus effectively preventing operation errors and improving operability.

For example, when a negative film image is sensed using a video camera, the sequential shot mode is inhibited from being set as the still image sensing mode and the single shot mode can be automatically set by enabling the negative/positive reversing function of that video camera. In this way, wasteful operations such as sequential shots of an identical film image can be prevented, and the video camera can be automatically set. Hence, complicated operations can be done away with and unnecessary scenes can be prevented from being sensed in the moving image mode set by operation errors.

According to one preferred aspect of the present invention, the image sensing apparatus comprises color identification means (corresponding to processing in steps 1702 and 1703 in the flow chart shown in FIG. 36 corresponding to the processing executed by a camera control circuit 105 in the embodiments) for identifying a color of the subject in accordance with the chrominance component in the sensed image signal, and the control means selects the first luminance component generation means and first chrominance component generation means or the second luminance component generation means and second chrominance component generation means, that are to be used upon generating the video signal, in accordance with an output from the color identification means, and selects the still image single shot mode and inhibits selection of the still image sequential shot mode when the video signal is generated using the output signals from the second luminance component generation means and second chrominance component generation means. As described above, since the luminance and chrominance signal processing circuits are automatically switched on the basis of chrominance signal components in the sensed image signal, for example, when the subject is a negative film, luminance and chrominance signal components are converted to those for a positive image, and the image sensing mode can also be switched to the still image single shot mode suitable for film image sensing.

For example, the characteristic color difference vector of a negative film is detected using a white balance circuit as a technique unique to video cameras so as to automatically set the apparatus in the film image sensing mode and to automatically enable the negative/positive reversing function. Hence, the operator is relieved from any troublesome operations for manually setting the apparatus in the positive/negative reversing mode and the still image sensing mode, and any probability of operation errors.

According to one preferred aspect of the present invention, the image sensing apparatus comprises an image sensing optical system (corresponding to lenses 402, 403, 405, and 406, and an iris 404 in the embodiments) which changes a position of a lens in correspondence with a subject distance, and position detection means (corresponding to processing for counting driving pulses to be supplied to a magnification lens driver 413 and focus-compensation lens driver 415 in a lens/camera control circuit 418 in the embodiments) for detecting the position of the lens, and the control means forcibly selects the still image single shot mode and inhibits selection of the still image sequential mode when the position detection means detects that the lens is located at a predetermined position, and the video signal is to be generated using output signals from the second luminance component generation means and second chrominance component generation means. In this fashion, since the lens position information is also used for setting the image sensing mode, the film image sensing mode (still image single shot mode) can be automatically set with higher precision.

It is still another object of the present invention to provide an image sensing apparatus comprising image sensing means (corresponding to an image sensing element 407 in an embodiment) for outputting a sensed image signal by photoelectrically converting an optical image formed via an image sensing optical system (corresponding to processing for counting driving pulses to be supplied to a magnification lens driver 413 and focus-compensation lens driver 415 in a lens/camera control circuit 418 in the embodiments), negative/positive reversing means (corresponding to a negative/positive reversing circuit 513 in the embodiments) for reversing a negative image to a positive image by performing predetermined processing of luminance and chrominance signals, and control means which can select one of a still image single shot mode for sensing a single still image, and a still image sequential shot mode for sequentially sensing the still images, and inhibits the still image sequential shot mode upon operation of the negative/positive reversing means (corresponding to processing in the flow charts shown in FIGS. 36 and 37 by a camera control circuit in the embodiments). In this manner, since selection of the still image sequential shot mode is inhibited upon negative/positive reversing, the operator is exempt from cumbersome operations for setting a negative/positive reversing mode and then switching apparatus to the still image single shot mode, and possibility of operation errors.

According to one preferred aspect of the present invention, the image sensing apparatus comprises color identification means (corresponding to processing in steps 1702 and 1703 in the flow chart shown in FIG. 36 corresponding to the processing executed by a camera control circuit 105 in the embodiments) for detecting based on chrominance components in the sensed image signal if a negative film is subjected to image sensing, and the control means enables the negative/positive reversing means to perform negative/positive reversing, selects the still image single shot mode, and inhibits selection of the still image sequential shot mode when the color identification means detects that the negative film is subjected to image sensing. In this manner, since it is automatically detected that the negative film is subjected to image sensing, operations for performing negative/positive reversing by enabling the negative/positive reversing means, selecting the still image single shot mode, and inhibiting selection of the still image sequential shot mode can be automated.

According to one preferred aspect of the present invention, the image sensing apparatus comprises an image sensing optical system (corresponding to lenses 402, 403, 405, and 406, and an iris 404 in the embodiments) which changes a position of a lens in correspondence with a subject distance, and position detection means (corresponding to processing for counting driving pulses to be supplied to a magnification lens driver 413 and focus-compensation lens driver 415 in a lens/camera control circuit 418 in the embodiments) for detecting the position of the lens, and the control means enables the negative/positive reversing means to perform negative/positive reversing, selects the still image single shot mode, and inhibits selection of the still image sequential shot mode when the position detection means detects that the lens is located at a predetermined position, and the color identification means detects that the negative film is subjected to image sensing. In this manner, since the lens position information is also used for setting the image sensing mode, the film image sensing mode (still image single shot mode) can be automatically set with higher precision.

It is still another object of the present invention to provide an image sensing apparatus which has a normal image sensing mode and a film image sensing mode for sensing a film image or the like, comprising image sensing means (corresponding to an image sensing element 2006), exposure control means (corresponding to a gate circuit 2011, an integrator 2012, an exposure control circuit in a system control circuit 2013, a D/A converter 2016, an iris driving circuit 2017, an iris motor 2019, an iris 2005, and an iris encoder 2015 in FIG. 39) for making exposure control by extracting a predetermined signal component from a sensed image signal output from the image sensing means, and control means (corresponding to a reset pulse generator in the system control circuit 2013 in FIG. 39) for changing response characteristics of the exposure control means in correspondence with the normal image sensing mode and the film image sensing mode. In this manner, since the response characteristics of the exposure control means are changed between the normal image sensing mode and the film image sensing mode, an optimal image sensing state can be obtained in each image sensing mode.

According to one preferred aspect of the present invention, there is provided the image sensing apparatus wherein the predetermined signal component is a luminance signal level, the exposure control means comprises an integrator for integrating the luminance signal level during a predetermined period, and the control means sets a large integral time constant of the integrator when the film image sensing mode is selected. As described above, since the integrator for integrating the luminance levels during the predetermined period is arranged as the exposure control means, and a large integral time constant is set upon selecting the film image sensing mode, even when the exposure state largely changes upon feeding the frame of a film, image quality can be prevented from deteriorating, and the exposure state can be quickly set after the film frame has moved.

It is still another object of the present invention to provide an image sensing apparatus comprising film image sensing mode selection means for notifying a film image sensing mode, and signal processing system switching means for switching a setup state of a signal processing system to a setup state for film image sensing in the film image sensing mode, wherein when the film image sensing mode selection means detects the film image sensing mode, the signal processing system switching means switches the setup state of the signal processing system to the setup state for film image sensing, thereby switching a reference voltage of an A/D converter for A/D-converting a sensed image signal to different voltages in correspondence with the film image sensing mode and a normal image sensing mode to improve an S/N ratio in the film image sensing mode.

With this arrangement, since the signal processing system switching means switches the signal processing system to the setup state for the film image sensing mode in the film image sensing mode, the S/N ratio of an image signal obtained by sensing a film can be improved. Furthermore, with this arrangement, in the film image sensing mode, the top-side reference voltage of the A/D converter can be switched to a voltage optimal to film image sensing. Moreover, the S/N ratio in the film image sensing mode for a negative film, positive film, and the like can be improved without any influences on image quality in the normal image sensing mode, and a higher-quality image can be provided.

According to one preferred aspect of the present invention, the image sensing apparatus of claim 1 is characterized in that a top-side reference voltage of the A/D converter is set to narrow a dynamic range in the film image sensing mode than in the normal image sensing mode.

With this arrangement, the dynamic range of the A/D converter is narrowed in the film image sensing mode, thus processing an/image signal in an optimal state to film image sensing.

According to one preferred aspect of the present invention, the film image sensing mode selection means comprises means for detecting switching between the film image sensing mode and normal image sensing mode.

With this arrangement, the top-side reference voltage of the A/D converter can be switched by detecting the film image sensing mode or normal image sensing mode.

In order to achieve the above objects, an image sensing apparatus according to the present invention, which has a function of sensing a photographic film image, comprises detection means for detecting attachment of an adapter used for sensing a photographic film image, and a noise reduction circuit, and a noise reduction amount of the noise reduction circuit is switched in synchronism with the attachment of the adapter detected by the detection means.

According to one preferred aspect of the present invention, the noise reduction circuit has a field memory or frame memory, and executes field or frame correlation noise reduction.

According to one preferred aspect of the present invention, the noise reduction circuit has a line memory, and executes line correlation noise reduction.

It is still another object of the present invention to provide an image sensing apparatus having a function of sensing a photographic film, comprising a reversing circuit for reversing a negative image on the photographic film to a positive image, and a noise reduction circuit, wherein a noise reduction amount of the noise reduction circuit is switched in synchronism with reversing by the reversing circuit.

According to one preferred aspect of the present invention, the noise reduction circuit has a field memory or frame memory, and executes field or frame correlation noise reduction.

According to one preferred aspect of the present invention, the noise reduction circuit has a line memory, and executes line correlation noise reduction.

DETAILED DESCRIPTION OF THE INVENTION

An image sensing apparatus (the first to 19th embodiments) according to the present invention will be described in detail hereinafter with reference to the accompanying drawings. Note that an image sensing apparatus according to each of the first to 15th embodiments pursues automatic detection of attachment of film adapter, and an image sensing apparatus according to each of the 16th to 19th embodiments automatic setting of the optimal image sensing condition for image sensing via a film adapter.

<Arrangement of Image Sensing Apparatus> . . . Basic Arrangement

The first to 19th embodiments are directed to an image sensing apparatus which allows to sense images on a negative or positive film using a film adapter which is detachably attached to a video camera or the like. The arrangement of an image sensing apparatus as a premise of each embodiment will first be explained below. A video camera shown in FIGS. 3 to 10 has a basic arrangement of video cameras of the first to 19th embodiments and, hence, the basic arrangement is modified as needed in the video camera of each of the first to 19th embodiments.

Figure 1:
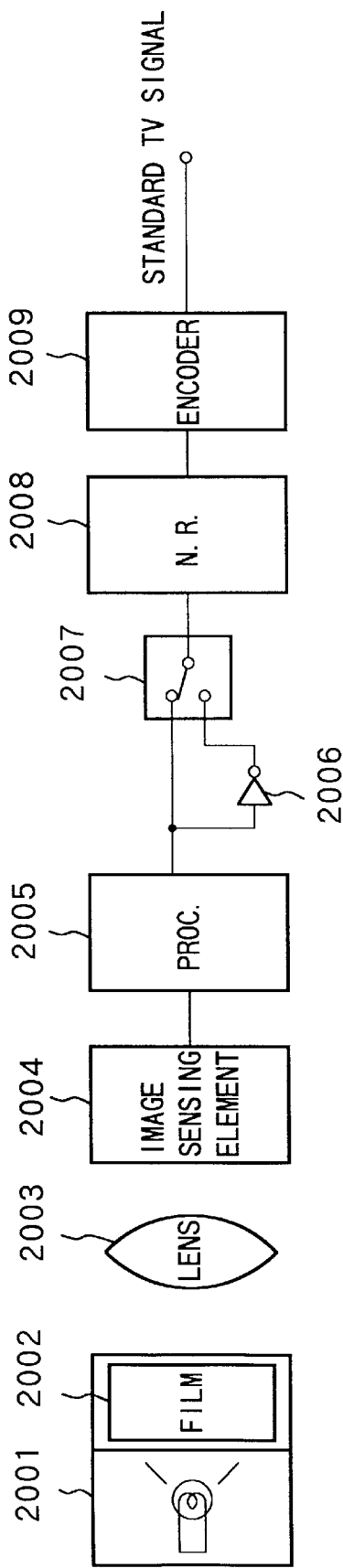
FIG. 1 is a block diagram showing the arrangement of a conventional image sensing apparatus.
Figure 2:
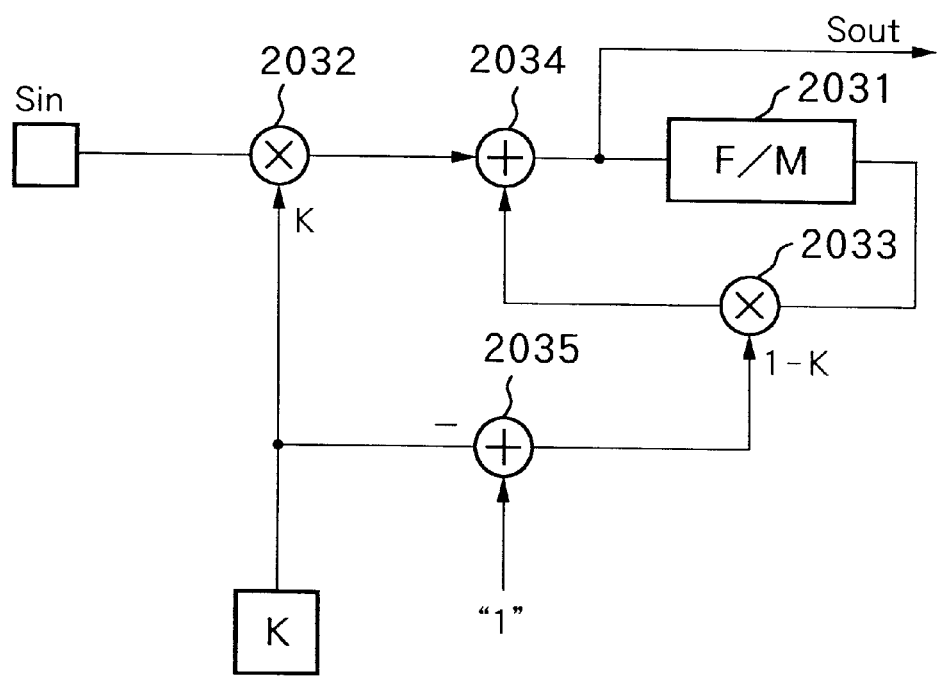
FIG. 2 is a circuit diagram showing an example of the arrangement of a conventional noise reduction circuit.
Figure 3:
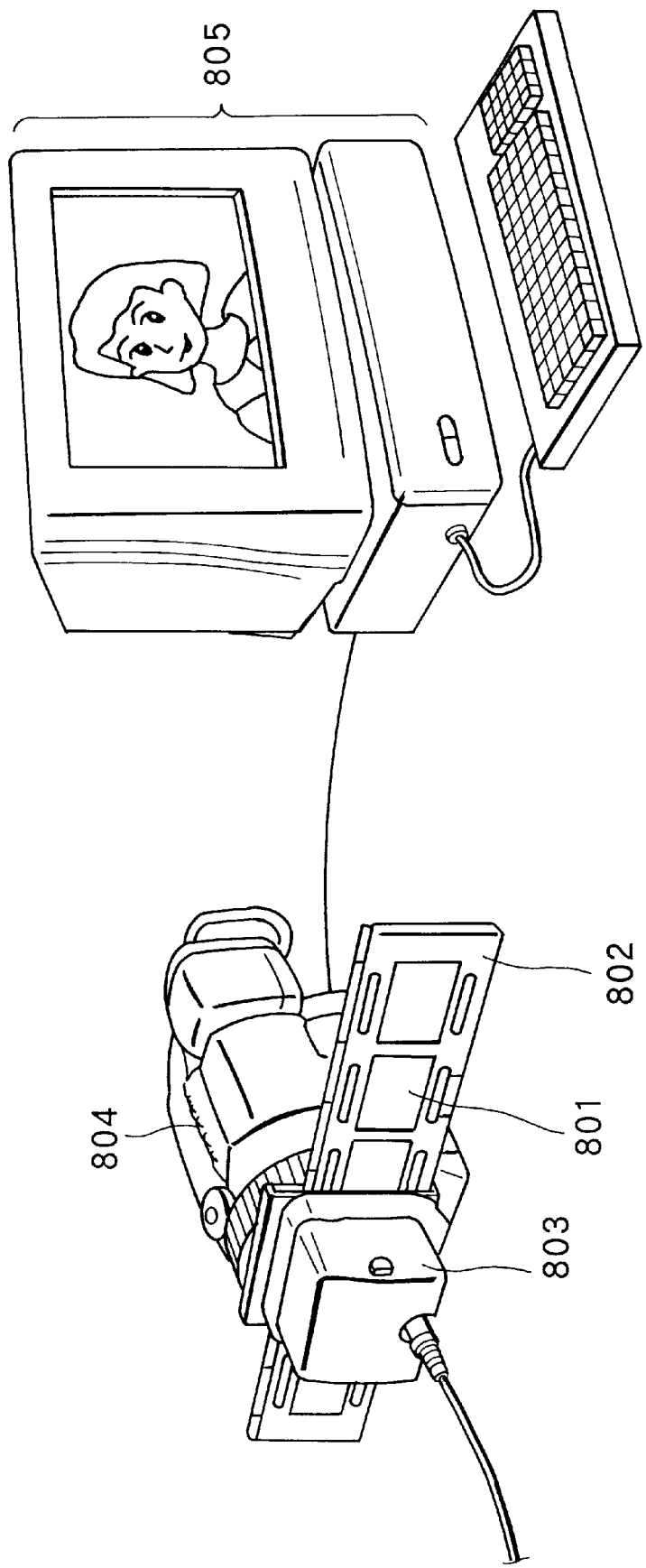
FIG. 3 depicts the arrangement of a system in which a film image obtained by attaching a film adapter to a video camera is captured into a personal computer.

FIG. 3 depicts a state wherein a film adapter 803 is attached to a video camera 804 to sense an image on a negative film 801 clamped by a film holder 802. The film adapter 803 has a backlight (not shown) for illuminating the negative film 801, and an optical image transmitted through the film 801 is sensed by the video camera 804.

In this case, when the video camera 804 has a (negative/position conversion) function of converting a negative image into a positive image, the output electrical signal is a video signal of a positive image.

When this output signal is input to a personal computer 805, the positive image can be captured on a memory in the personal computer. Since the frames on a negative film have a uniform size and the light source can be standardized by the backlight, the system shown in FIG. 3 allows the user to capture a picture image into the personal computer more easily than sensing a so-called silver halide picture printed on a photographic print paper sheet.

Video information on a negative film is literally a reversed one of a positive image.

Figure 4:
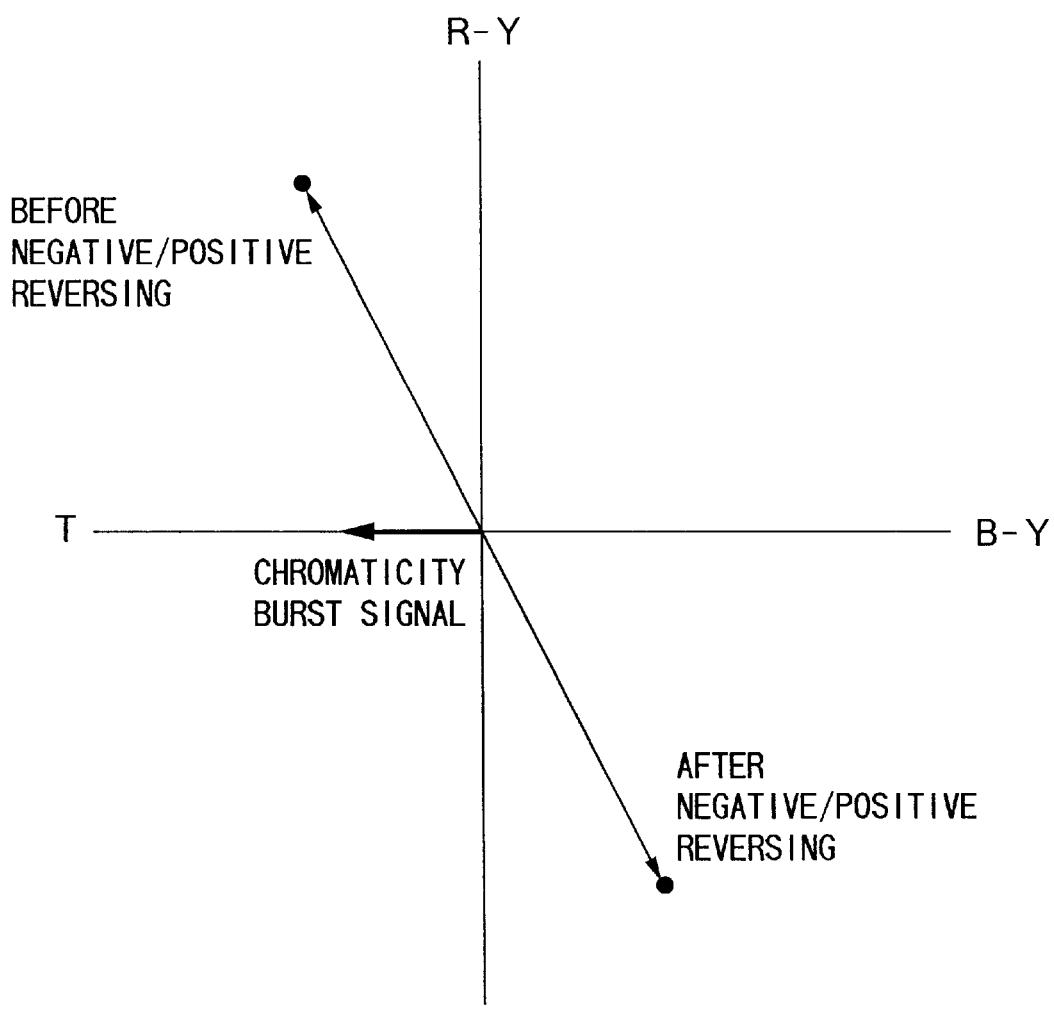
FIG. 4 is a graph for explaining differences between negative and positive films on a color difference signal coordinate system.

FIG. 4 shows given color difference signals (R-Y, B-Y) of a color negative film using vectors in both negative and positive states. The abscissa is the color difference signal B-Y axis, and the ordinate is the color difference signal R-Y axis. As can be seen from FIG. 4, the color difference vectors are inverted through 180° between the two states before and after negative/positive reversing.

Figure 5:
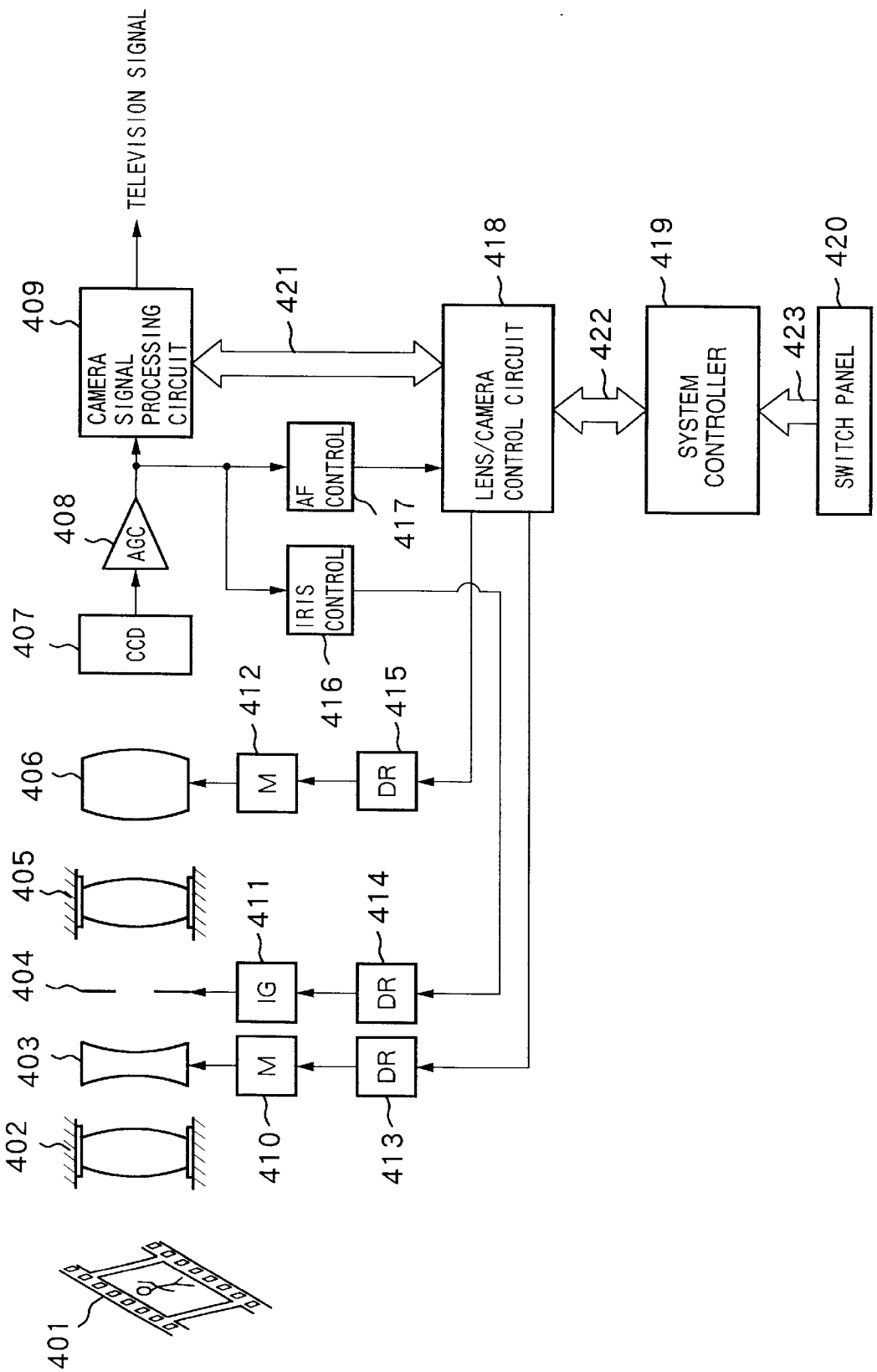
FIG. 5 is a block diagram for explaining the circuit arrangement of a video camera to which the present invention is applied.
Figure 6:
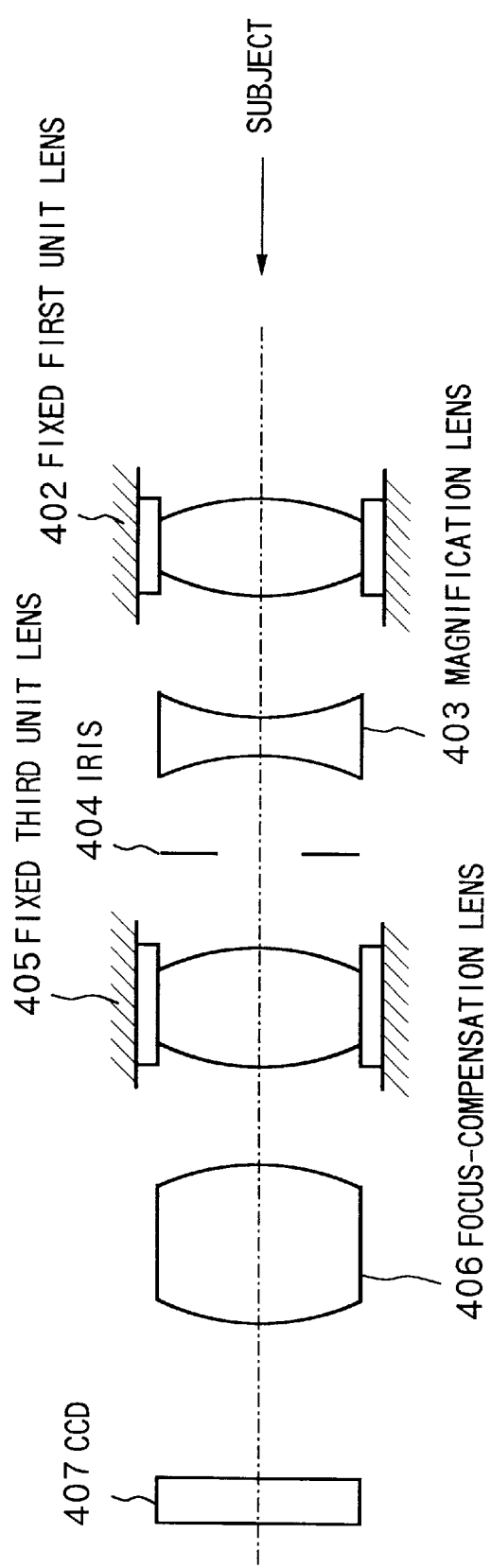
FIG. 6 is a side view showing the structure of an inner focus type lens.

FIG. 5 is a schematic block diagram showing the arrangement of the video camera shown in FIG. 3, and FIG. 6 shows a portion associated with the negative/positive reversing function of that camera in detail.

Referring to FIG. 5, reference numeral 401 denotes a subject. Normally, a person, landscape, or the like becomes the object to be sensed. However, when a negative film or slide film is attached as the subject 401 to the film adapter, the subject 401 has a very small distance from the front surface of a lens system.

Reference numeral 402 denotes a fixed first unit lens; 403, a magnification lens; 404, an iris; 405, a fixed third unit lens; and 406, a focus-compensation lens which has both a focus adjustment function and a function of compensating for shifts of a focal plane upon variable magnification. Reference numeral 407 denotes an image sensing element such as a CCD; 408, an AGC circuit; and 409, a signal processing circuit, the details of which are shown in FIG. 6. Reference numerals 410, 411, and 412 respectively denote a magnification lens motor, IG motor, and focus-compensation lens motor for respectively driving the magnification lens, iris, and focus-compensation lens. Reference numerals 413, 414, and 415 respectively denote drivers for respectively supplying driving currents to the magnification lens 410, iris 411, and focus-compensation lens 412.

Reference numeral 416 denotes an iris control circuit; 417, an AF control circuit for processing an evaluation value used in auto-focus (AF) control; 418, a lens/camera control circuit for controlling the lens and camera; 419, a system controller for controlling the system of the entire video camera; 420, a switch panel equipped in the video camera; and 421, 422, and 423, communication lines for data communications among the individual circuits.

FIG. 6 shows a lens system made up of the fixed first unit lens 402, magnification lens 403, iris 404, fixed third unit lens 405, and focus-compensation lens 405 shown in FIG. 5.

Figure 7:
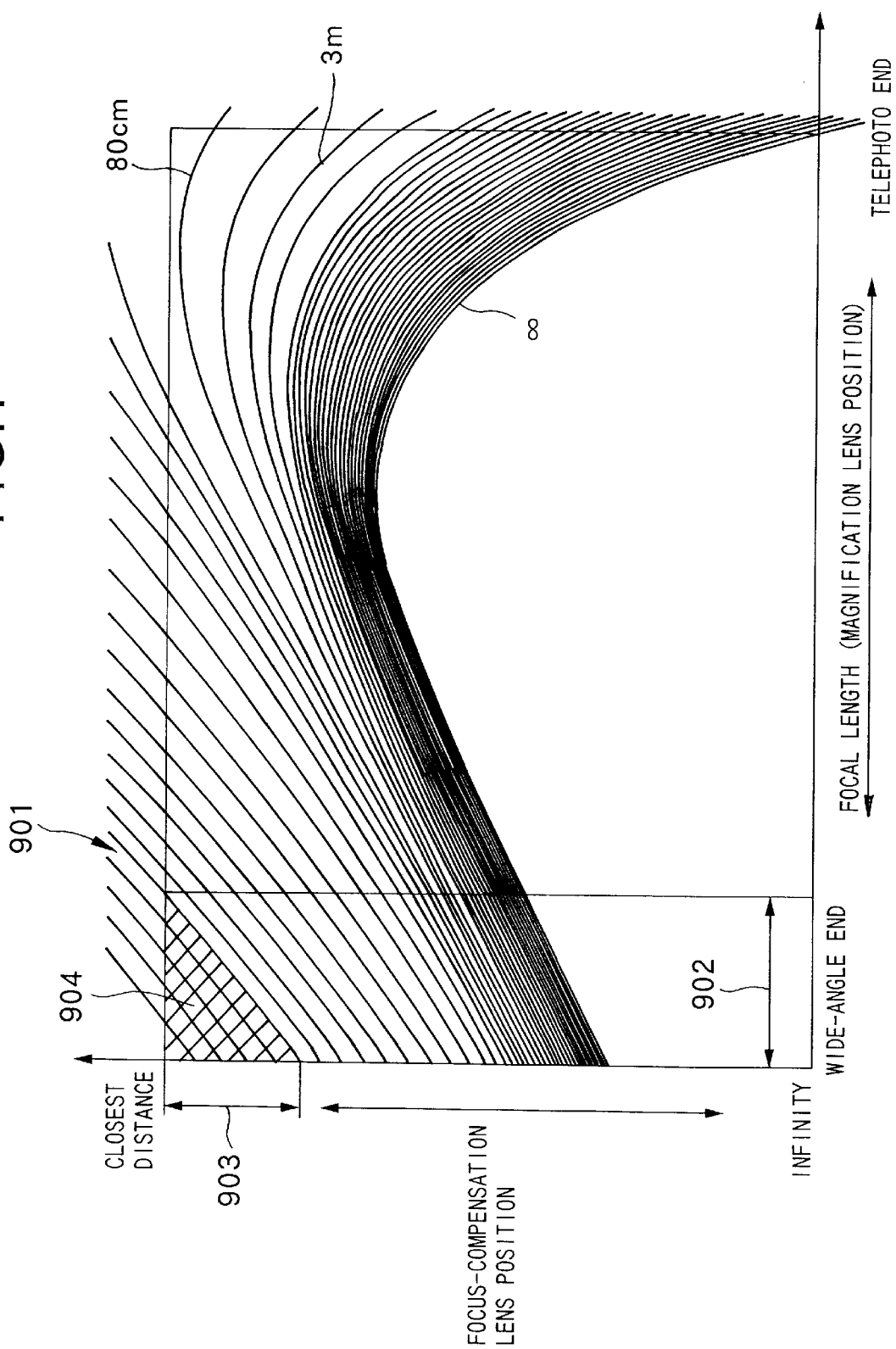
FIG. 7 is a graph showing the characteristics of the inner focus type lens.

A lens arrangement of this type is called an inner focus type lens system. FIG. 7 shows, as a plurality of loci, the imaging plane in-focus positions of the focus-compensation lens with respect to subject distances corresponding to focal lengths. In FIG. 7, the abscissa plots the magnification lens position, and the ordinate plots the focus-compensation lens position.

In the lens system shown in FIG. 6, when an in-focus state is to be obtained on the image sensing surface 407 by moving the focus-compensation lens, the position of the focus-compensation lens for each subject distance changes in accordance with the focal length. Especially, on the short focal length side (the left side in FIG. 7), the minimum value of the subject distance with which an in-focus state can be attained indicates a position immediately before the first unit lens 402 by moving the focus-compensation lens 406 to a position in the vicinity of the closest-distance end. In other words, an in-focus state can be obtained even when the subject is at a position immediately before the lens 402.

In order to accurately trace the loci shown in FIG. 7, the positions of the magnification lens and focus-compensation lens can be detected by counting driving pulses to be supplied from the lens/camera control circuit 418 to the drivers 413 and 415 using an internal counter of the lens/camera control circuit 418.

A curve 901 in FIG. 7 is an in-focus curve when a subject is placed within a very short distance range, i.e., within several cm immediately before the lens 402. As can be seen from FIG. 7, an in-focus region of the magnification lens 403 corresponding to this subject distance range is a limited short-focal length region within a region 902. Hence, when an image on a film located very close to the lens 102 is sensed using the film adapter shown in FIG. 3, a combination of the positions of the magnification lens 403 and the focus-compensation lens 406 must fall within the region 904 bounded by three margins 901, 902, and 903 in FIG. 7.

Therefore, when an image on a film is sensed using the film adapter, the positions of the magnification lens and focus-compensation lens must be changed using a predetermined switch (one in a switch panel 420).

Figure 8:
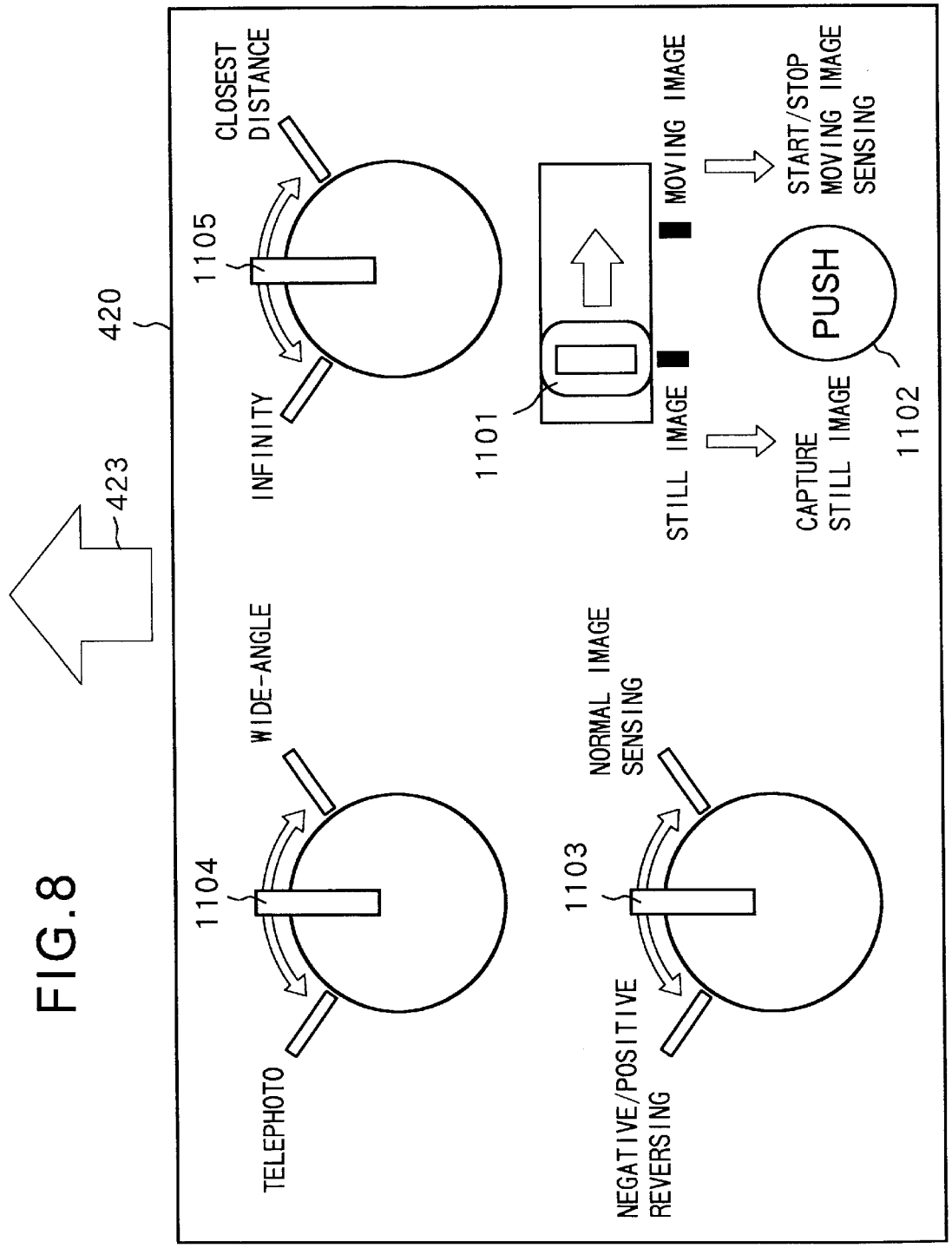
FIG. 8 is a plan view showing an example of a switch panel including various switches arranged on the video camera.

FIG. 8 shows an example of the internal arrangement of the switch panel 420 arranged on the camera. A switch setup state for setting the lens system to be suitable for film image sensing will be described below. A magnification setting switch 1104 in the switch panel 420 is set, so that the position of the magnification lens falls with the region 902 in FIG. 7. Thereafter, the focus-compensation lens is moved to a position within the region 904 in FIG. 7 by enabling an auto-focus circuit or by operating a focus-compensation lens manual movement switch 1105.

Figure 9:
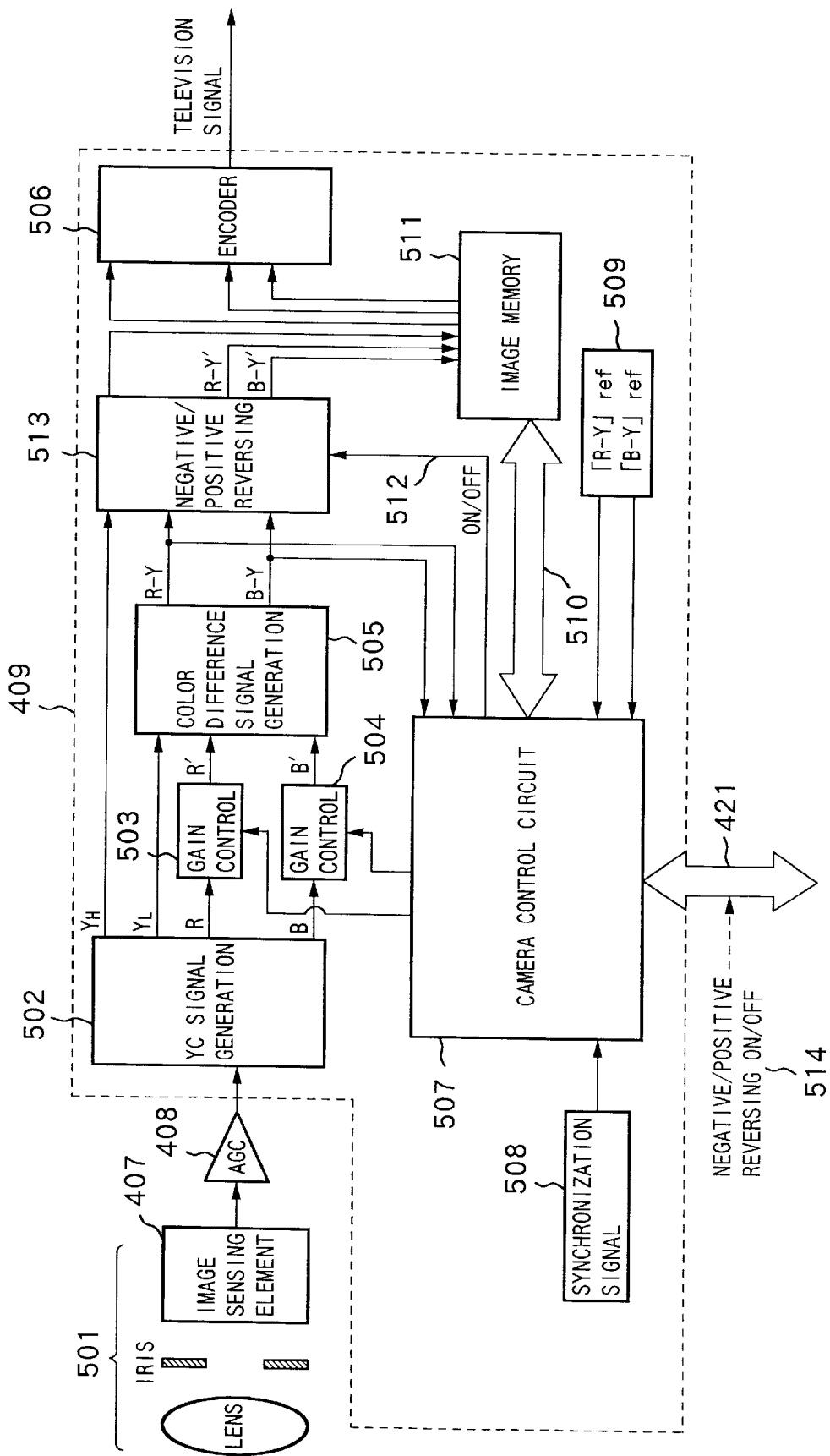
FIG. 9 is a block diagram showing the arrangement of a camera signal processing circuit in the system shown in FIG. 5.

FIG. 9 is a block diagram showing the arrangement in the camera signal processing circuit 409, and a portion bounded by the broken line corresponds to the camera signal processing circuit 409.

Reference numeral 501 denotes an image sensing optical system, which simply illustrates the lens system made up of the lenses 402, 403, 405, and 406, and iris 404 shown in FIG. 6, in FIG. 9. Reference numeral 502 denotes a YC signal generation circuit, which separates luminance signals $Y_H$ and $Y_L$ and chrominance signals R (red) and B (blue) from the output from the AGC circuit 408, and outputs these signals. Reference numerals 503 and 504 respectively denote R and B gain control circuits. The levels of color difference signals R-Y and B-Y are respectively detected by a camera control circuit 507, and the gains of the gain control circuits 503 and 504 are adjusted to obtain appropriate white balance. Thereafter, the circuits 503 and 504 respectively output adjusted chrominance signals R' and B'.

Reference numeral 505 denotes a color difference signal generation circuit for generating color difference signals R-Y and B-Y on the basis of the signals $Y_L$, R, and B; 506, an encoder for generating a television signal on the basis of the signals $Y_H$, R-Y, and B-Y; 508, a synchronization signal generation circuit for supplying a synchronization signal to the camera control circuit; and 5091 a reference signal generation circuit for generating reference signals $[R-Y]_{ref}$ and $[B-Y]_{ref}$ for adjusting the gains of the gain control circuits 503 and 504.

An image memory 511 is connected to the camera control circuit 507 via a communication line 510, and stores image data of a still image. When the user selects a still image sensing mode using a mode selection switch 1101 (FIG. 8) for switching the image sensing mode between a moving image sensing mode and still image sensing mode, image data can be stored in the memory 511. When the user presses a trigger switch 1102 on the switch panel 420, the luminance and chrominance signals output from the YC signal generation circuit 502 and the color difference signal generation circuit 505 are stored in the memory 511, and still image information is then output from the memory 511 to the encoder 506 in accordance with a control signal from the control circuit 507. In this manner, the still image sensing mode is set.

When the moving image sensing mode is selected (when the switch 1101 is flipped to the right side), or when the still image sensing mode is selected but the trigger switch 1102 is not pressed, image information from the circuits 502 and 505 passes through the image memory 511.

When the video camera of the present invention has both the moving and still image sensing modes, two trigger switches 1102 may be arranged in correspondence with moving and still images. However, in terms of a size reduction, cost reduction, and easy operation of the apparatus, a single trigger switch is designed to be used for sensing both moving and still images, as shown in FIG. 8.

The negative/positive reversing function will be explained below.

Figure 10:
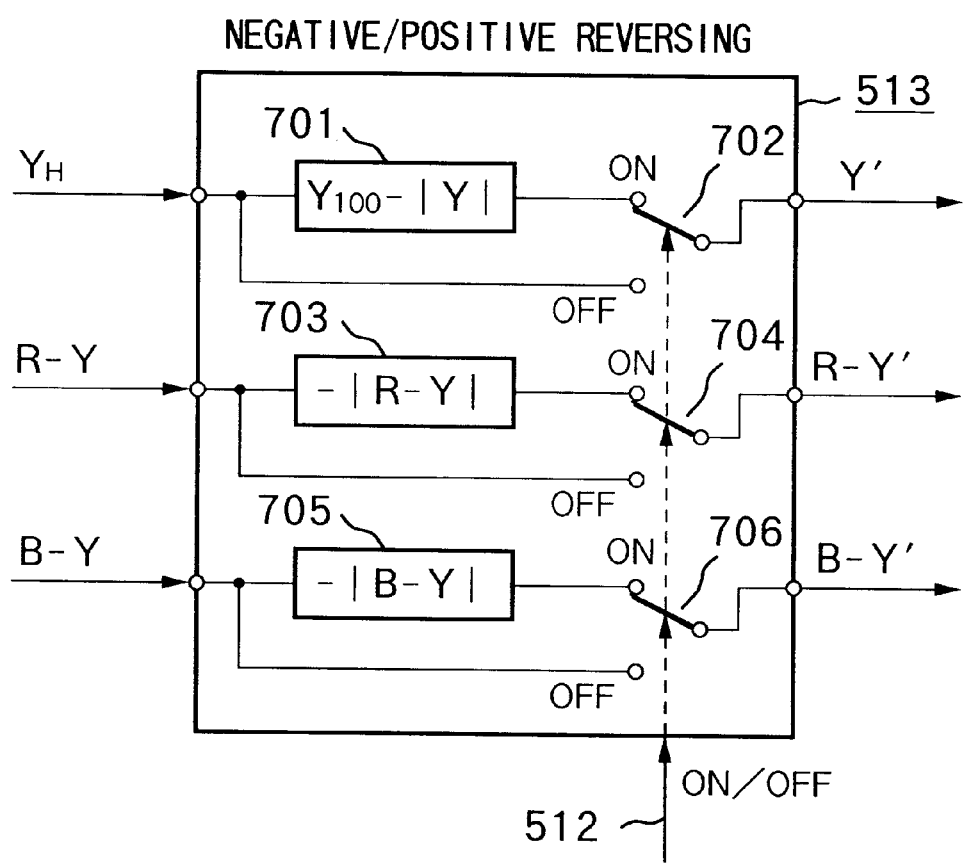
FIG. 10 is a circuit diagram showing the internal arrangement of a negative/positive reversing circuit.

In FIG. 9, a negative/positive reversing circuit 513 is inserted before the image memory 511. The negative/positive reversing circuit reverses the signals $Y_H$, R-Y, and B-Y. FIG. 10 shows the arrangement of the negative/positive reversing circuit.

In FIG. 10, as for the signal $Y_H$, a circuit 701 reverses a light portion of the input luminance signal to a dark portion and vice versa. That is, for example, as for the input luminance signal, the absolute value of the luminance signal, which falls within the luminance level range from black level as a black level reference to 100% white level is subtracted from 100% white level, thereby extracting a density-reversed luminance component with reference to 100% white level.

On the other hand, a circuit 703 reverses the signal R-Y in an opposite direction on the R-Y axis and a circuit 705 reverses the signal B-Y in an opposite direction on the B-Y axis in accordance with the conversion characteristics shown in FIG. 4. In this manner, by reversing the luminance and color difference signals, a negative image can be converted into a positive images.

Switches 702, 704, and 706 shown in FIG. 10 operate in cooperation with each other by a negative/positive reversing ON/OFF signal. When the negative/positive reversing function is ON, these switches select the reversed signals; otherwise, they select input signals to output them from the negative/positive reversing circuit 513.

The negative/positive reversing ON/OFF signal is output from the camera control circuit 507. Whether or not the negative/positive reversing function is executed an be selected by the operator using a switch 1103 (FIG. 8) in the switch panel 420. The camera control circuit 507 receives this selection information from the communication line 421 via the communication line 423, system controller 419, communication line 422, and lens/camera control circuit 418, as shown in FIGS. 5 and 9, and outputs a negative/positive reversing ON/OFF signal 512 to the circuit 513 on the basis of the received information.

The overall arrangement of the video camera apparatus having the still image sensing mode and negative/positive reversing function has been described.

<First Embodiment>

The arrangement according to the first embodiment of the present invention will be described below.

The video camera system described above with the aid of FIGS. 3 to 10 requires the user setting of the image sensing mode using the film adapter via the switch shown in FIG. 8. However, unlike the video camera system described above with the aid of FIGS. 3 to 10, the video camera of the first embodiment determines based on an image signal whether or not the film adapter is attached, thus relieving the operator of operation of various switches shown in FIG. 8. That is, the first embodiment does not determine actual attachment of the adapter but determines whether or not an image on a film is to be sensed. When an image signal indicating film image sensing is obtained, it is determined that the film adapter is attached, and the user wants to sense an image on that film as a still image.

Figure 11:
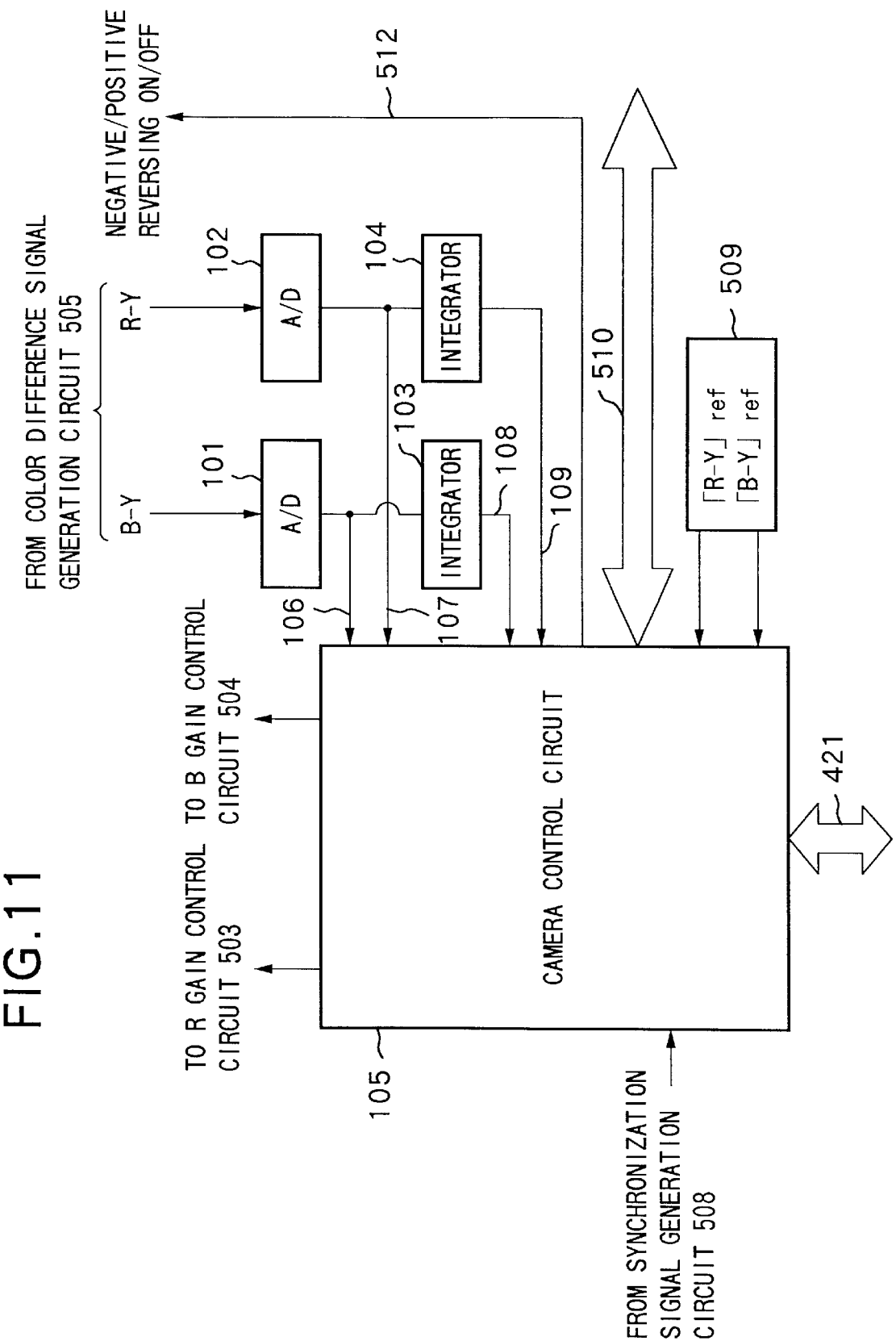
FIG. 11 is a block diagram showing the circuit arrangement common to the individual embodiments of an image sensing apparatus according to the present invention.

The characteristic feature of the first embodiment lies in the internal arrangement of the camera signal processing circuit 409, which is shown in FIG. 11. Note that FIG. 11 shows changed peripheral portions of the camera control circuit 507 shown in FIG. 9.

In the first embodiment, a microcomputer is used as a camera control circuit 105, and some other functions are further added to the above-mentioned system.

Since the camera control circuit 105 comprises a microcomputer, signals R-Y and B-Y output from the color difference signal generation circuit 505 are converted into digital signals by A/D converters 101 and 102, and the obtained digital signals are input to the camera control circuit 105.

The outputs from the A/D converters 101 and 102 are respectively input to the camera control circuit 105 via terminals 106 and 107, and are used for controlling the R and B gain control circuits 503 and 504 described above with the aid of FIG. 9.

On the other hand, the outputs from the A/D converters 101 and 102 are also input to integrators 103 and 104, and the integral results are input to the control circuit 105 via terminals 108 and 109.

Figure 12:
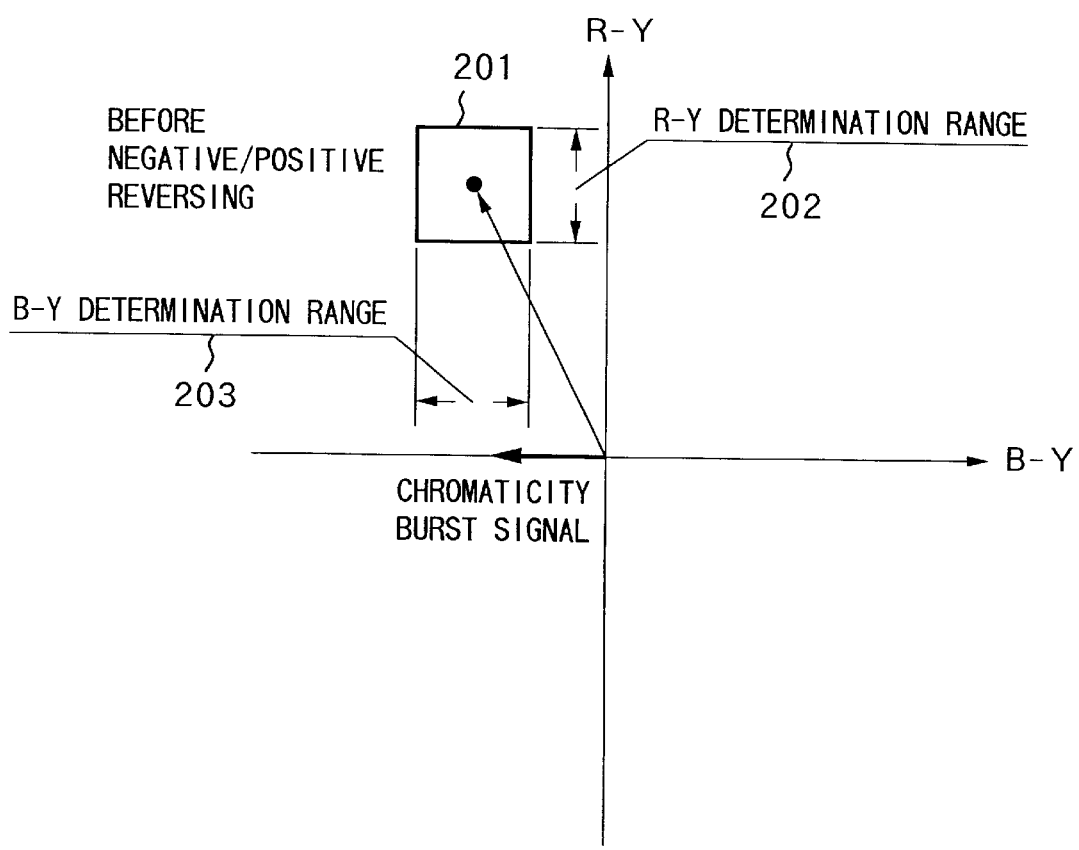
FIG. 12 is a graph showing the principle of automatic negative/positive determination.

When light transmitted through a color negative film illuminated by a predetermined backlight is sensed by the video camera and the obtained color difference signals are integrated by the integrators 103 and 104, the obtained R-Y and B-Y components are roughly distributed as color difference vectors within a range indicated by a region on a color difference vector coordinate system shown in FIG. 12.

Hence, whether or not an image on a negative film is sensed can be detected in such a manner that color difference component signals (R-Y and B-Y) input from the terminals 108 and 109 are monitored to detect if color difference vectors are included with the region 201, i.e., an R-Y component falls within a determination range 202 (FIG. 12) and a B-Y component falls within a determination range 203.

Figure 13:
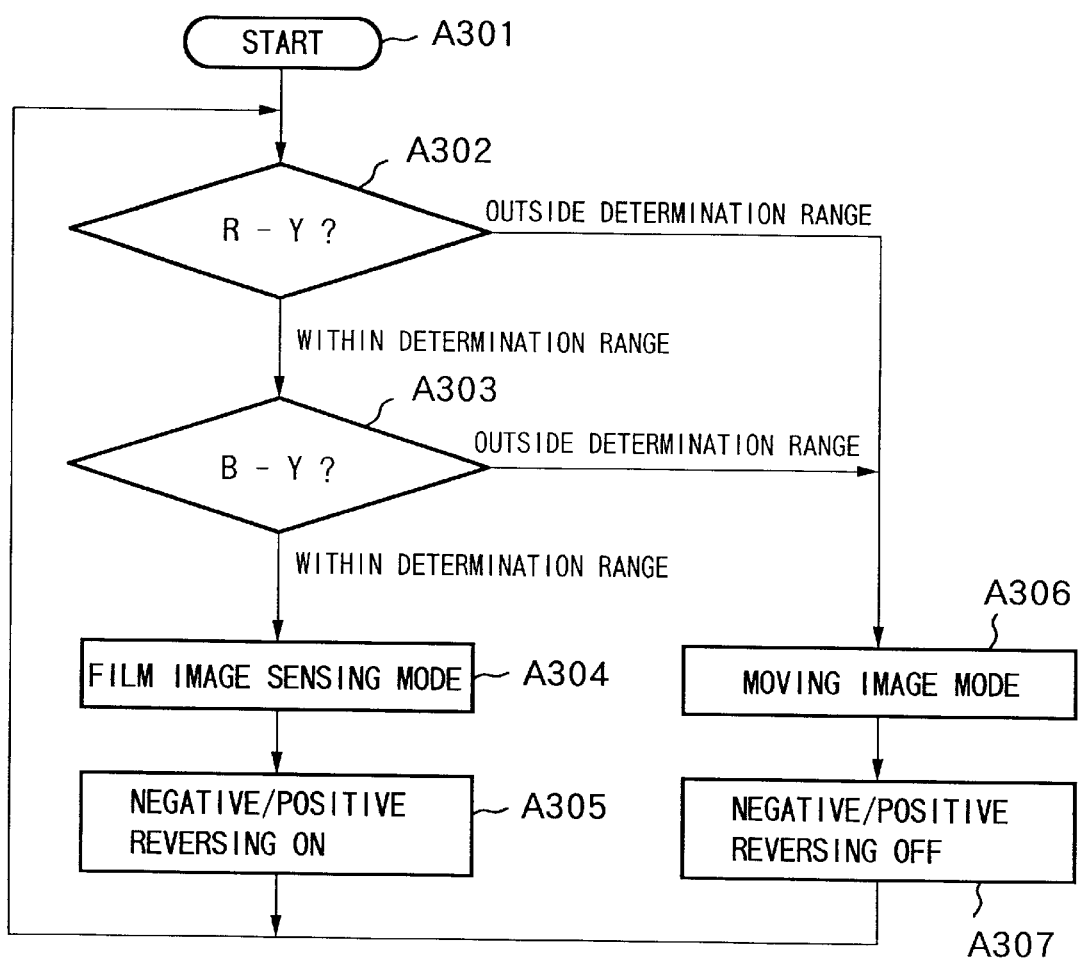
FIG. 13 is a flow chart showing operation according to the first embodiment of the present invention.

FIG. 13 is a flow chart showing the control for detecting attachment of the film adapter and automatic selection of the film image sensing mode in the camera control circuit 105.

When execution of the processing starts in step 301, it is checked in step A302 if a signal R-Y input via the terminal 109 falls with the determination range 202. If the signal R-Y falls outside the determination range 202, the camera is set in the moving image mode in step A306. That is, the image memory 511 is set in a through state, and the camera control circuit 507 supplies a control signal 512 to the negative/positive reversing circuit 513 to disable the negative/positive reversing function so as not to execute negative/positive reversing.

On the other hand, if it is determined that the signal R-Y falls within the determination range 202, it is checked in step A303 if a signal B-Y input from the integrator 103 via the terminal 108 falls within the determination range 203. If the signal R-Y falls outside the determination range, the flow similarly advances to step A306. On the other hand, if it is determined in step A303 that the signal B-Y falls within the determination range 202, the camera is set in the film adapter mode, i.e., the film image sensing mode in step A304. More specifically, the camera stands by to capture a still image into the image memory 511 when the trigger switch 1102 (FIG. 8) is turned on, and the camera control circuit 507 supplies the control signal 512 to the negative/positive reversing circuit 513 to enable the negative/positive reversing function so as to execute negative positive reversing.

In the video camera of the first embodiment with the above-mentioned arrangement, the operator need not manually select the "operation of the negative/positive reversing function" using the switch 1103, and the camera can be automatically set in the film image sensing mode and enable the negative/positive reversing function only when an image on a negative film is sensed.

Therefore, for example, when a negative film image is to be captured in the moving image mode which remains set immediately after normal video image sensing, a photographic film capture mode can be automatically and smoothly selected by only attaching the film adapter.

Note that the above-mentioned negative film automatic determination scheme is not limited to only one scheme, and negative film automatic determination may also be implemented by methods disclosed in Japanese Laid-Open Patent Nos. 61-218268 and 62-10967 assigned to the same assignee as the present invention. Such specifications are incorporated herein by reference.

<Second Embodiment>

In the first embodiment, whether or not the film adapter is attached, i.e., whether or not the user wants to select the film image sensing mode, is determined by checking on the basis of color difference signals if the camera is sensing light transmitted through a film. The second embodiment implements this determination on the basis of the lens position in an imaging plane in-focus state upon sensing a subject.

Figure 14:
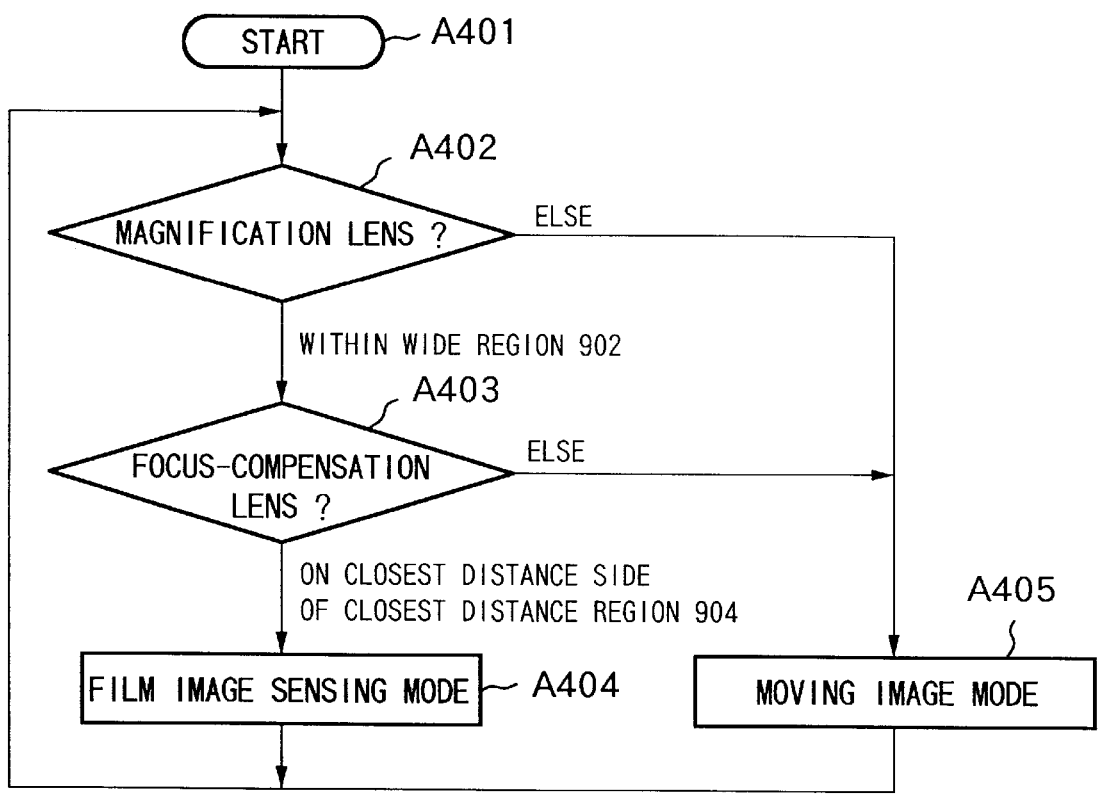
FIG. 14 is a flow chart showing operation according to the second embodiment of the present invention.

FIG. 14 is a flow chart showing the processing in the camera control circuit 105 in the camera signal processing circuit 409 according to the second embodiment of the present invention.

In the flow chart shown in FIG. 14, when execution of the processing starts in step A401, it is checked in step A402 if the position of the magnification lens falls within the range of a region 902 shown in FIG. 7. If the position of the magnification lens falls outside the range, the flow advances to step A405 as in the first embodiment, and the camera is set in a state for sensing a normal subject image in the moving image mode.

On the other hand, if it is determined in step A402 that the position of the magnification lens falls within the range of the region 902, it is checked in step A403 if the position of the focus-compensation lens falls within the range on the closest-distance side of a curve 904 (the position condition of the focus-compensation lens changes depending on the position of the magnification lens). If the position of the focus-compensation lens falls outside that range, the processing in step A405 is executed in the same manner as described above.

If it is determined in step A403 that the position of the focus-compensation lens falls within the range 903 in FIG. 7, it is determined that the film adapter 803 is attached, and the video camera is set in the film image sensing mode in step A404.

Since the state of the lens system is used as a determination condition, as described above, whether or not a photographic film image is sensed at the closest distance, i.e., using the film adapter can be clearly determined. Hence, the camera can be automatically set in the photographic film image sensing mode without any operation errors.

<Third Embodiment>

In the third embodiment, whether or not the camera is to be set in the film image sensing mode is determined in consideration of both the determination condition of the first embodiment (determination based on color difference signals) and the determination condition of the second embodiment (i.e., the lens position in the imaging plane in-focus state described above with the aid of FIG. 7).

Figure 15:
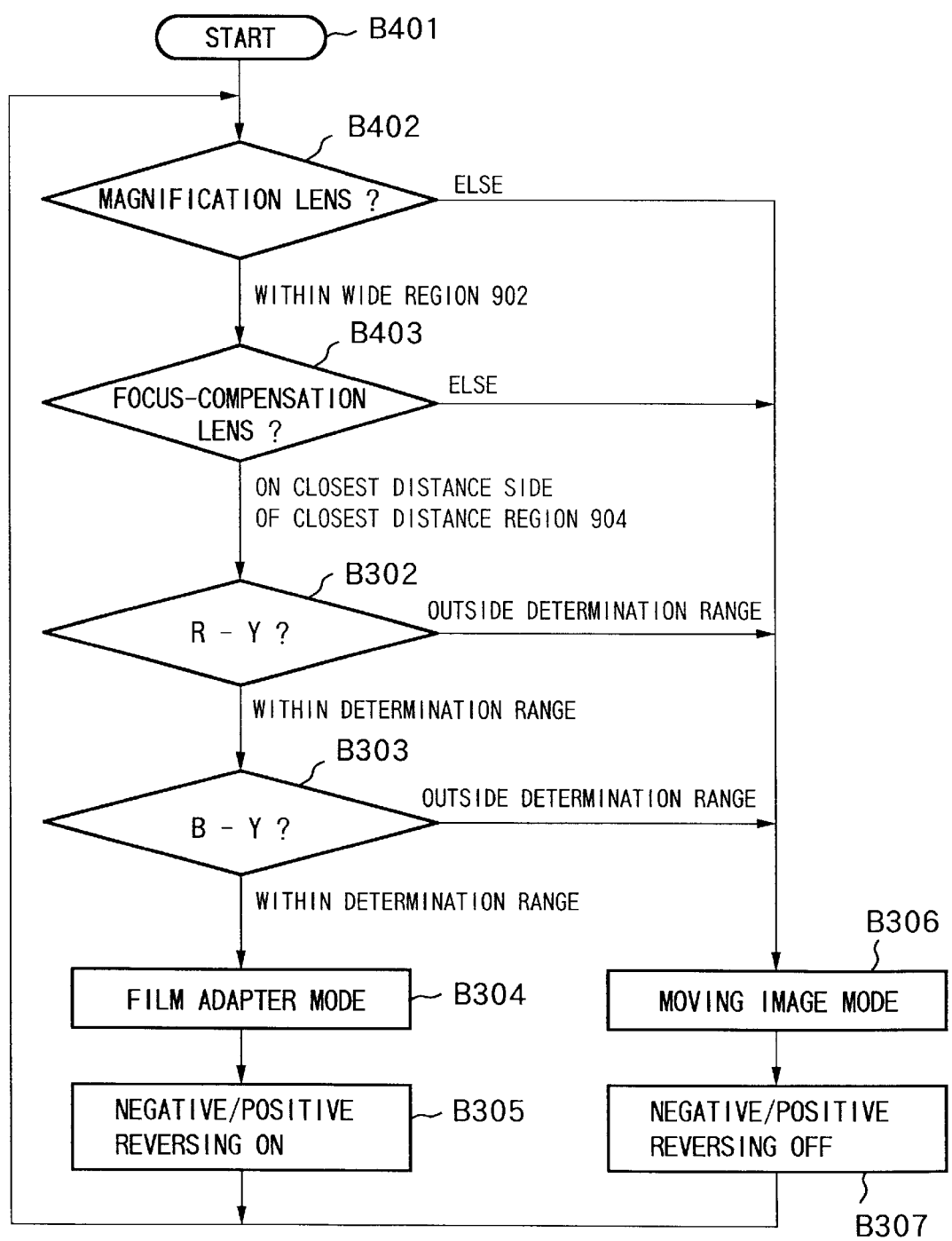
FIG. 15 is a flow chart showing operation according to the third embodiment of the present invention.

FIG. 15 is a flow chart showing the processing in the camera control circuit 507 in the camera signal processing circuit 409 according to the third embodiment of the present invention.

Steps B402 and B403 in FIG. 15 are the same as steps A402 and A403 in FIG. 14, and steps B302 to B307 in FIG. 15 are the same as steps A302 to A307 in FIG. 13.

In the flow chart shown in FIG. 15, when execution of the processing starts, it is checked in step B402 if the position of the magnification lens falls within the range of the region 902 (FIG. 7). If the position of the magnification lens falls outside the range, the flow advances to steps B306 and B307 as in the first embodiment, and the camera is set in a state for sensing a normal subject image in the moving image mode.

On the other hand, if it is determined in step B402 that the position of the magnification lens falls within the range of the region 902 (FIG. 7), it is checked in step B403 if the position of the focus-compensation lens falls within the range on the closest-distance side of the curve 904 (the position condition of the focus-compensation lens changes depending on the position of the magnification lens). If the position of the focus-compensation lens falls outside that range, the processing in steps B306 and B307 is executed in the same manner as described above. If it is determined in step B403 that the position of the focus-compensation lens falls within the range 903 in FIG. 7, the states of color difference signals R-Y and B-Y are detected in steps B302 and B303 as in the first embodiment. If the color difference vectors fall within the range of the region 201, it is determined that the film adapter is attached, and a photographic film image is to be sensed. Hence, the video camera is set to capture a negative-to-positive reversed image in the film image sensing mode in steps B304 and B305.

As described above, by adding the state of the lens system as the determination condition, whether or not a photographic film image is sensed at the closest distance, i.e., using the film adapter can be clearly determined. Hence, the camera can be automatically set in the photographic film image sensing mode without any operation errors.

With the above arrangement, when the film adapter is attached, the camera can be automatically set in the negative film image sensing mode. Hence, not only cumbersome operations are precluded, but also the camera can prevent a negative film image from being captured into a personal computer in the moving image mode if the operator forgets to do required operations.

<Fourth Embodiment>

In the first and second embodiments, the camera indirectly determines based on the color difference signals or lens position if the user wants to do film image sensing. In the fourth embodiment, when the operator operates the negative/positive reversing function selection switch 1103 to enable the negative/positive reversing function, the camera is automatically set in the film image sensing mode.

The camera of the fourth embodiment can be realized by changing processing in the camera control circuit 105 (signal processing circuit 409) of the basic video camera shown in FIGS. 3 to 10. For this reason, the fourth embodiment is advantageous in terms of cost.

Hence, the schematic arrangement of the overall camera apparatus of the fourth embodiment is the same as that shown in FIG. 5, and the internal arrangement of the camera signal processing circuit 409 is the same as that shown in FIG. 9.

Figure 16:
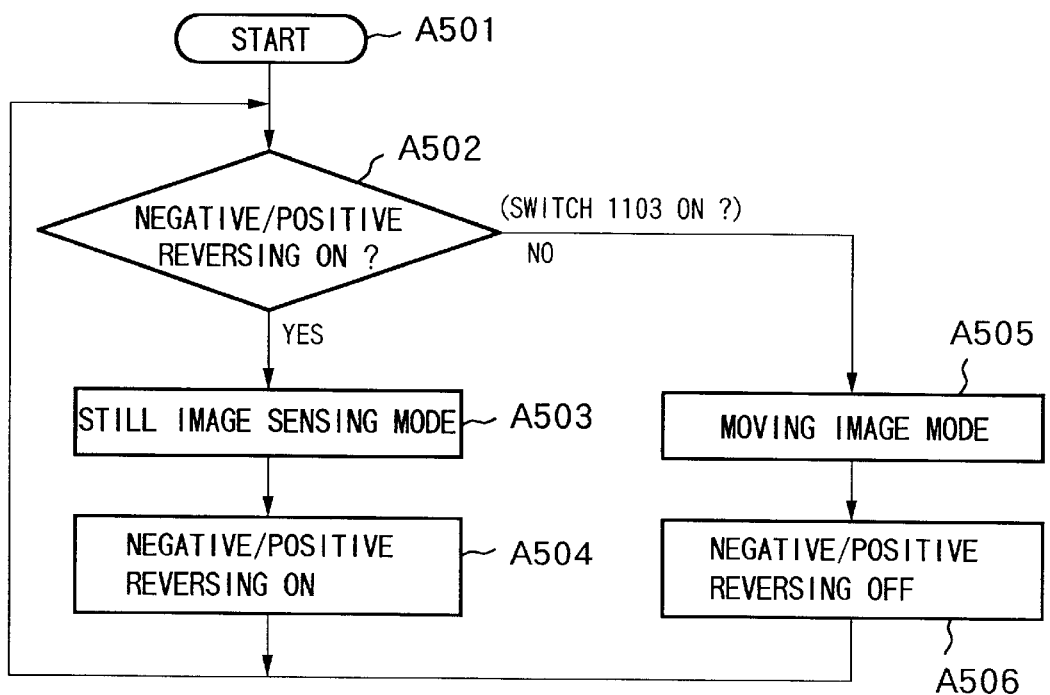
FIG. 16 is a flow chart showing operation according to the fourth embodiment of the present invention.

In FIG. 16, when execution of the processing starts in step A501, it is checked in step A502 if the operator has enabled the negative/positive reversing function. As described above, the communication lines 422 and 423 carry ON information of the negative/positive reversing function.

If it is determined in step A502 that the negative/positive reversing function is ON, the camera is set in the still image mode, and thereafter, a negative/positive reversing ON signal is output to the negative/positive reversing circuit 513 via the signal line 512 to enable the negative/positive reversing function, in steps A503 and A504. With this processing, an image obtained by converting a negative film image into a positive image can be displayed or recorded.

On the other hand, if it is determined in step A502 that the negative/positive reversing function is OFF, the camera is set in the moving image mode, and thereafter, a negative/positive reversing OFF signal is output to the negative/positive reversing circuit 513 via the signal line 512 to disable the negative/positive reversing function, in steps A505 and A506. In this manner, a normal moving image sensing mode is set.

With the above arrangement, even in a camera which does not have any function of automatically determining negative film image sensing, the camera is automatically set in the still image mode when the negative/positive reversing function is ON. Hence, cumbersome operations are alleviated, and the camera can prevent a negative film image from being unwantedly captured in the moving image mode if the operator forgets to do required operations.

<Fifth Embodiment>

In the fifth embodiment, the present invention is applied to a video camera having a negative/positive reversing function. In this embodiment, if the color difference signals of an image signal detected by an image sensing element fall within a predetermined range, the negative/positive reversing function is automatically enabled without bothering the user. In this manner, an image on a negative film set in the film adapter is captured as a positive image.

The hardware arrangement of the video camera of the fifth embodiment is the same as that in the first embodiment, but the control sequence in the camera control circuit 105 is different from that in the first embodiment.

In the fifth embodiment, as in the first embodiment, whether or not a negative film image is sensed can be detected in such a manner that color difference component signals input from the terminals 108 and 109 are monitored by the camera control circuit 105 to check if the R-Y component falls within the determination range 202 (FIG. 12) and the B-Y component falls within the determination range 203 (FIG. 12).

Figure 17:
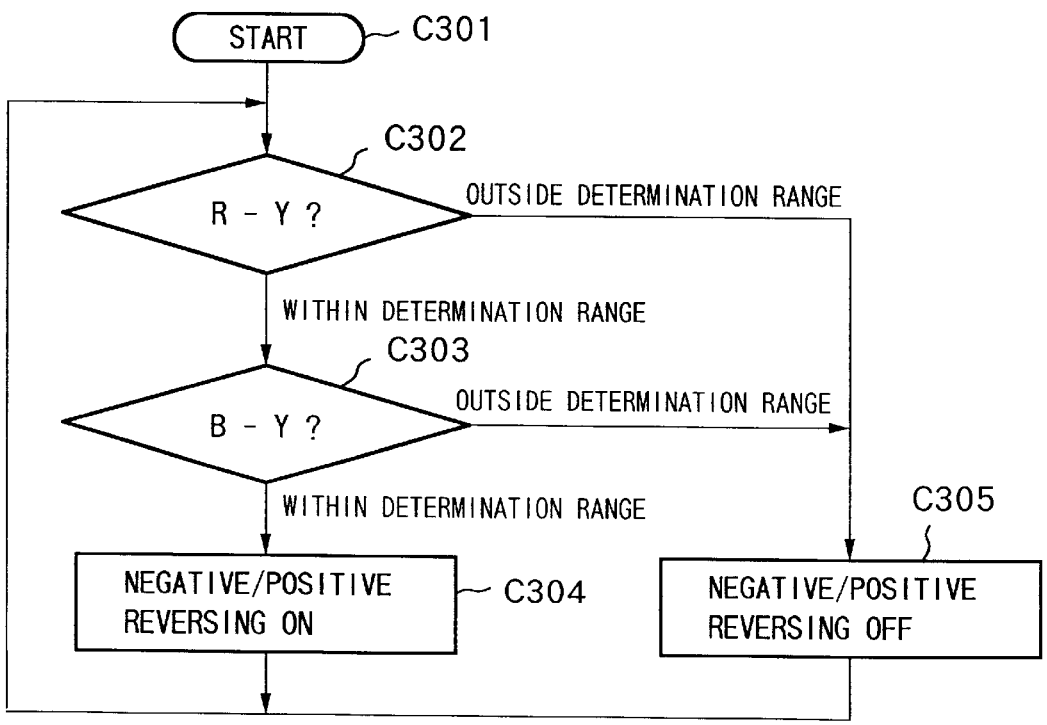
FIG. 17 is a flow chart showing operation according to the first embodiment of the present invention.

FIG. 17 is a flow chart showing the control sequence for determining whether or not negative/positive reversing must be done.

That is, FIG. 17 is a flow chart for detecting attachment of the film adapter and automatically setting the camera in the film image sensing mode in the camera control circuit 105.

When execution of the processing starts in step C301, it is checked in step C302 if a signal R-Y input from the integrator 104 via the terminal 109 falls within the determination range 202. If the signal R-Y falls outside the determination range 202, the camera is set in the moving image mode in step C305. More specifically, the image memory 511 is set in a through state, and the camera control circuit 105 supplies a control signal 512 to the negative/positive reversing circuit 513 to disable the negative/positive reversing function so as not to execute negative/positive reversing.

On the other hand, if it is determined in step C302 that the signal R-Y falls within the determination range 202, it is checked in step C303 if a signal B-Y input from the integrator 103 via the terminal 108 falls within the determination range 203. If the signal B-Y falls outside the determination range 203, the flow advances to step C305 in the same manner as described above. On the other hand, if it is determined in step C303 that the signal B-Y falls within the determination range 203, the camera is set in the film adapter mode, i.e., film image sensing mode, in step C304. That is, the camera stands by to capture a still image into the image memory 511 when the trigger switch is turned on, and the camera control circuit 105 supplies the control signal 512 to the negative/positive reversing circuit 513 to enable the negative/positive reversing function so as to execute negative positive reversing.

Conventionally, the operator must manually select the "operation of the negative/positive reversing function" using a predetermined switch (e.g., 1103 in FIG. 8) in the switch panel 420. However, when the circuit is arranged and controlled like in the fifth embodiment, the video built-in type camera can be automatically set in the film image sensing mode and enable the negative/positive reversing function when a negative film image is sensed. Hence, even when a negative film image is to be captured in the moving image mode which remains set immediately after normal video image sensing, a photographic film capture mode can be automatically and smoothly selected by only attaching the film adapter. Also, an image can be prevented from being reversed when a slide film (positive film) is set or in a normal video image sensing mode.

<Sixth Embodiment>

In the fifth embodiment, whether or not a negative film is set in the adapter is determined based on color difference signals alone. Hence, the color difference signals may vary depending on the types of films or the state of images printed on a film, and determination errors may be produced. The sixth embodiment has as its principal object to prevent determination errors in the fifth embodiment.

Figure 18:
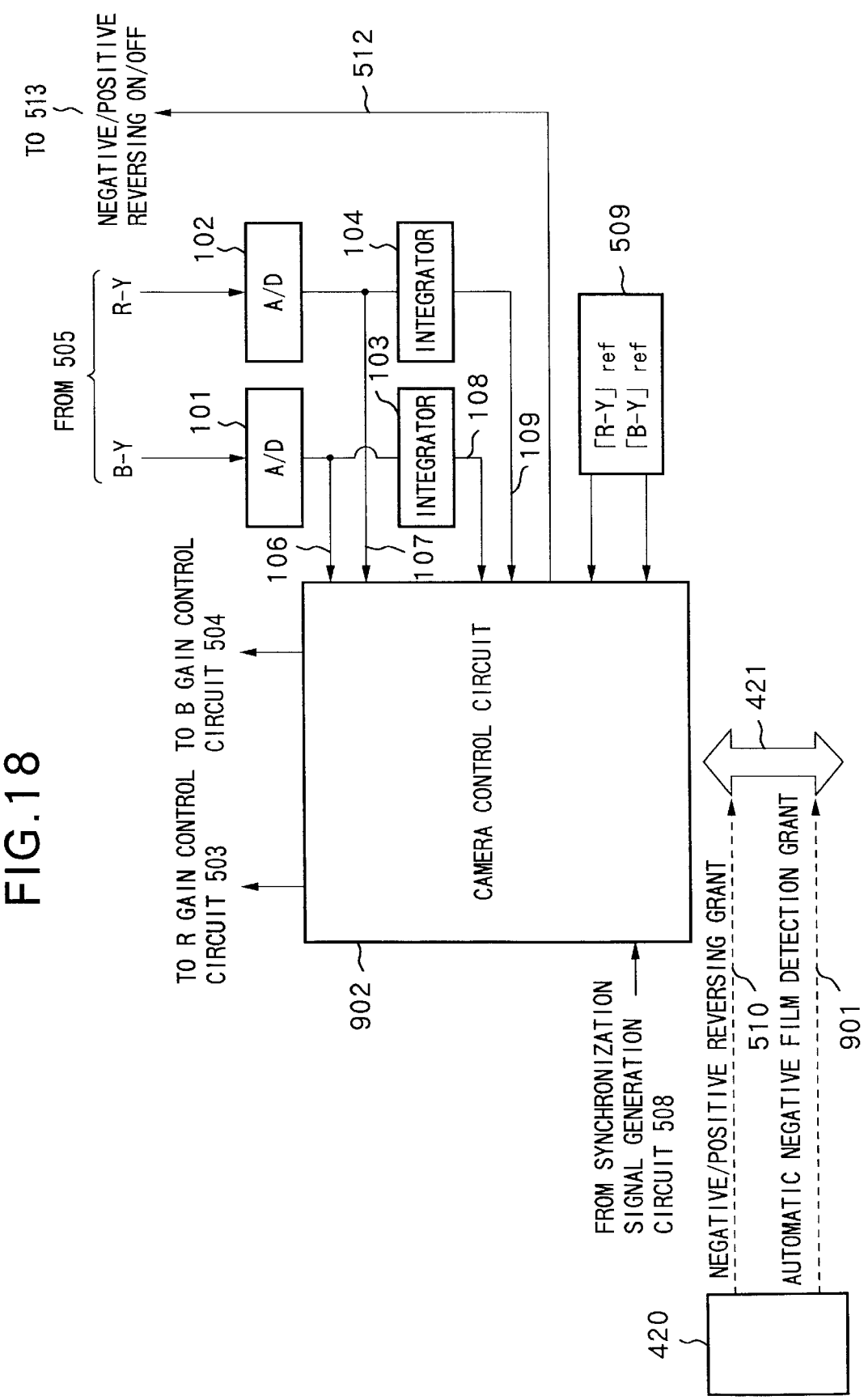
FIG. 18 is a block diagram showing the circuit arrangement of principal part according to the sixth embodiment of the present invention.

FIG. 18 is a block diagram showing the circuit arrangement of a camera control circuit 902 and its peripheral circuits in the camera signal processing circuit 409 in the sixth embodiment. The difference from the camera (FIG. 11) of the fifth embodiment is that negative film automatic determination grant information 901 and negative/positive reversing grant information 510 are transmitted via the communication line 421. Both the negative film automatic determination grant signal 901 and negative/positive reversing grant signal 510 are generated in practice based on the states of predetermined switches in the switch panel 420. More specifically, when the user operates such predetermined switches, if the negative film automatic determination grant signal 901 is "1", the user has given a grant to the camera itself to do negative film automatic determination; if the negative/positive reversing grant signal 510 is "1", the user himself or herself has given a grant to the camera to do automatic negative/positive reversing on the basis of the negative film automatic determination result.

As the characteristic feature of the sixth embodiment, the operator can select whether an automatic negative film image sensing determination function is ON/OFF, so as not to produce detection errors of the automatic negative/positive image sensing determination function described in the fifth embodiment. If the automatic determination is disabled, negative/positive reversing can be forcibly done. Such detection errors of the automatic negative film image sensing determination function are often produced when a subject image having color difference vectors similar to those of a negative film is sensed.

Figure 19:
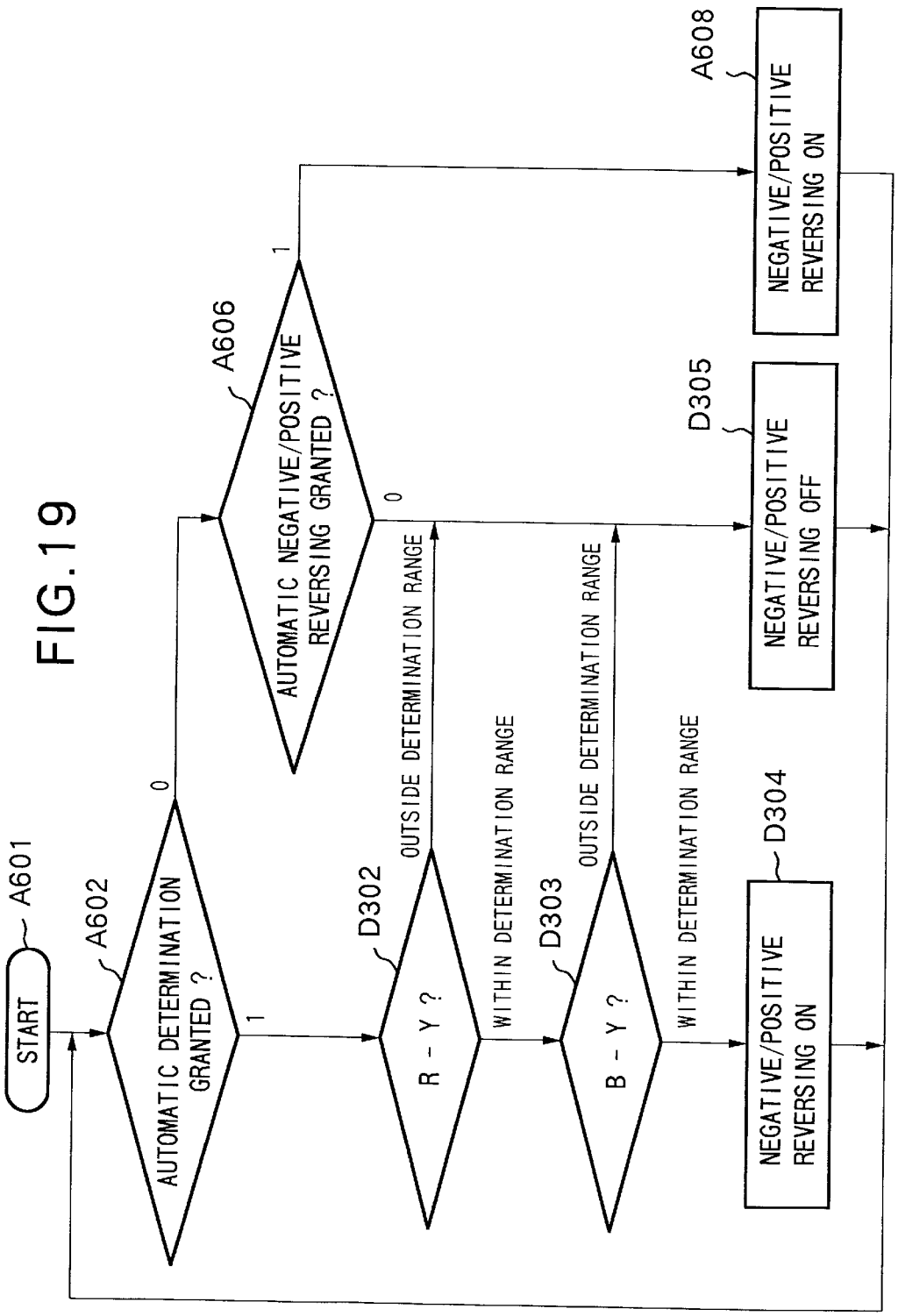
FIG. 19 is a flow chart showing the processing according to the sixth embodiment of the present invention.

FIG. 19 is a flow chart showing the processing in the camera control circuit 902 in the arrangement shown in FIG. 18. Note that the contents of steps D302 to D305 in FIG. 19 are the same as those in steps C302 to C305 in the fifth embodiment (FIG. 17).

In FIG. 19, when execution of the processing starts in step A601, it is checked in step A602 based on the grant signal 901 if the automatic negative film image sensing determination function is to be enabled. If the automatic negative film image sensing determination function is to be enabled (ON), the flow advances to step D302 to check if a signal R-Y input via the terminal 109 falls with the determination range 202 (FIG. 12). If the signal R-Y falls outside the determination range 202, the camera control circuit 902 supplies a control signal 512 to the negative/positive reversing circuit 513 to disable the negative/positive reversing function so as not to execute negative/positive reversing, in step S305.

On the other hand, if it is determined in step D302 that the signal R-Y falls within the determination range 202, it is checked in step D303 if a signal B-Y input from the integrator 103 via the terminal 108 falls within the determination range 203. If the signal B-Y falls outside the determination range 203, the flow advances to step D305 to disable the negative/positive reversing function of the negative/positive reversing circuit 513.

On the other hand, if it is determined in step D303 that the signal B-Y falls within the determination range 203, the camera is set in the film image sensing mode and the negative/positive reversing function of the negative/positive reversing circuit 513 is enabled by the control signal 512 from the camera control circuit 902, in step D304.

If it is determined in step A602 that the automatic negative film image sensing determination function is disabled, it is determined in step A606 based on the negative/positive reversing grant signal 510 if the operator has selected execution of negative/positive reversing. If negative/positive reversing has been granted, the negative/positive reversing function is enabled by the negative/positive reversing ON/OFF control signal 512 from the camera control circuit 902 in step A608.

If it is determined in step A606 that the negative/positive reversing is denied, the negative/positive reversing function is disabled by the negative/positive reversing ON/OFF control signal 512 from the camera control circuit 902 in step D305. The table below summarizes the control sequence shown in FIG. 19.

TABLE

|  |  | Grant To Do Automatic Negative/Positive Reversing | |
|---|---|---|---|
|  |  | "1" | "0" |
| Grant To Do Automatic Negative Film Determination | "1" | Depending on R-Y and B-Y | ON |
|  | "0" | Depending on R-Y and B-Y | OFF |

With the above-mentioned circuit arrangement, the video built-in camera allows the operator to select the ON/OFF state of the automatic negative film image sensing determination function so as to prevent its detection errors and the like from being produced, and also allows the operator to select whether or not negative/positive reversing is to be executed when automatic determination is disabled.

<Seventh Embodiment>

Figure 20:
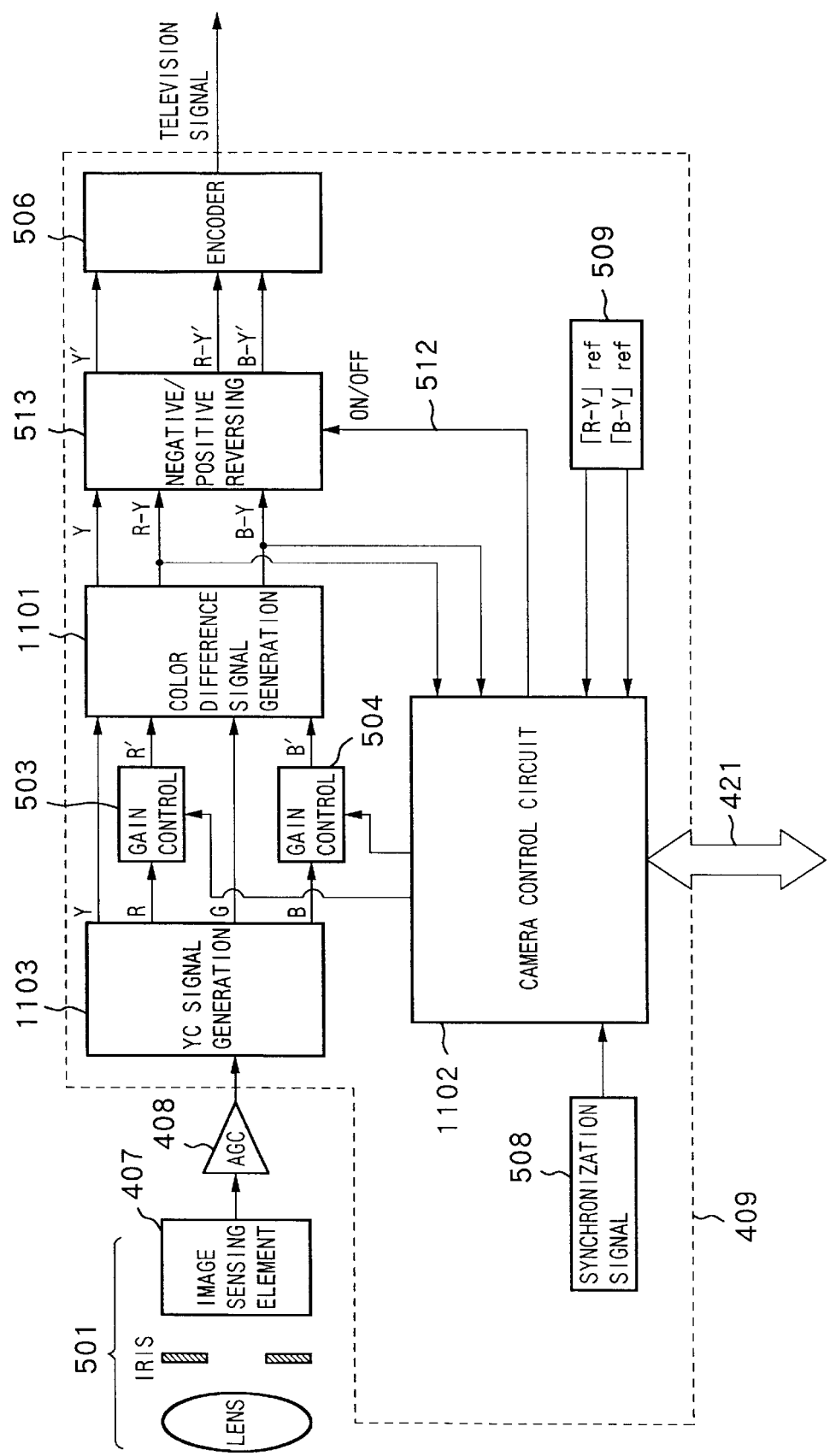
FIG. 20 is a block diagram showing the circuit arrangement of principal part according to the seventh embodiment of the present invention.

FIG. 20 is a block diagram showing the arrangement according to the seventh embodiment of the present invention. The difference from the first embodiment (FIG. 9) is that a YC signal generation circuit 1103 generates three primary color signals R, G, and B.

The R and B signals output from the YCsignal generation circuit 1103 of the fifth embodiment are input to a color difference signal generation circuit 1101 via the gain control circuits 503 and 504. The color difference signal generation circuit 1101 covert R, G, and Bsignals into signals Y, R-Y, and B-Y using known conversion formulas, i.e., those described in Nihon Hoso Kyokai ed., "NHK color television textbook (Vol. 1)", p. 28, formulas (2.1):

$Y = 0.30R + 0.59G + 0.11B$ $R-Y = 0.70R - 0.59G - 0.11B$ $B-Y = -0.30R - 0.59G + 0.89B$

Since the circuit arrangement of that portion is known to those who are skilled in the art, a detailed description thereof will be omitted. Of the output signals from the color difference signal generation circuit 1101, the signals R-Y and B-Y are input to a camera control circuit 1102.

When a microcomputer is used as the camera control circuit 1102 as in the above embodiments, the peripheral circuits of the camera control circuit 1102 have the same arrangement as that shown in FIG. 11. When the camera control circuit 1102 comprises a microcomputer, the sequence of the processing executed by the camera control circuit 1102 is the same as that shown in the flow chart in FIG. 17 or 19.

<Eighth Embodiment>

Figure 21:
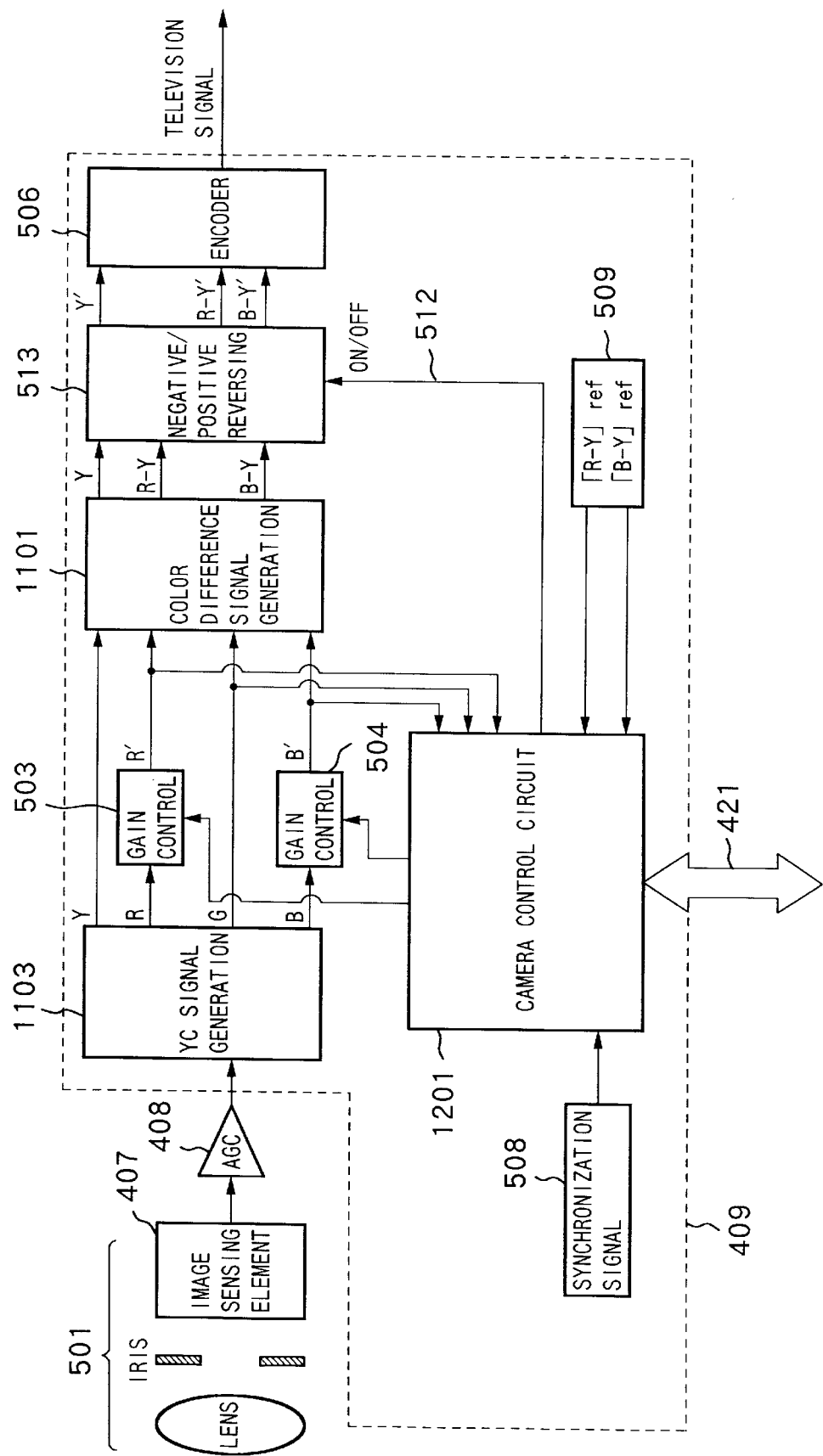
FIG. 21 is a block diagram showing the circuit arrangement of principal part according to the eighth embodiment of the present invention.

FIG. 21 is a block diagram showing the arrangement of the eighth embodiment according to the present invention. In FIG. 21, the same reference numerals denote blocks having the same functions as those in FIG. 9 (first embodiment), FIG. 20 (seventh embodiment), and the like, and a detailed description thereof will be omitted.

The eighth embodiment is characterized in that R, G, and Bsignals output from the YCsignal generation circuit 1103 are input to and processed by a camera control circuit 1201 before they are converted into color difference signals by the color difference signal generation circuit 1101 in FIG. 21.

Figure 22:
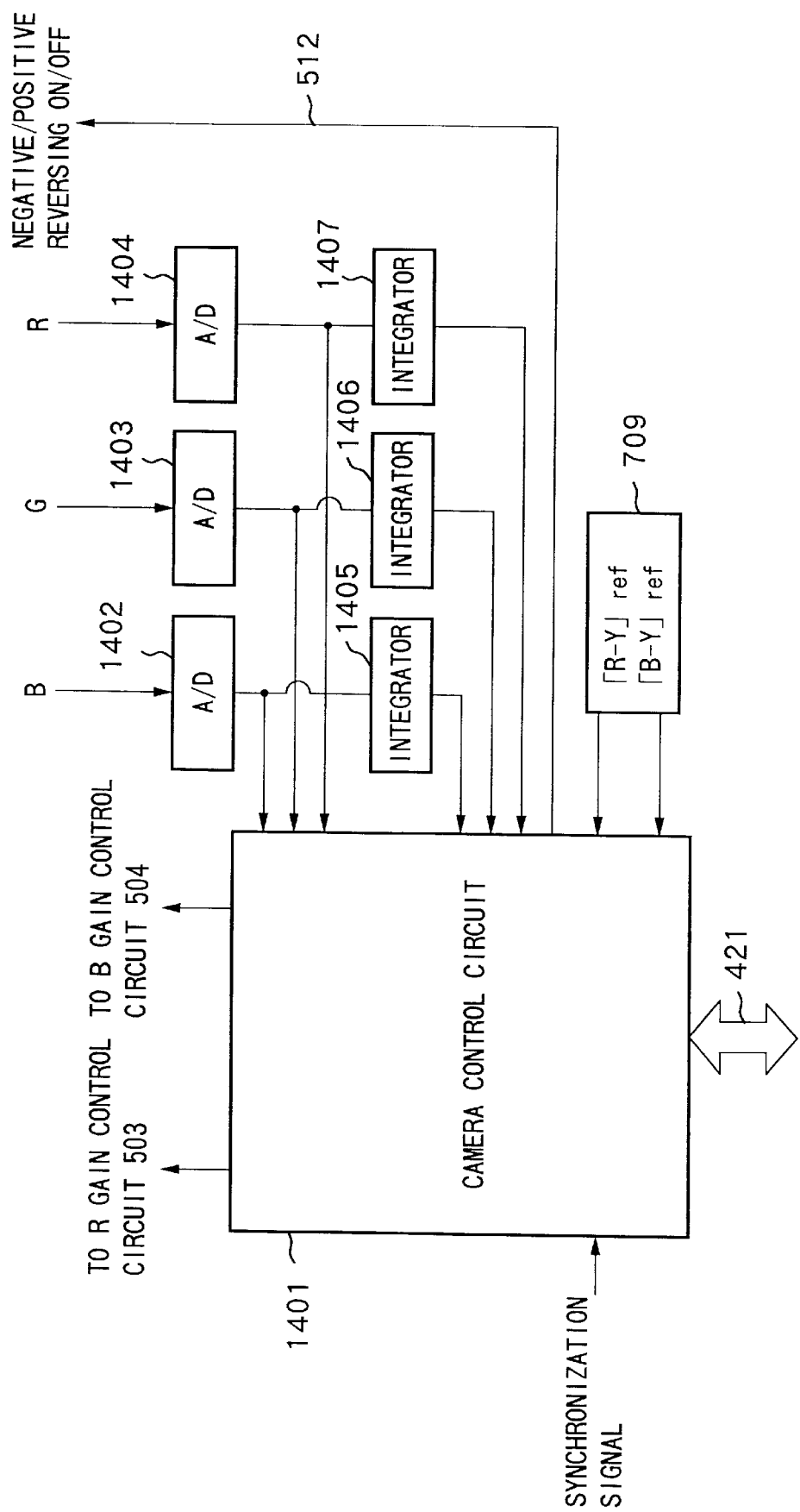
FIG. 22 is a block diagram showing the eighth embodiment of the present invention implemented by a microcomputer.

When the camera control circuit 1201 comprises a microcomputer, the circuit arrangement of its peripheral circuits is as shown in FIG. 22. That is, R, G, and B signals are respectively A/D-converted by A/D converters 1404, 1403, and 1402, and the digital signals are then integrated by integrators 1407, 1406, and 1405. These integral results are input to a microcomputer 1401 (1201). The basic concept is the same as that in FIG. 11.

Figure 23:
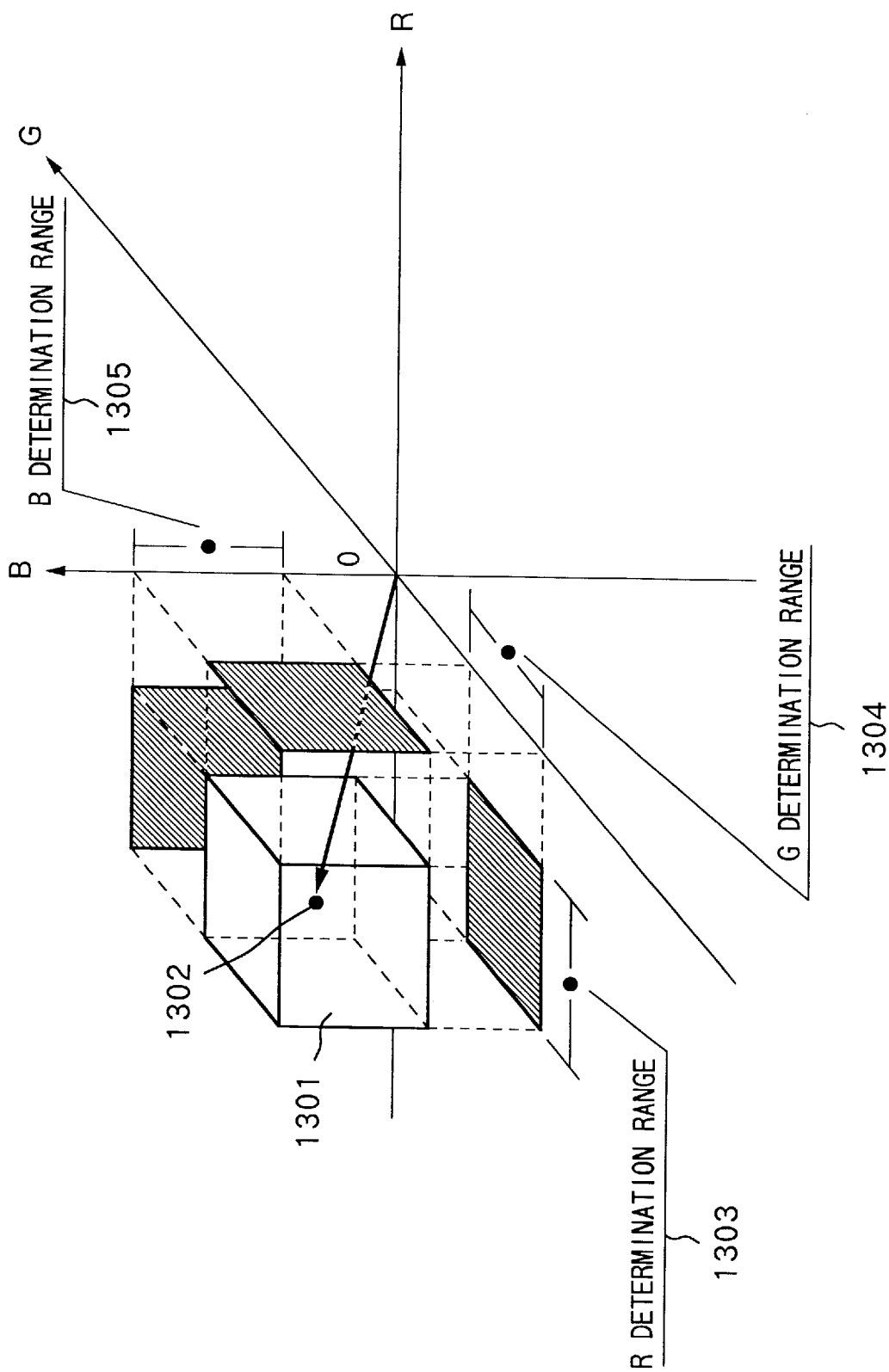
FIG. 23 is a graph showing a determination region in the eighth embodiment.

When it is determined based on three primary color signals R, G, and B whether or not a negative film image is sensed, it is checked if a vector 1302 of a color synthesized based on the levels of the three primary color signals is present within a region 1301 bounded by R, G, and B determination ranges 1303, 1304, and 1305, as shown in FIG. 23.

Figure 24:
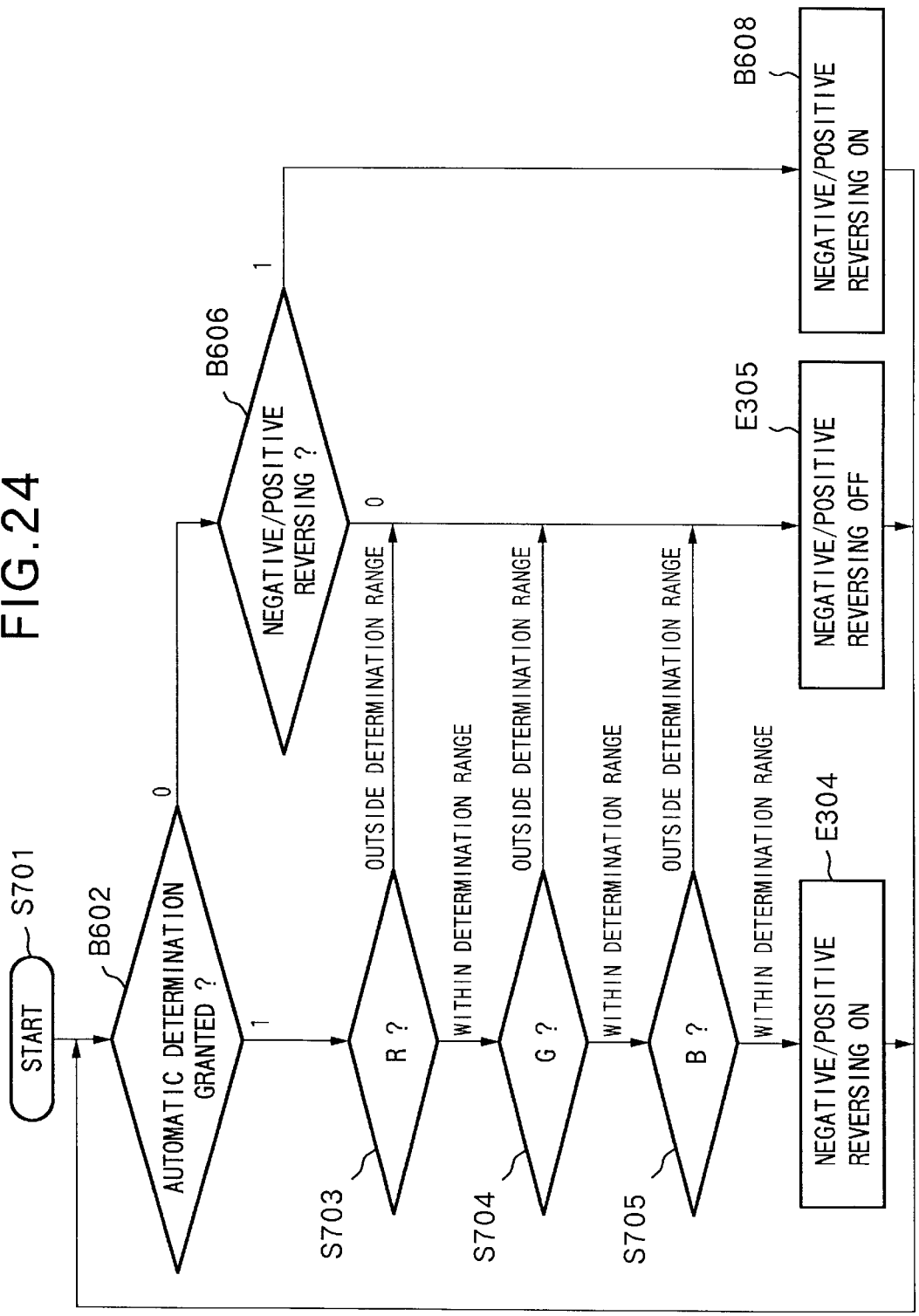
FIG. 24 is a flow chart showing the processing according to the eighth embodiment of the present invention.

FIG. 24 is a flow chart showing the processing of the above-mentioned method implemented by the internal processing of the camera control circuit 1201 (1401), and this processing is obtained by partially modifying that shown in the flow chart of FIG. 19. Note that steps B602, B606, and B608 in FIG. 24 are substantially the same as steps A602, A606, and A608 in FIG. 19, and steps E304 and E305 are the same as steps D304 and D305.

When the processing starts in step S701, it is checked based on the automatic negative film image sensing determination grant signal 901 if the automatic negative film image sensing determination function is to be enabled.

If the automatic negative film image sensing determination function is to be enabled, the flow advances to step S703 and the subsequent steps. If it is determined in step S703, S704, or S705 that the input signal falls outside the R, G or B determination range, the flow advances to step E305, and a negative/positive reversing OFF signal is output onto the control line 512 to disable the negative/positive reversing function.

On the other hand, if it is determined in step S703, S704, and S705 that the input signal falls within the R, G, and B determination ranges, the flow advances to step E304, and a negative/positive reversing ON signal is output onto the control line 512 to enable the negative/positive reversing function.

If it is determined in step B602 that the automatic negative film image sensing determination function is to be disabled, whether or not the operator has selected execution of negative/positive reversing is checked based on the negative/positive reversing ON/OFF signal 510 in step B606.

If negative/positive reversing is to be executed, a signal on the control line 512 is set in the ON state to execute negative/positive reversing in step B608; otherwise, a signal on the control line 512 is set in the OFF state in step E305.

With the above-mentioned arrangement, automatic determination of negative film image sensing and automatic ON/OFF control of the negative/positive reversing function can be done using three primary color signals R, G, and B.

<Ninth Embodiment>

Figure 25:
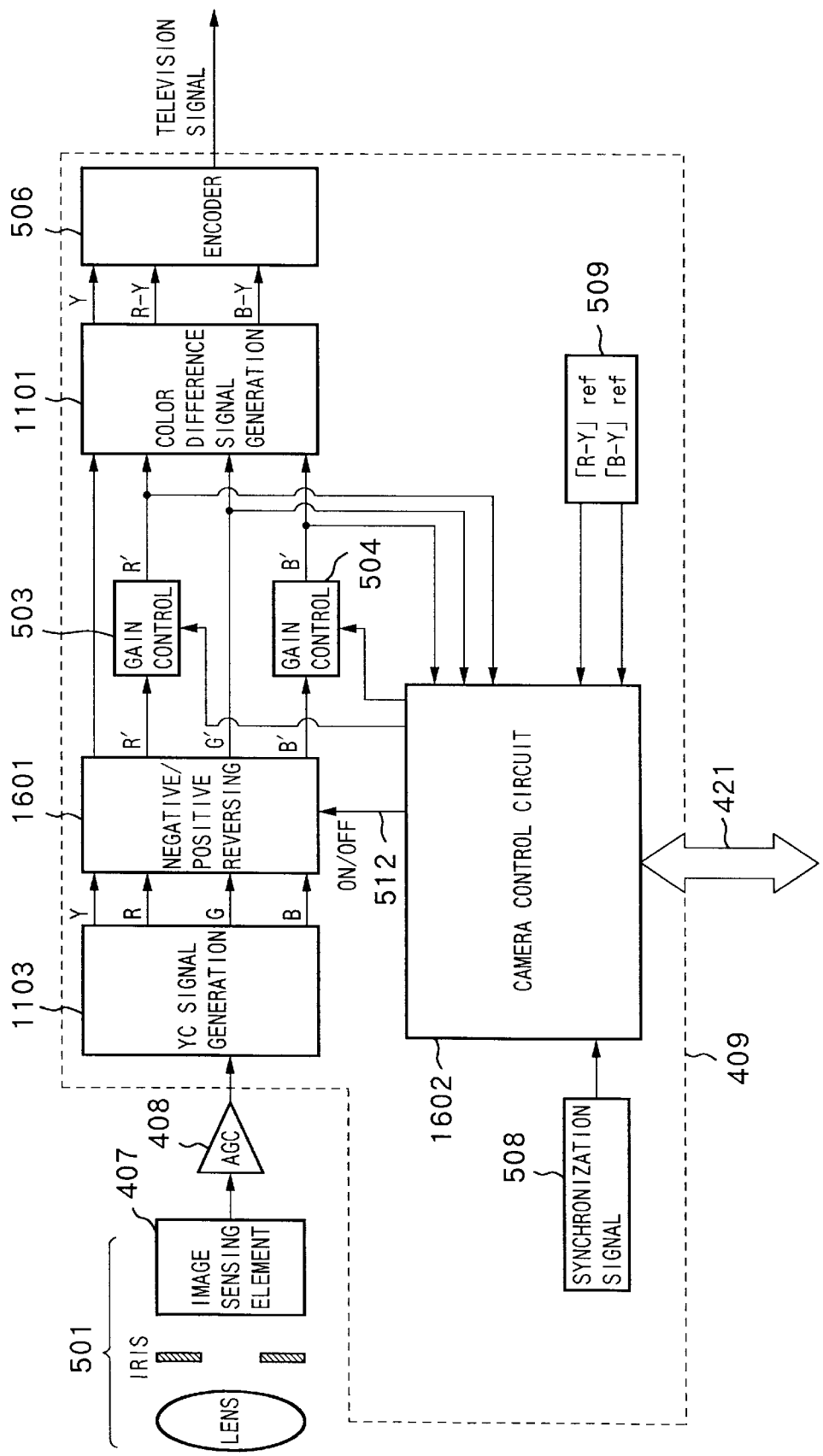
FIG. 25 is a block diagram showing the circuit arrangement of principal part according to the ninth embodiment of the present invention.

FIG. 25 is a block diagram showing the arrangement according to the ninth embodiment of the present invention. In FIG. 25, the same reference numerals denote blocks having the same functions as those in FIGS. 20 and 21, and the like, and a detailed description thereof will be omitted.

The arrangement shown in FIG. 25 is characterized in that Y, R, G, and Bsignals output from the YC signal generation circuit 502 are input to a negative/positive reversing circuit 1601 to reverse an image before they are input to a camera control circuit 1602, and negative-to-positive reversed signals are input to the camera control circuit 1602.

Figure 26:
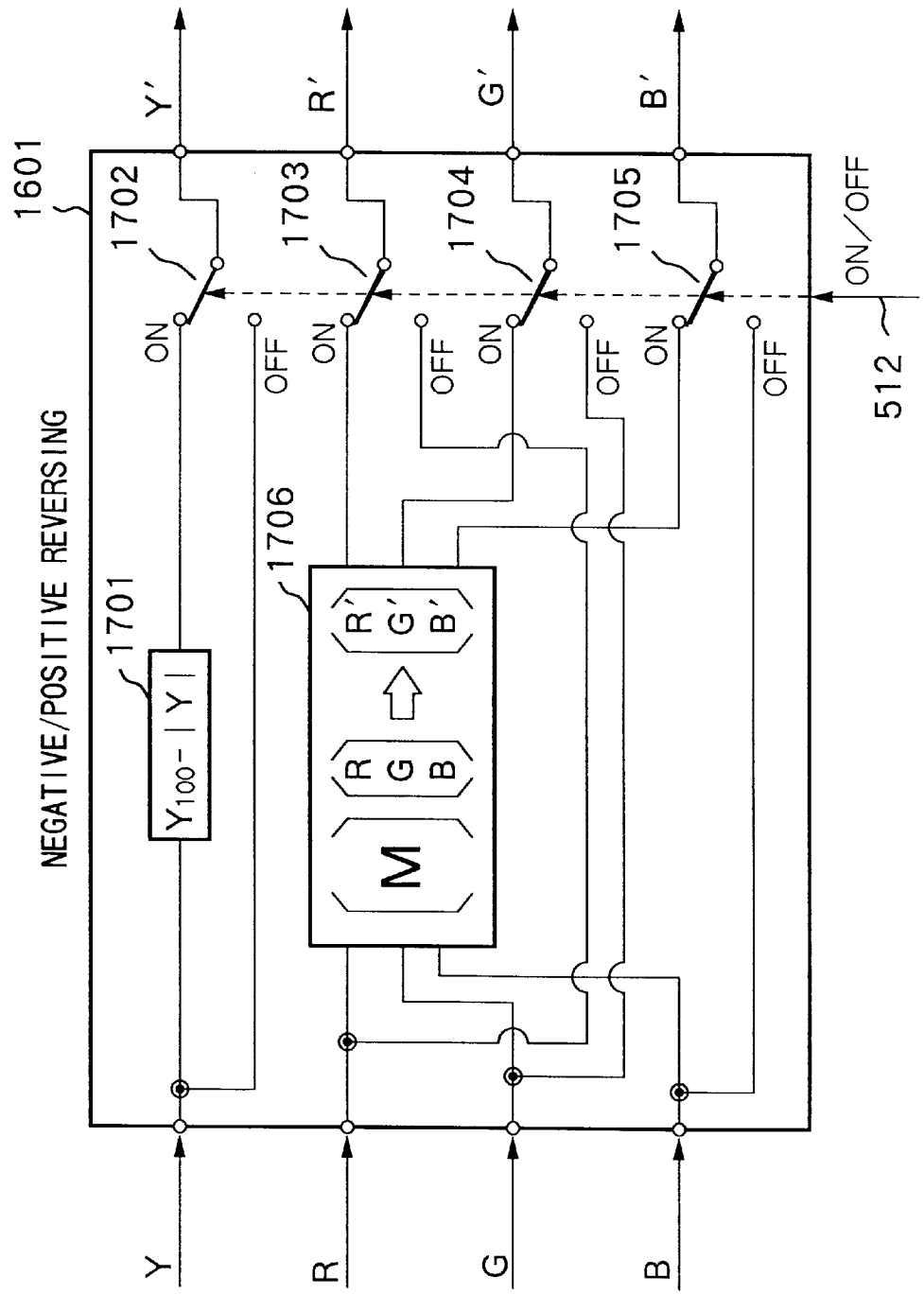
FIG. 26 is a block diagram showing the internal circuit arrangement of principal blocks of a negative/positive reversing circuit according to the ninth embodiment of the present invention.

FIG. 26 is a schematic diagram showing the internal arrangement of the negative/positive reversing circuit 1601. The negative/positive reversing circuit 1601 has the same purpose as that shown in FIG. 10 (first embodiment). As for a luminance signal Y, the negative/positive reversing circuit 1601 has the same arrangement as that of the circuit 513.

R, G, and B signals are supplied to a conversion matrix circuit 1706, and are converted into reversed three primary color signals R', G', and B' by a conversion matrix (M).

As in FIG. 10, switches 1702, 1703, 1704, and 1705 are respectively connected to the signals Y', R', G', and B' so that whether to execute negative/positive reversing can be selected on the basis of a negative/positive reversing function ON/OFF signal.

When the camera control circuit 1602 comprises a microcomputer, the arrangement of its peripheral circuits is as shown in FIG. 22, as in the fourth embodiment.

Figure 27:
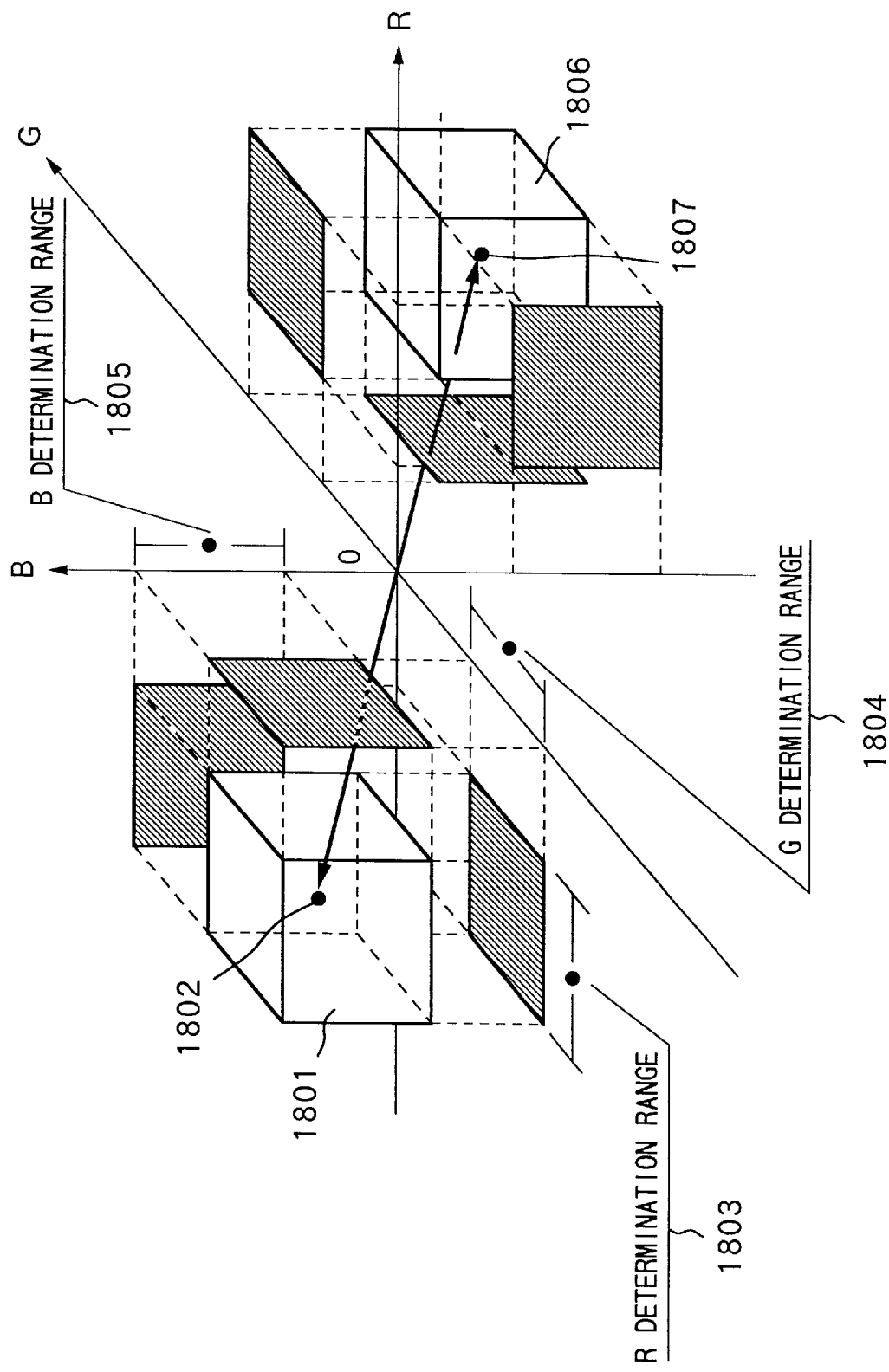
FIG. 27 is a graph showing the principle of automatic negative/positive determination used in the ninth embodiment.

FIG. 27 shows the concept of a color vector defined by the R', G', and B' signal levels before and after executing the negative/positive reversing function, and does not necessarily match an actual signal level distribution. In FIG. 27, a color vector 1802 before negative/positive reversing moves to, e.g., the position of a vector 1807 after negative/positive reversing, which is located outside a negative film image sensing determination region 1801.

Figure 28:
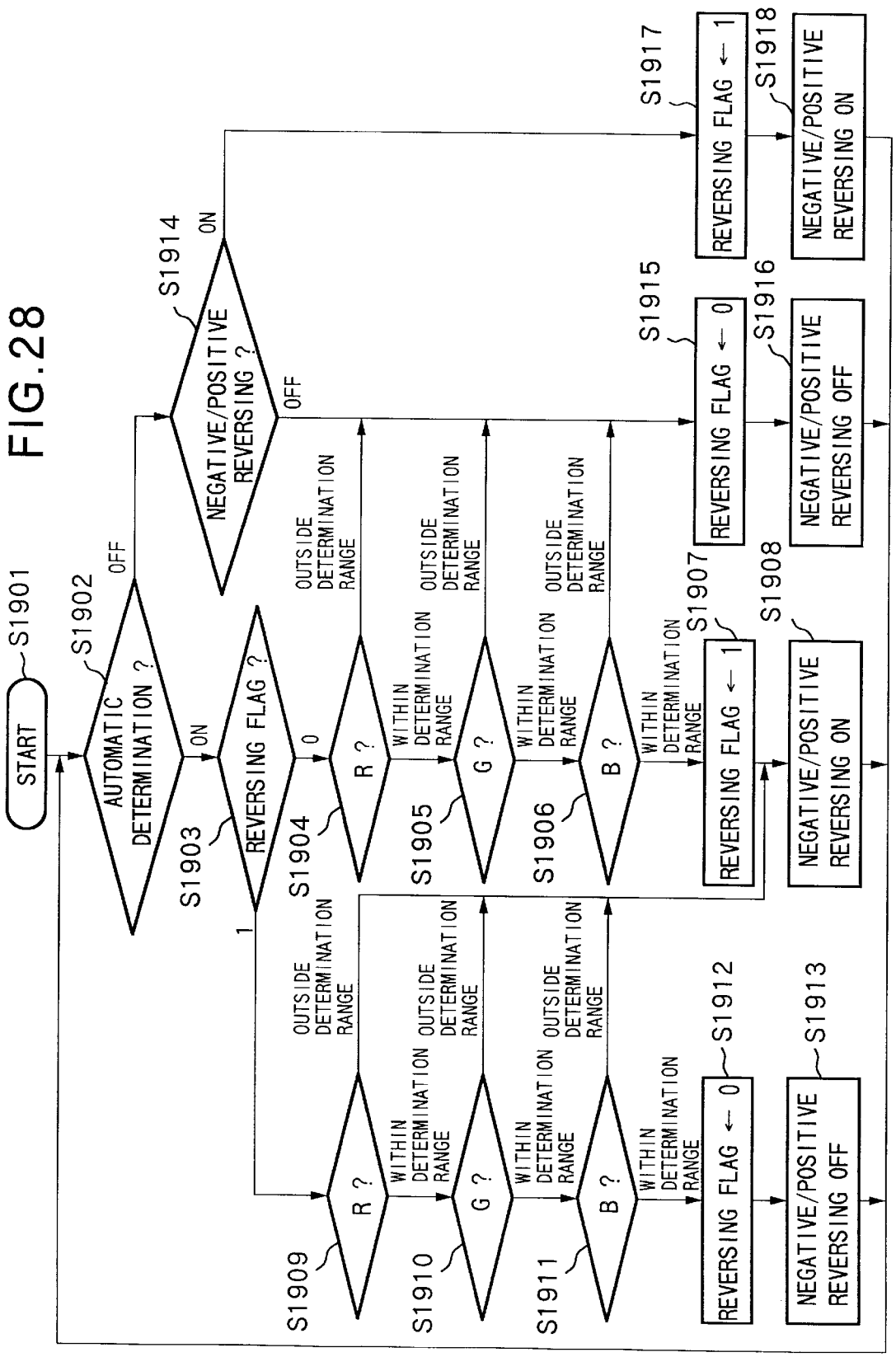
FIG. 28 is a flow chart showing the processing according to the ninth embodiment of the present invention.

FIG. 28 is a flow chart showing the internal processing of the camera control circuit 1602 when it comprises a microcomputer. This processing is obtained by modifying the processing shown in FIG. 19.

When the processing starts in step S1901, it is checked in step S1902 based on the information of an automatic negative film image sensing detection ON/OFF signal if the automatic negative film image sensing determination function is to be enabled. If the automatic negative film image sensing determination function is to be enabled, the flow advances to step S1903 to check the status of a "reversing flag" indicating whether or not negative/positive reversing has already been done. If the reversing flag is 0, the image has not been reversed yet. Hence, if it is determined in step S1904, S1905, or S1906 that the input signal falls outside the R, G, or B determination range, the reversing flag is set at 0 in step S1915. Thereafter, the flow advances to step S1916, and a negative/positive reversing OFF signal is output onto the control line 512 to disable the negative/positive reversing function.

If it is determined in steps S1904, S1905, and S1906 that the input signal falls inside the R, G, and B determination ranges, the reversing flag is set at 1 in step S1907 to indicate that the image has already been reversed. Thereafter, the flow advances to step S1908, and a negative/positive reversing ON signal is output onto the control line 512 to enable the negative/positive reversing function.

If it is determined in step S1903 that the reversing flag is 1, a negative image has already been reversed to a positive image, and a color vector defined by R', G', and B' signals input to the camera control circuit 1602 falls outside the determination region 1802 in FIG. 27, e.g., within a region 1807. Hence, if it is determined in step S1909, S1910, or S1911 that the input signal falls outside the R, G, or B determination range, it is determined that a negative film image is sensed.

Therefore, the flow advances to step S1908 to keep outputting a negative/positive reversing ON signal onto the control line 512. On the other hand, if it is determined in steps S1909, S1910, and S1911 that the input signal falls inside the R, G, and B determination ranges, it is determined that a negative film image is not sensed, but a normal image is reversed and a color vector is present inside the region 1802. Accordingly, the reversing flag is set at 0 in step S1912. Thereafter, the flow advances to step S1913 and a negative/positive reversing OFF signal is output onto the control line 512 to disable the negative/positive reversing function.

If it is determined in step S1902 that the automatic negative film image sensing determination function is disabled, whether or not the operator has selected execution of negative/positive reversing is checked based on the information of a negative/positive reversing ON/OFF signal 510 in step S1914.

If negative/positive reversing is to be executed, the reversing flag is set at 1 in step S1917, and a signal on the control line 512 is set in the ON state to execute positive/negative reversing in step S1914. Otherwise, the reversing flag is set at 0 in step S1915, and a signal on the control line 512 is set in the OFF state in step S1915.

With the above-mentioned arrangement, automatic determination of negative film image sensing and automatic ON/OFF control of the negative/positive reversing function can be done using R, G, and B signals output from the negative/positive reversing circuit.

<10th Embodiment>

In the 10th embodiment, whether or not the still image sensing mode is selected is checked based on color difference signals, and negative/positive reversing is done when the still image sensing mode is selected.

Figure 29:
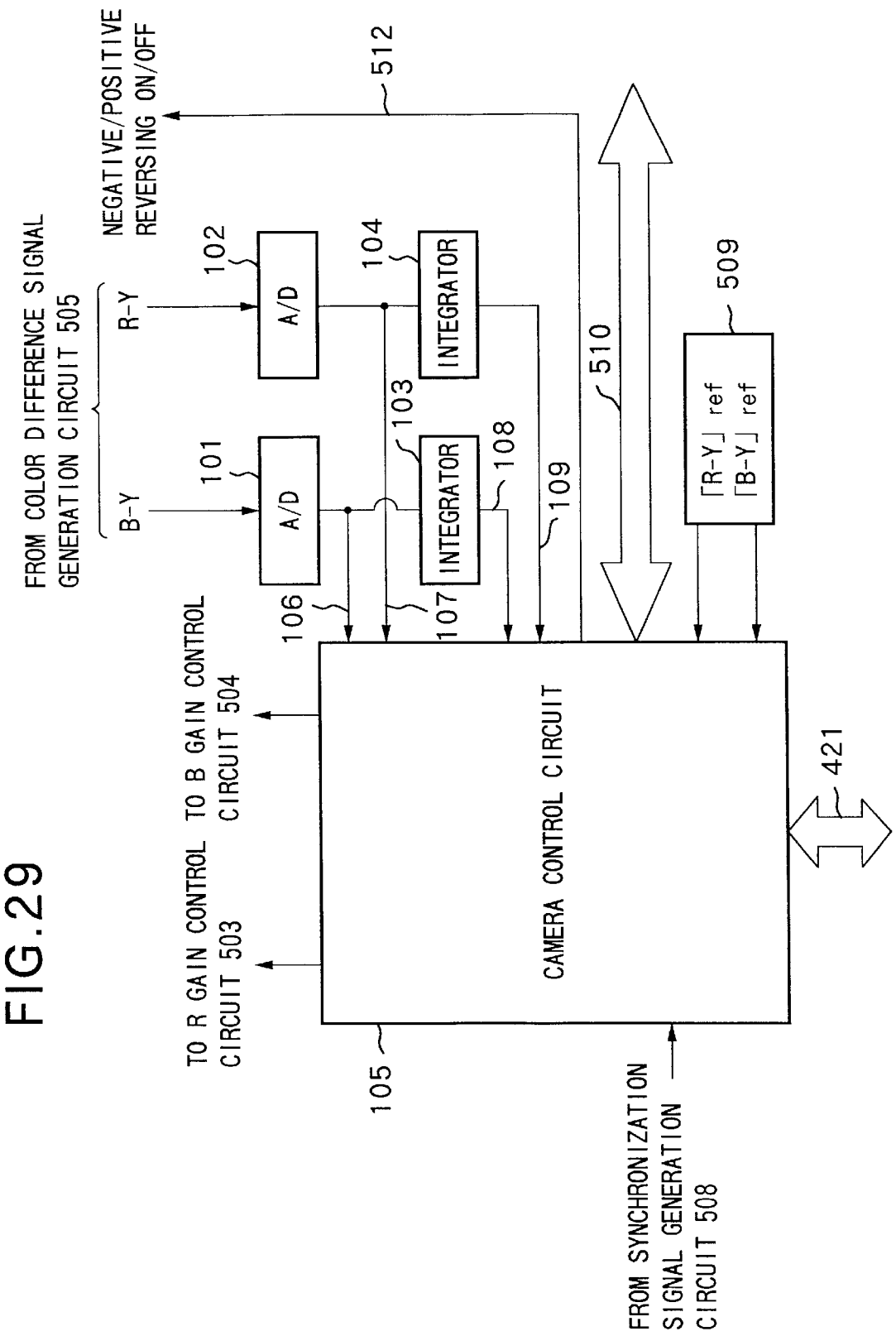
FIG. 29 is a block diagram showing a circuit arrangement common to the individual embodiments of an image sensing apparatus according to the present invention.

FIG. 29 shows the arrangement of the camera control circuit 105 and its peripheral circuits according to the 10th embodiment, which are the same as those in the first embodiment (FIG. 11).

Figure 30:
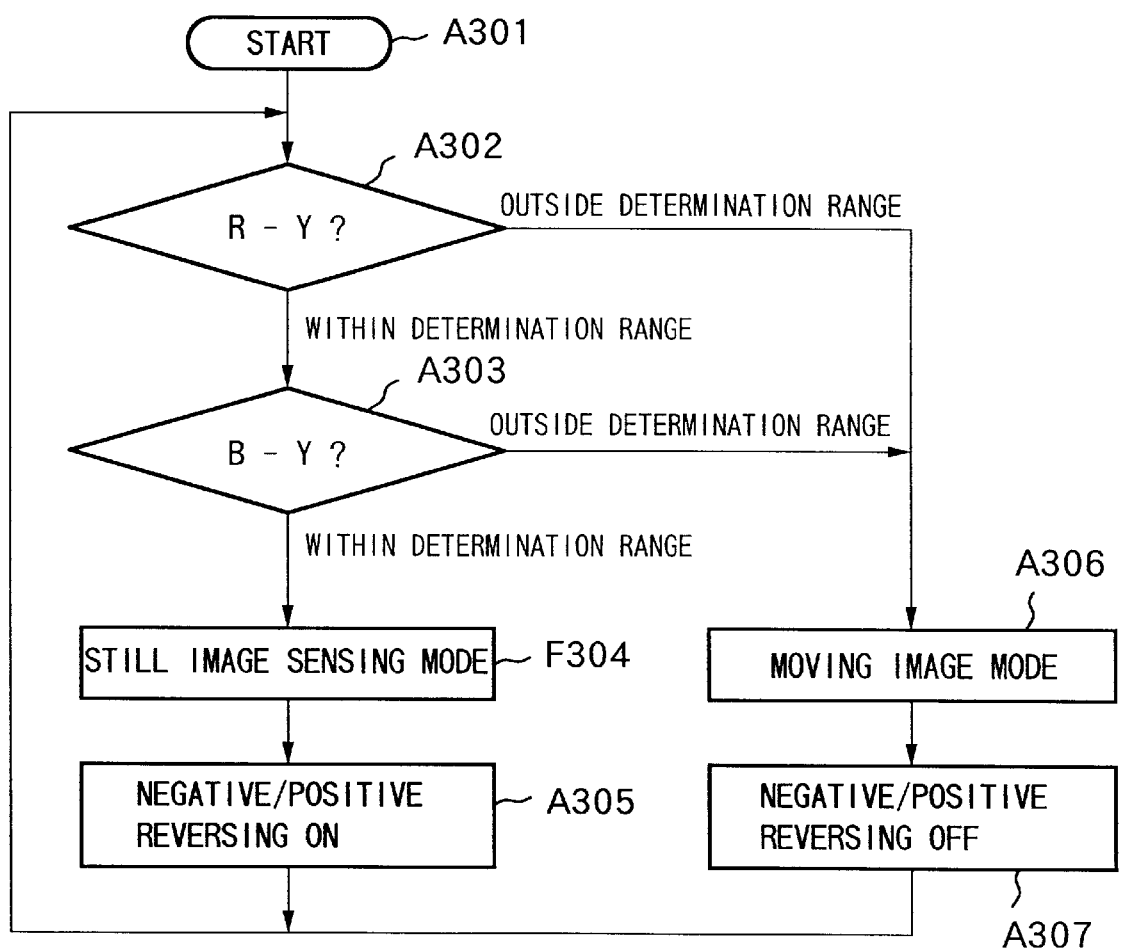
FIG. 30 is a flow chart showing operation according to the 10th embodiment of the present invention.

FIG. 30 is a flow chart showing the control sequence of the 10 th embodiment. The difference from the control sequence of the first embodiment (FIG. 13) is that the film image sensing mode is selected in step A304 in the first embodiment but in step F304 in the 10th embodiment.

In the still image sensing mode, a still image is captured onto the image memory 511 when the trigger switch 1102 is turned on, and negative/positive reversing is executed in step A305.

That is, in the 10 th embodiment, if it is detected that a negative film image is sensed, the still image sensing mode can be automatically set. In this embodiment, since this state corresponds to the attached state of the film adapter, a film image sensing mode is set.

In the "film image sensing mode" in the first embodiment and the like, the lens system is automatically set in a closeup image sensing state, and the negative/positive reversing function is enabled. On the other hand, in the "still image sensing mode" in the 10th embodiment, a setting state for sensing not a moving image but a still image (e.g., for broadening the dynamic range, and so on) is selected. With the above-mentioned arrangement and control of the circuits, even when the operator does not manually select a specific switch for executing the "operation" of the negative/positive reversing function", the video built-in type camera can be automatically set in the film image sensing mode and can enable the negative/positive reversing function only when he or she takes a picture of a negative film image.

Therefore, even when a negative film image is to be captured in the moving image mode, which is still set immediately after normal video image sensing, a photographic film capture mode can be smoothly set by only attaching the film adapter without requiring any complicated operations.

Note that the above-mentioned negative film automatic determination scheme is not limited to only one scheme, and negative film automatic determination may also be implemented by methods disclosed in Japanese Laid-Open Patent Nos. 61-218268 and 62-10967 assigned to the same assignee as the present invention.

<11th Embodiment>

In the 11th embodiment, whether or not the "still image sensing mode" is selected is determined on the basis of the lens position in the imaging plane in-focus state upon sensing a subject image in addition to the color difference signals as in the 10th embodiment.

Figure 31:
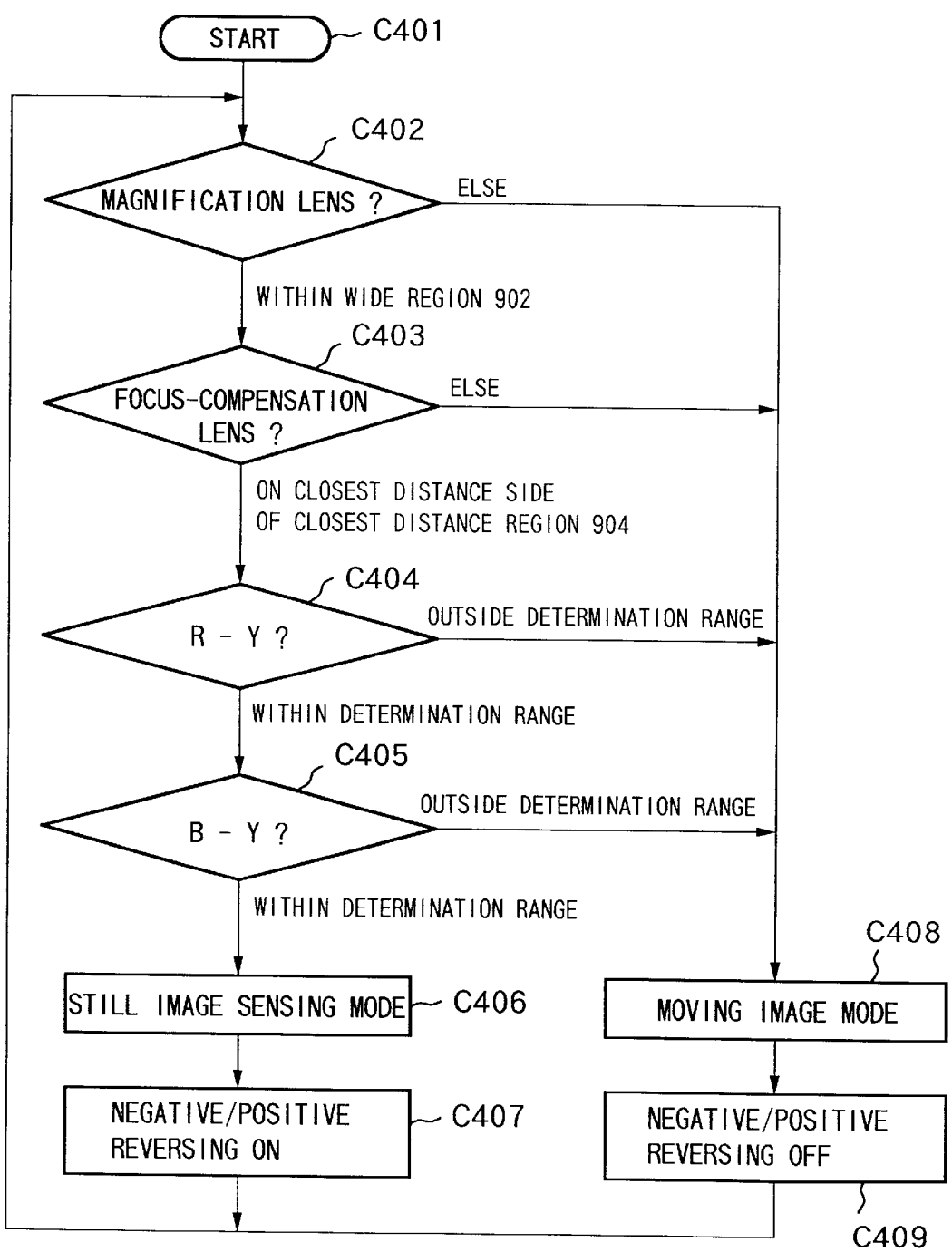
FIG. 31 is a flow chart showing operation according to the 11th embodiment of the present invention.

In the flow chart shown in FIG. 31, when execution of the processing starts in step C401, it is checked in step C402 if the magnification lens falls within the range of the wide region 902 in FIG. 7. If the magnification lens falls outside that range, the flow advances to steps C408 and C409 as in the first embodiment. In these steps, the camera is set in a state for sensing a normal subject image in the moving image mode, and the negative/positive reversing function is disabled.

If it is determined in step C402 that the magnification lens position falls within the range of the region 902, it is checked in step C403 if the focus-compensation lens position falls within the range on the closest-distance side of the curve 904 (the position condition of the focus-compensation lens changes depending on the position of the magnification lens). If the position of the focus-compensation lens falls outside that range, the processing in step C405 is executed in the same manner as described above.

If it is determined in step C403 that the position of the focus-compensation lens falls within the range 903 in FIG. 7, the states of color difference signals R-Y and B-Y are detected in steps C404 and C405 as in the third embodiment (FIG. 15). If the color difference vector falls within the range 202, it is determined that the film adapter is attached, and a photographic film image is sensed. Thus, the camera is set in the still image sensing mode and the negative/positive reversing function is enabled in steps C406 and C407. In this manner, an image captured onto the image memory 511 in the still image sensing mode is displayed. Since the negative/positive reversing function is enabled, the film image sensing mode is set.

As described above, since the state of the lens system is added as a determination condition, whether or not a photographic film image is sensed at the closest distance, i.e., using the film adapter can be clearly determined. Hence, the camera can be automatically switched to the still image sensing mode and negative film image sensing mode without any operation errors.

With the above-mentioned arrangement, when the film adapter is attached, the camera is automatically set in the still image sensing mode, i.e., the negative film image sensing mode, the operator is exempted from cumbersome operations, and the camera can prevent a negative film image from being captured into a personal computer in the moving image mode if the operator forgets to do required operations.

<12th Embodiment>

Figure 32:
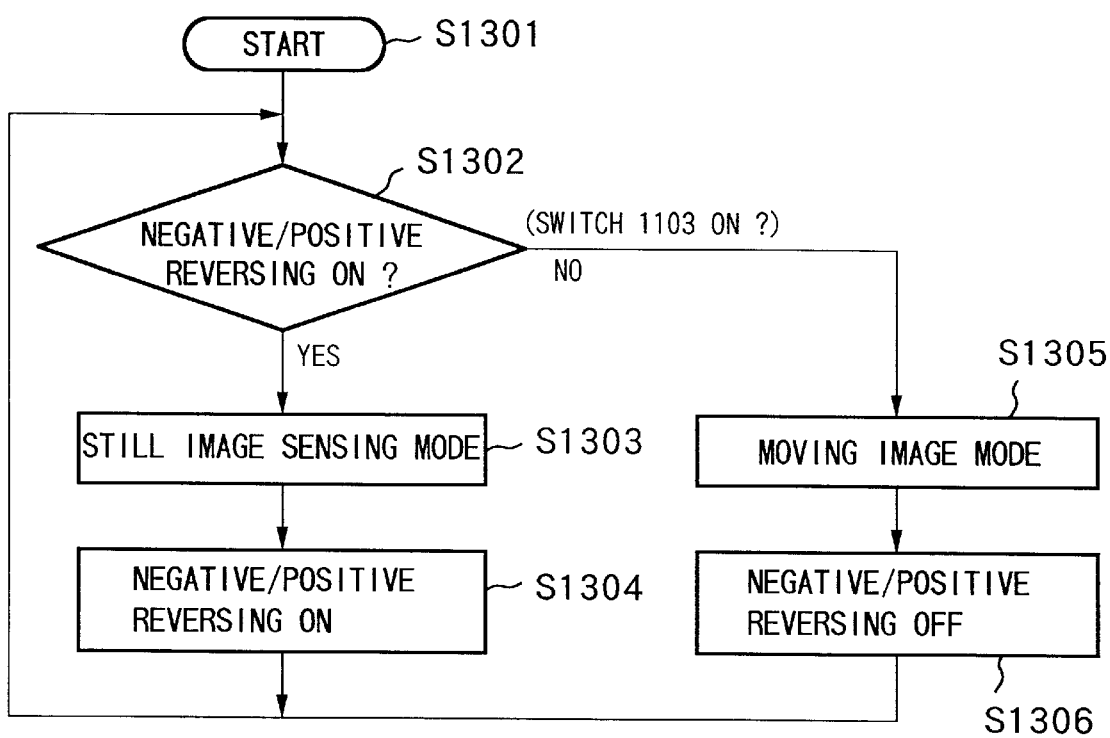
FIG. 32 is a flow chart showing operation according to the 12th embodiment of the present invention.

FIG. 32 is a flow chart showing the processing in a camera control circuit in a camera signal processing circuit according to the 12th embodiment of the present invention. The schematic arrangement of the overall camera of this embodiment is the same as that shown in FIG. 5, and the internal arrangement of the camera signal processing circuit is the same as that shown in FIG. 9.

The 12th embodiment has no automatic identification means of negative/positive film image sensing unlike in the 10th and 11th embodiments, and when the operator operates the switch 1103 to enable to the negative/positive reversing function, the camera is automatically switched to the still image mode.

This embodiment can be implemented by changing the processing in the camera control circuit 105 in the camera signal processing circuit 409. The schematic arrangement of the overall camera of this embodiment is the same as that shown in FIG. 5, and the internal arrangement of the camera signal processing circuit is the same as that shown in FIG. 9.

In FIG. 32, when execution of the processing starts in step S1301, it is checked in step S1302 if the operator has enabled the negative/positive reversing function. As described above, the communication lines 422 and 423 provide ON information of the negative/positive reversing function.

If it is determined in step S1302 that the negative/positive reversing function is ON, the camera is set in the still image mode, and a negative/positive reversing ON signal is output to the negative/positive reversing circuit 513 via the signal line 512 to enable the negative/positive reversing function, in steps S1303 and S1304. In this manner, a positive image obtained by converting a negative film image can be displayed or recorded.

If it is determined in step S1302 that the negative/positive reversing function is OFF, the camera is set in the moving image mode, and a negative/positive reversing OFF signal is output to the negative/positive reversing circuit 513 via the signal line 512 to disable the negative/positive reversing function, in steps S1305 and S1306. In this way, a normal moving image sensing mode is set.

With the above-mentioned arrangement, even in a camera without any function of automatically determining negative film image sensing, since the camera is automatically switched to the still image mode when the negative/positive reversing function is ON. Hence, the operator is free from cumbersome operations, and the camera can prevent a negative film image from being captured into a personal computer in the moving image mode if the operator forgets to do required operations.

<13th Embodiment>

The 13th embodiment relates to a camera which has a moving image sensing mode and a still image sensing mode that includes two modes, i.e., sequential and single shot modes. In such camera, the operator switches the image sensing mode in correspondence with his or her purpose at that time.

The sequential shot mode mainly aims at avoiding loss of an image sensing chance upon sensing a moving subject image as a still image. When a negative film image is sensed as a still image using the film adapter or the like, the subject is a complete still image integrated with the camera. Hence, identical still images are unwantedly sequentially sensed unless the sequential/single shot selection switch is set at the single shot side. More specifically, when the film adapter or the like is used, if the user forgets to confirm if the image sensing mode is the single shot mode and to operate the required switch, identical still images are unwantedly sequentially sensed as in the above case.

To remove the above-mentioned shortcomings and to solve the above problems, in the 13th embodiment, when a film image is captured by the camera, the camera is automatically set in the still image single shot mode.

Figure 33:
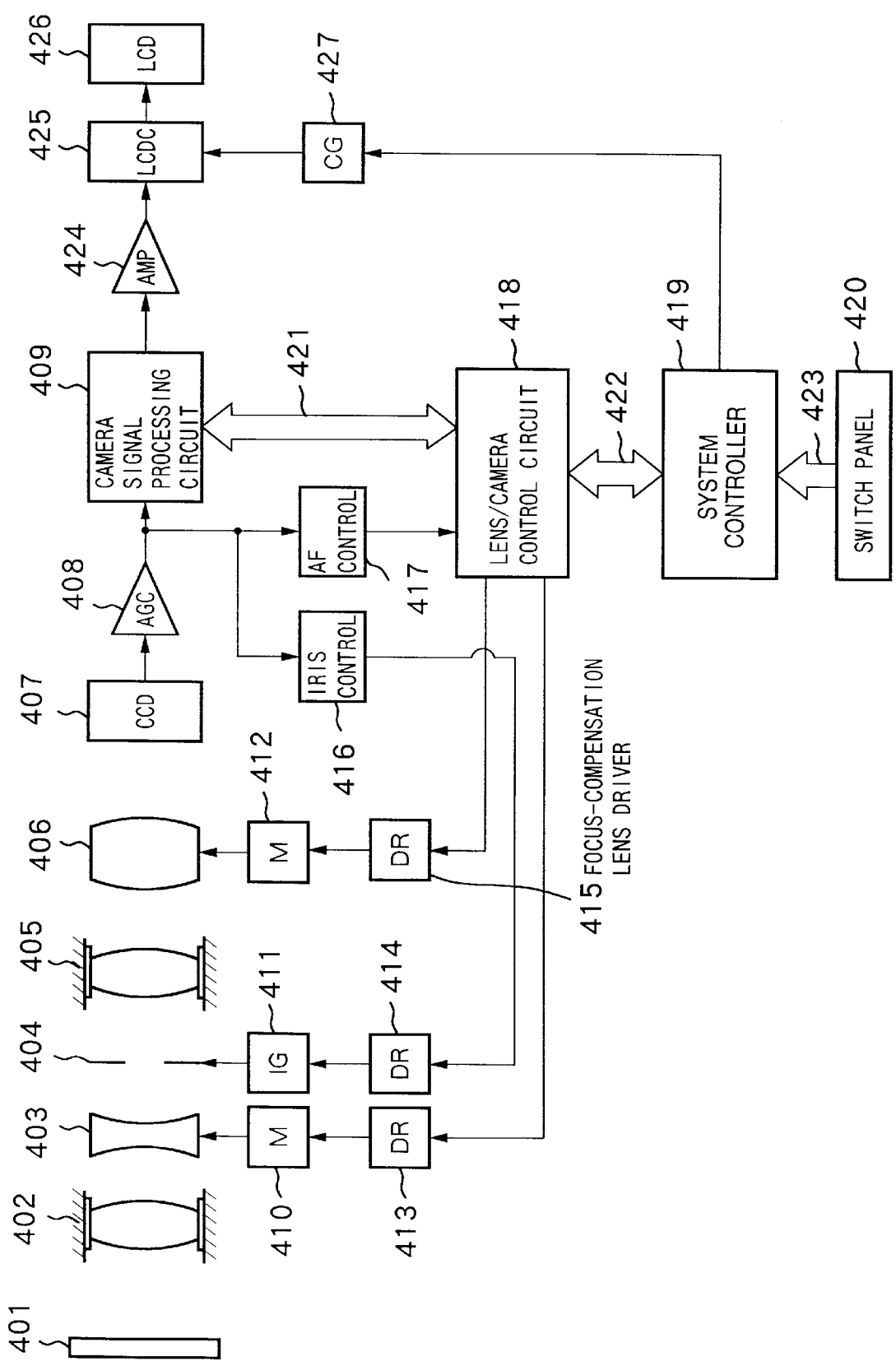
FIG. 33 is a block diagram for explaining the circuit arrangement of a video camera (video built-in type camera) according to the 13th embodiment of the present invention.

FIG. 33 is a block diagram showing the 13th embodiment of the present invention. In FIG. 33, the same reference numerals denote the same parts as in the block diagram shown in FIG. 5, and a detailed description thereof will be omitted.

In FIG. 33, the difference from the arrangement shown in FIG. 5 is that a video signal output from the camera signal processing circuit 409 is amplified by an amplifier 424, and the amplified signal is displayed on an LCD (liquid crystal display) 426 via an LCD (liquid crystal) display circuit 425. The system controller 419 supplies various display data as well as those for image sensing modes to a character generator 427, which supplies characters, marks, and the like corresponding to such various display contents to the LCD display circuit 425, thus displaying the data on the LCD 426 to be superposed on the video signal supplied from the camera signal processing circuit 409.

The above-mentioned still image capture function will be described in more detail below. As an advanced mode of the still image sensing mode, a sequential shot function of sequentially capturing still images for a plurality of frames at predetermined time intervals by single trigger operation is known.

Since this sequential shot function can simultaneously sense a plurality of still images of a moving subject, the photographer need not carefully wait for an instantaneous image sensing chance, and can select the best one from a series of still images. For this reason, this function is important for cameras having the still image sensing mode.

In case of a video built-in type camera, video information is recorded by scanning a recording head on a recording medium at high speed like helical scan video signal recording onto a magnetic tape, and the recording width for one field or frame of a magnetic tape in the longitudinal direction, which can form a still image, is very small.

In other words, even when still images are sequentially recorded at predetermined time intervals, the feed amount of the magnetic tape in the longitudinal direction is very small, and a mechanism used for sensing a moving image can be used without any modifications. Also, as compared to the scale of a sequential shot film feed device for a silver halide camera, the sequential shot function of a still image is suitable for the video built-in type camera.

An example of the operation method in the sequential shot mode will be explained below with reference to FIGS. 34 and 35.

Figure 34:
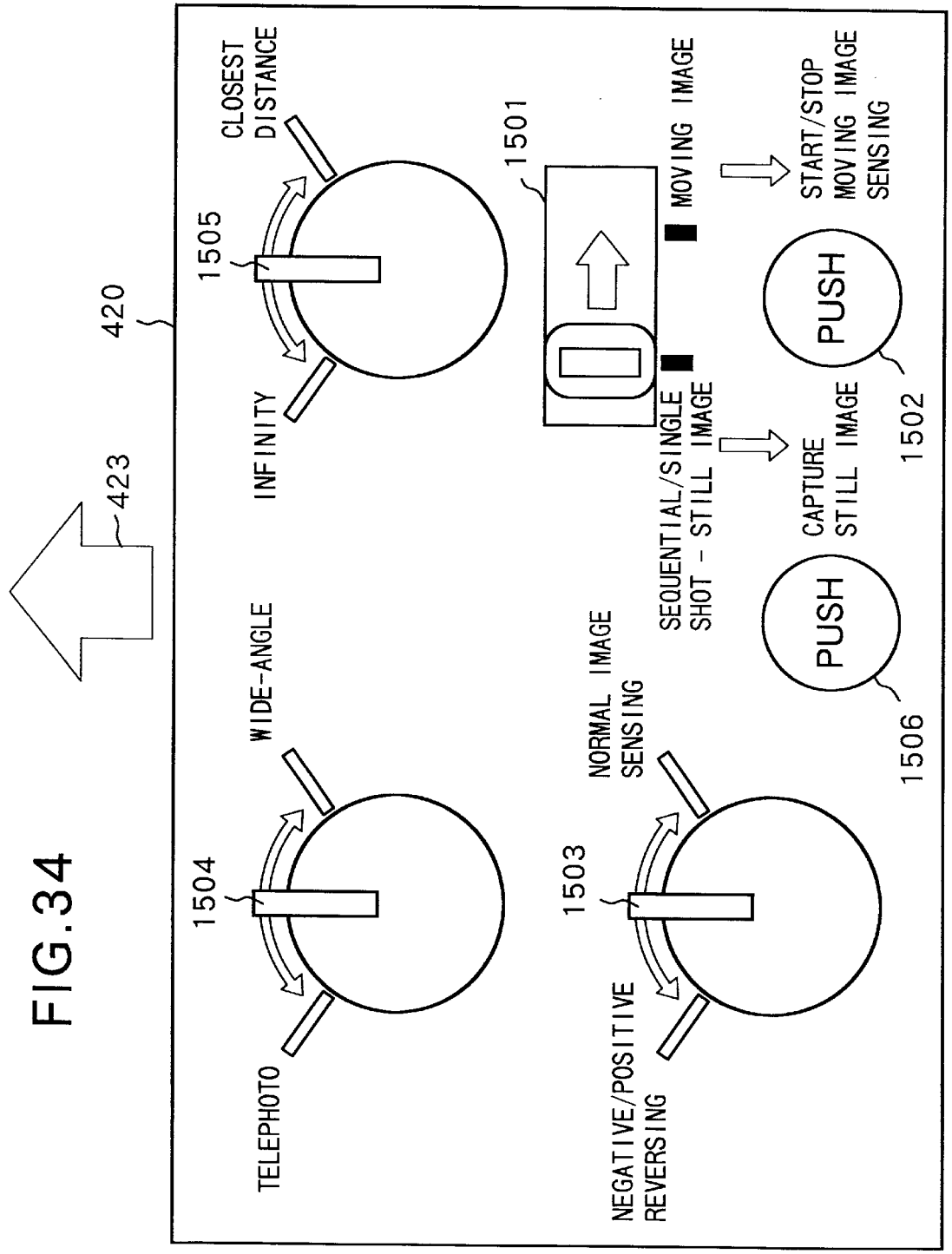
FIG. 34 is a plan view showing an example of a switch panel including various switches arranged on the video built-in type camera in the 13th embodiment of the present invention.
Figure 35:
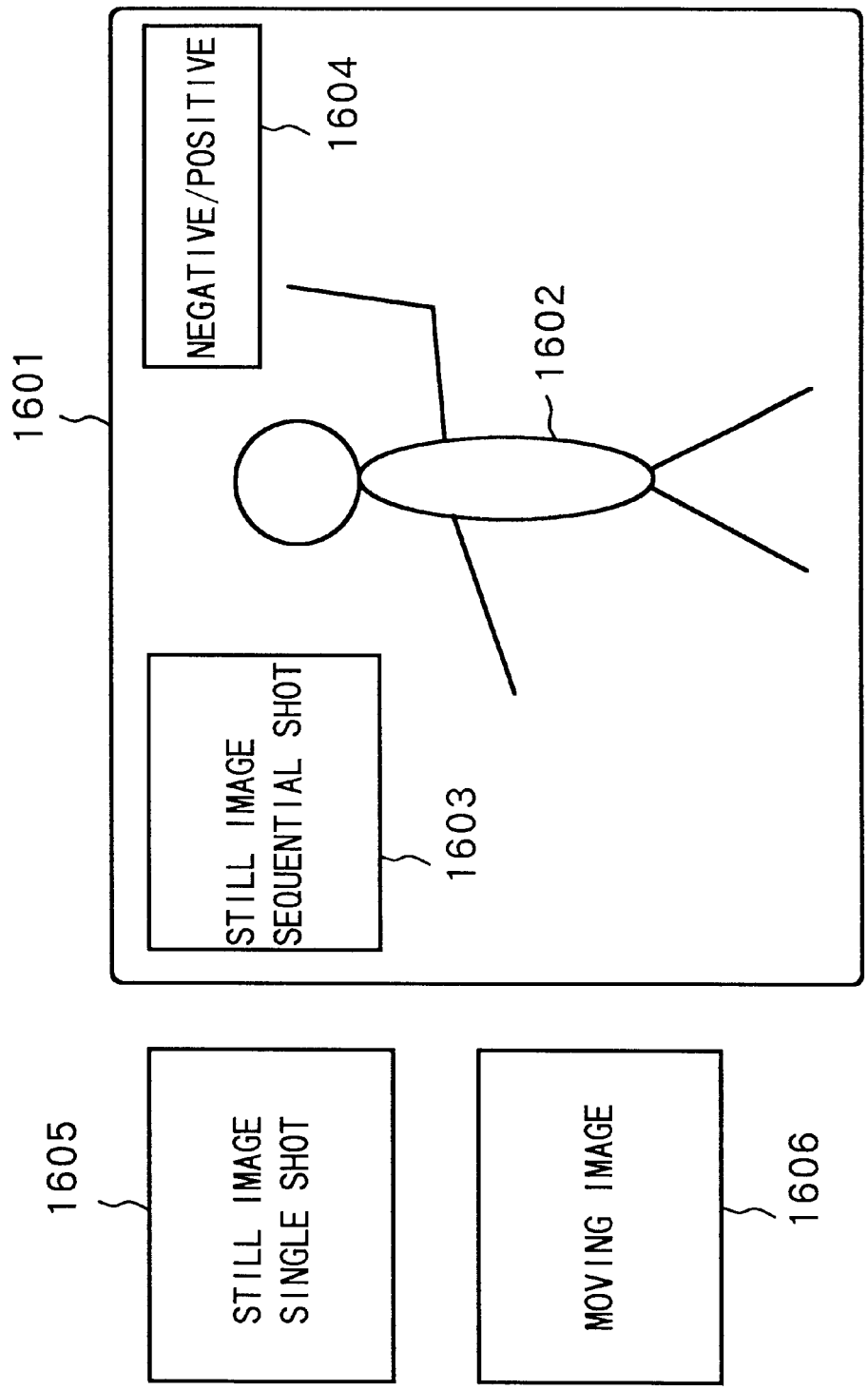
FIG. 35 shows a screen display example of the video built-in type camera in the 13th embodiment of the present invention.

FIG. 34 shows an example of the switch panel 420 of the 13 th embodiment. In FIG. 34, when a switch 1501 is flipped to the position of "still image sensing", and "negative/positive reversing" is selected by a switch 1503, an indication 1604 indicating that the negative/positive reversing mode is currently selected, and an indication ("still image sequential shot") 1603 indicating a mode of sensing a predetermined number of still images at predetermined time intervals by single operation of a trigger button 1602 are made together with a subject image 1602 in a finder or monitor, as shown in FIG. 35.

When "moving image" is selected by the switch 1501, an indication 1606 (letters of "moving image") is made at the position 1603.

The characteristic feature of the 13 th embodiment will be described below. In this embodiment as well, actual processing is done by the camera control circuit in the camera signal processing circuit 409 shown in FIG. 34. The arrangement of the camera control circuit is the same as that of the first embodiment, and a detailed description thereof will be omitted. The internal processing of the camera control circuit will be described below with the aid of the flow chart in FIG. 36.

Figure 36:
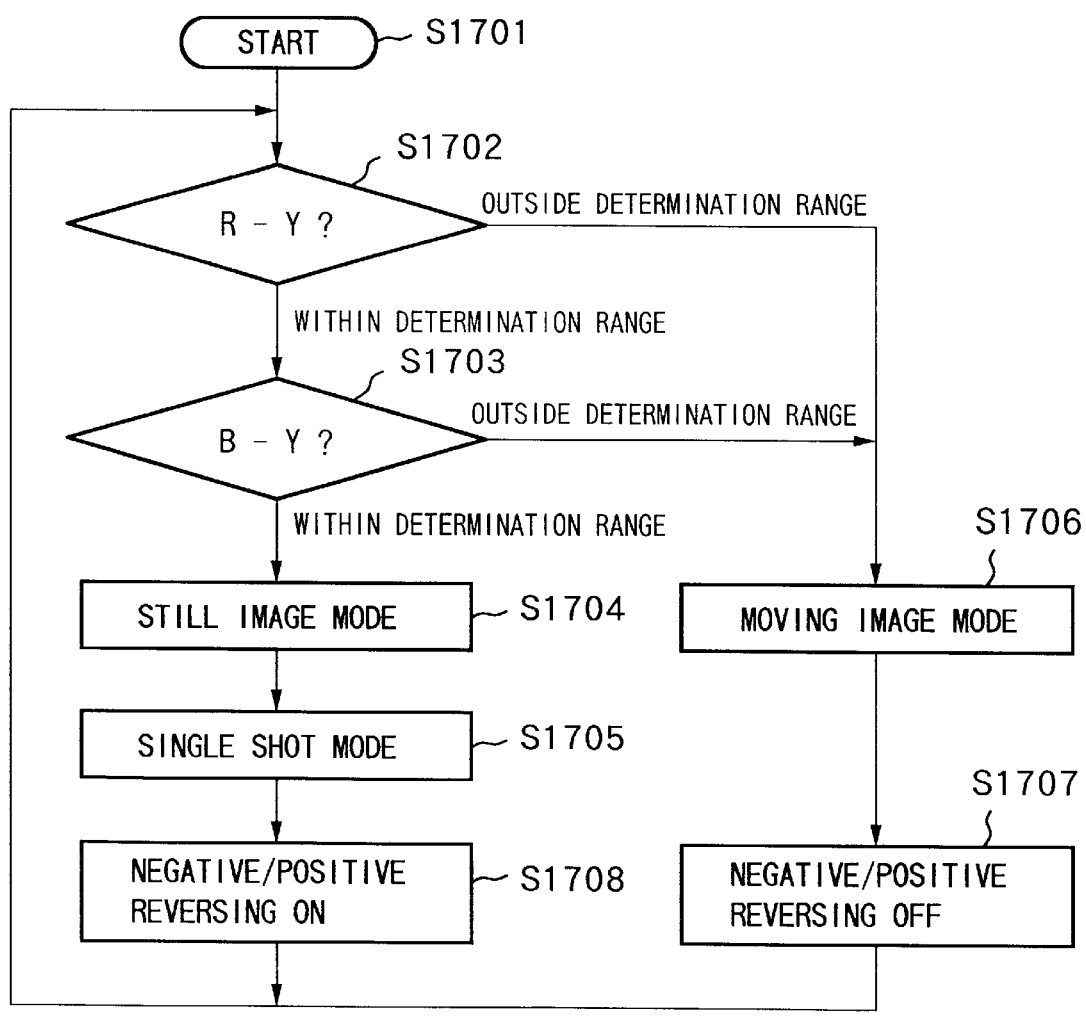
FIG. 36 is a flow chart showing the 13th embodiment of the present invention.

FIG. 36 shows the processing for detection of film image sensing and automatic selection of the still image single shot mode in the camera control circuit 105 of the 13th embodiment.

When execution of the processing starts in step S1701, it is checked in step S1702 if a signal R-Y input from the integrator 104 via the terminal 109 falls within the determination range 202. If the signal R-Y falls outside the determination range 202, the camera is set in the moving image mode in step S1706, and the image memory 511 is set in a through state. By the processing in step S1707, the camera control circuit 105 supplies a control signal 512 to the negative/positive reversing circuit 513 to disable the negative/positive reversing function, so as not to execute negative/positive reversing.

If it is determined in step S1702 that the signal R-Y falls within the determination range 202, it is checked in step S1703 if a signal B-Y input from the integrator 103 via the terminal 108 falls within the determination range 203. If the signal B-Y falls outside the determination range, the flow advances to step S1706 to set the moving image sensing mode.

On the other hand, if it is determined in step S1703 that the signal B-Y falls within the determination range 203, the camera is set in the still image sensing mode in step S1704, and stands by to capture a still image into the image memory 511 when the trigger switch is turned on. Also, in step S1705, the image sensing mode is forcibly switched to the single shot mode independently of the current image sensing mode.

The camera stands by to capture a still image into the image memory 511 when the trigger switch is turned on, and the flow advances to step S1708. In step S1708, the camera control circuit 105 supplies a control signal 512 to the negative/positive reversing circuit 513 to enable the negative/positive reversing function so as to execute negative/positive reversing.

More specifically, when it is detected that a negative film image is sensed, the camera can be automatically set in the still image sensing mode, and can also be set in the single shot mode.

In this embodiment, since this state corresponds to the attached state of the film adapter, a film image sensing mode is set.

With the above-mentioned arrangement and control of the circuits, even when the operator does not manually select the "still image single shot mode" using the switch 1603, the video built-in type camera can be automatically set in the film image sensing mode and can enable the negative/positive reversing function only when he or she takes a picture of a negative film image.

Therefore, even when a negative film image is to be captured in the moving image mode, which is still set immediately after normal video image sensing, a photographic film capture mode can be smoothly set by only attaching the film adapter without requiring any complicated operations.

Note that the above-mentioned negative film automatic determination scheme is not limited to only one scheme, and negative film automatic determination may also be implemented by methods disclosed in Japanese Laid-Open Patent Nos. 61-218268 and 62-10967 assigned to the same assignee as the present invention.

<14th Embodiment>

Figure 37:
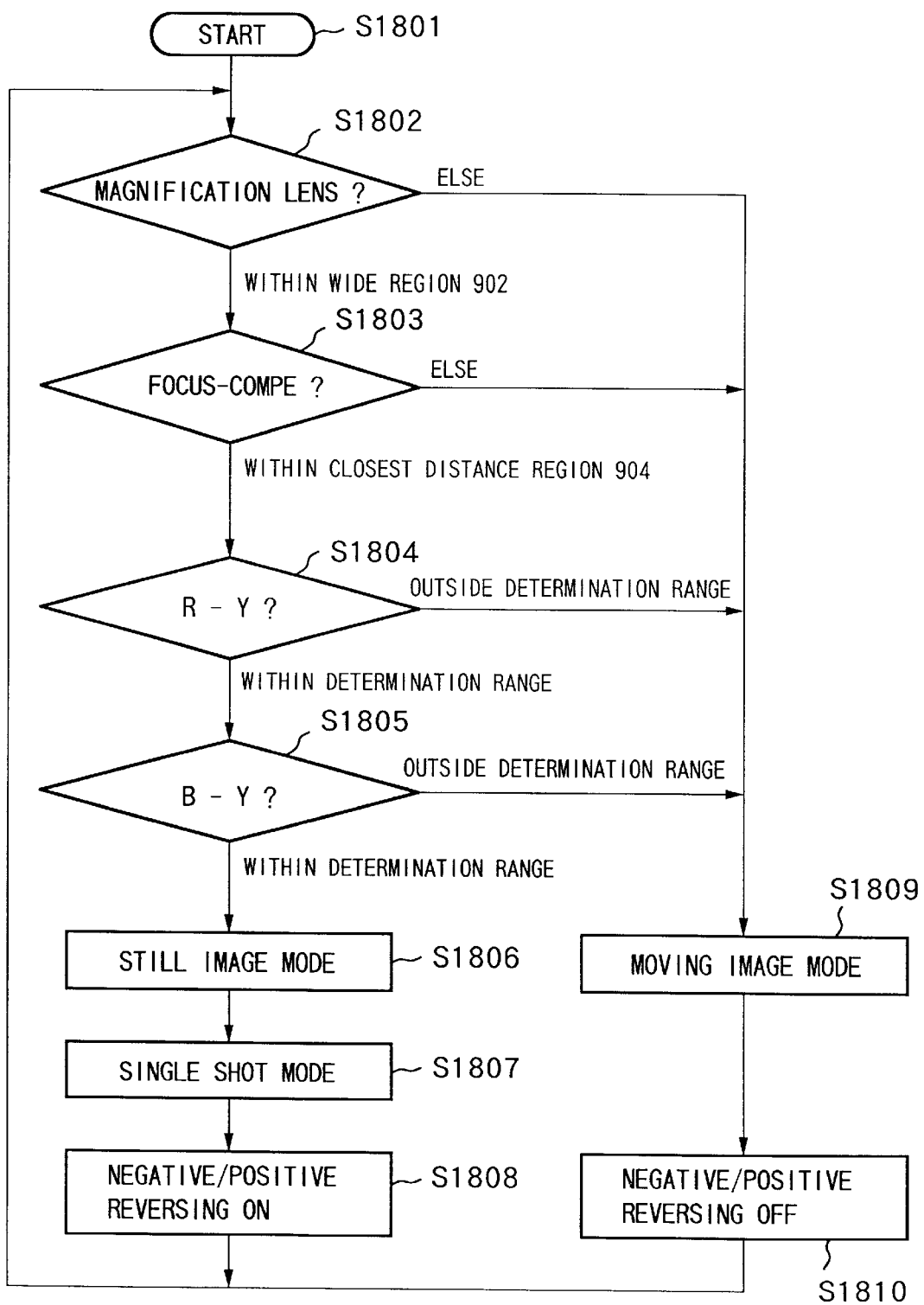
FIG. 37 is a flow chart showing the 14th embodiment of the present invention.

FIG. 37 is a flow chart showing the internal processing of the camera control circuit 105 in the camera signal processing circuit 409 according to the 14th embodiment. In the fourth embodiment, the lens position in the imaging plane in-focus state upon sensing a subject image is added as a determination condition in addition to that in the 13th embodiment.

In the flow chart shown in FIG. 37, when execution of the processing starts in step S1801, it is checked in step S1802 if the magnification lens falls within the range of the wide region 902 in FIG. 7. If the magnification lens falls outside that range, the flow advances to step S1809 to set the camera in a state for sensing a normal subject image in the moving image mode as in the fourth embodiment, and the negative/positive reversing function is disabled in step S1810.

If it is determined in step S1802 that the magnification lens position falls within the range of the region 902, it is checked in step S1803 if the focus-compensation lens position falls within the range on the closest-distance side of the curve 904 (the position condition of the focus-compensation lens changes depending on the position of the magnification lens). If the position of the focus-compensation lens falls outside that range, the processing in steps S1809 and S1810 is executed in the same manner as described above.

If it is determined in step S1803 that the position of the focus-compensation lens falls within the range 903 in FIG. 7, the states of color difference signals R-Y and B-Y are detected in steps S1804 and S1805, as in the above embodiment. If the color difference vector falls within the range 201, since no film image is sensed, the processing in steps S1809 and S1810 is executed.

If it is determined in steps S1804 and S1805 as a result of detecting the states of the color difference signals R-Y and B-Y that the color difference vector falls within the range 201, it is determined that the film adapter is attached, and a photographic film image is sensed. Hence, processing in steps S1806, S1807, and S1808 is executed to forcibly set the camera in the still image single shot mode, and thereafter, to enable the negative/positive reversing function.

With this processing, the still image sensing mode and single shot mode are set, so that a single still image is captured onto the image memory 511 in response to ON operation of the trigger switch, and is displayed on the display unit. Also, the captured image is output to an external apparatus, and can be recorded on a recording medium such as a magnetic tape (not shown). Also, by enabling the negative/positive reversing mode, the film image sensing mode is set.

As described above, since the state of the lens system is added as a determination condition, whether or not a photographic film image is sensed at the closest distance, i.e., using the film adapter can be clearly determined. Hence, the camera can be automatically switched to the still image single shot mode and negative film image sensing mode without any operation errors.

With the above-mentioned arrangement, when the film adapter is attached, the camera is automatically set in the still image sensing mode, i.e., the negative film image sensing mode, the operator is relieved from meticulous operations, and the camera can prevent a negative film image from being captured into a personal computer in the moving image mode if the operator forgets to do required operations.

<15th Embodiment>

Figure 38:
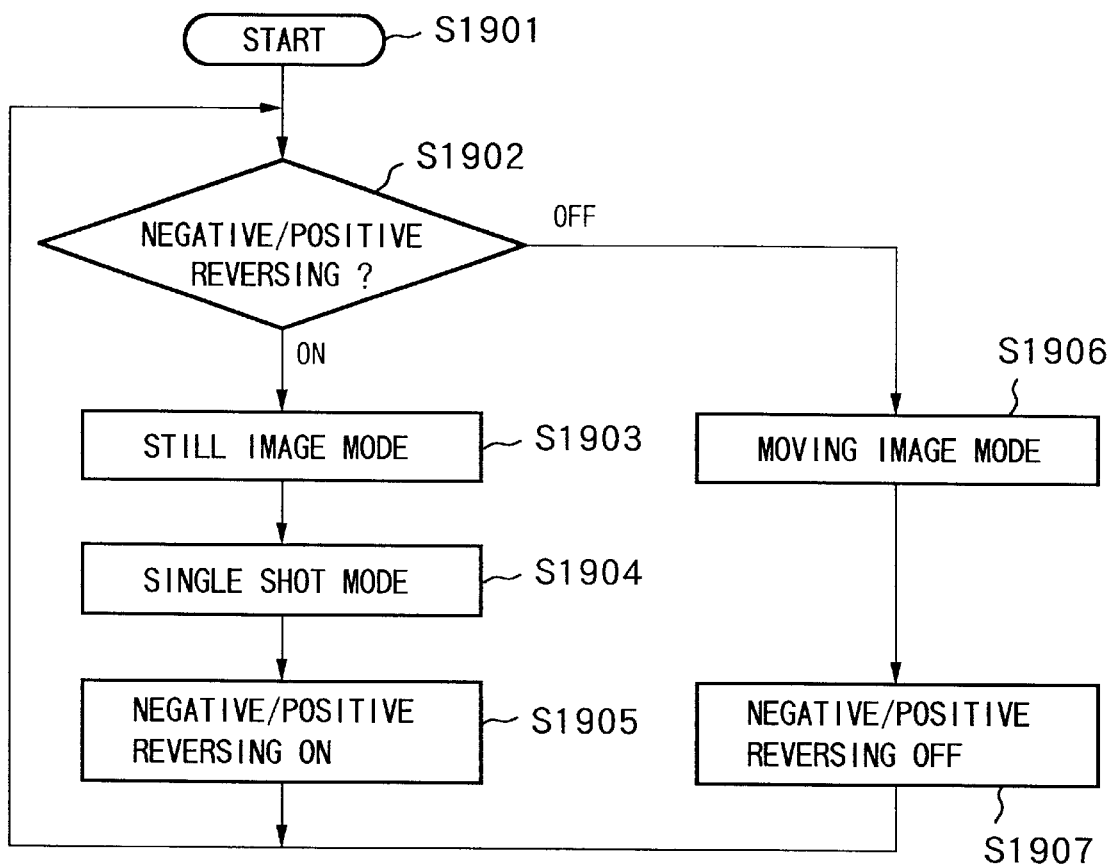
FIG. 38 is a flow chart showing the 15th embodiment of the present invention.

FIG. 38 is a flow chart showing the internal processing of the camera control circuit 105 in the camera signal processing circuit 409 according to the 15th embodiment of the present invention.

The 15th embodiment has no automatic identification means of negative/positive film image sensing unlike in the above embodiments, and when the operator operates the negative/positive reversing function selection switch 1603 to enable the negative/positive reversing function, the camera is automatically switched to the still image single shot mode.

In this case, this embodiment can be implemented by changing the processing in the camera control circuit 105 in the camera signal processing circuit 409. The schematic arrangement of the overall camera of this embodiment is the same as that shown in FIG. 34, and the internal arrangement of the camera signal processing circuit 409 is the same as that shown in FIG. 9.

In FIG. 38, when execution of the processing starts in step S1901, it is checked in step S1902 if the operator has enabled the negative/positive reversing function. As described above, the communication lines 422 and 423 provide ON information of the negative/positive reversing function.

If it is determined in step S1902 that the negative/positive reversing function is ON, the camera is set in the still image mode, and a negative/positive reversing ON signal is output to the negative/positive reversing circuit 513 via the signal line 512 to enable the negative/positive reversing function in step S1905, in steps S1903 and S1904.

In this manner, a positive image obtained by converting a negative film image can be captured in the still image single shot mode, and can be displayed or recorded.

If it is determined in step S1902 that the negative/positive reversing function is OFF, the camera is set in the moving image mode, and a negative/positive reversing OFF signal is output to the negative/positive reversing circuit 513 via the signal line 512 to disable the negative/positive reversing function, in steps S1906 and S1907. In this fashion, a normal moving image sensing mode is set.

With the above-mentioned arrangement, even in a camera without any function of automatically determining negative film image sensing, the camera is automatically switched to the still image mode when the negative/positive reversing function is ON. Hence, the operator is free from cumbersome operations, and the camera can prevent a negative film image from being captured into a personal computer in the moving image mode if the operator forgets to do required operations.

<16th Embodiment>

The 16th embodiment provides a photo video camera system which converts an image projected via a negative or slide film into a video signal using an image sensing device and records the converted image on a magnetic tape or the like or outputs it to a monitor, characterized in that when a film image is sensed in practice using a film adapter or the like, abrupt changes in video signal (changes in level of a video signal) caused upon moving a film (to select another frame) can be minimized.

In such system, a film is set in a film carrier or the like, and the film carrier is fixed to the image sensing device using a film carrier holder or the like. The film set in the film carrier is illuminated from the back side with a backlight, and an image projected via the film is sensed by an optical lens and a solid-state image sensing element mounted on the image sensing device. The sensed image signal is converted into a video signal by a signal processing circuit, and the video signal is output. The system has a function of negative/positive-reversing a video signal obtained by sensing an image projected via the film.

In general, the above-mentioned image sensing device has an exposure control circuit for maintaining a subject (e.g., a negative film or the like) to be sensed at appropriate brightness level. When the brightness level of the subject has changed, the exposure control circuit controls the electronic shutter speed, iris, AGC, Y-gain, and the like to do exposure control so as to always obtain an appropriate video signal level.

However, when the film is fed to move from one frame to another, if the brightness level of a portion between the two frames is considerably different from that of the previous frame (before movement), the brightness level changes considerably for a certain period as a result of overcorrection of the exposure control circuit, and an image with very poor quality is displayed on the monitor. Furthermore, an unwantedly long time is required due to overcorrection until stable appropriate exposure level can be obtained for a subject after movement.

In "normal image sensing", the brightness of a subject changes with time, but in "film image sensing", changes in brightness are relatively small. In film image sensing, changes in brightness of the subject occur only when the film is moved. Hence, in consideration of the response speed of the exposure control circuit required for obtaining proper exposure, if the response speed of the exposure control circuit upon sensing a film image is set to be lower than that upon sensing a normal subject image, the user rarely detects unnaturalness in images obtained by film image sensing.

In view of the foregoing, in the 16th embodiment, film image sensing is made detectable by the use of a switch for instructing start of the film image sensing mode or by arranging an automatic film determination function. When film image sensing is detected, the response speed of the exposure control circuit is set to be lower than that upon normal image sensing, thereby minimizing abrupt changes in brightness level that result in poor image quality on the screen of the monitor upon moving the film, and shortening the time required until appropriate exposure is obtained after film movement.

Figure 39:
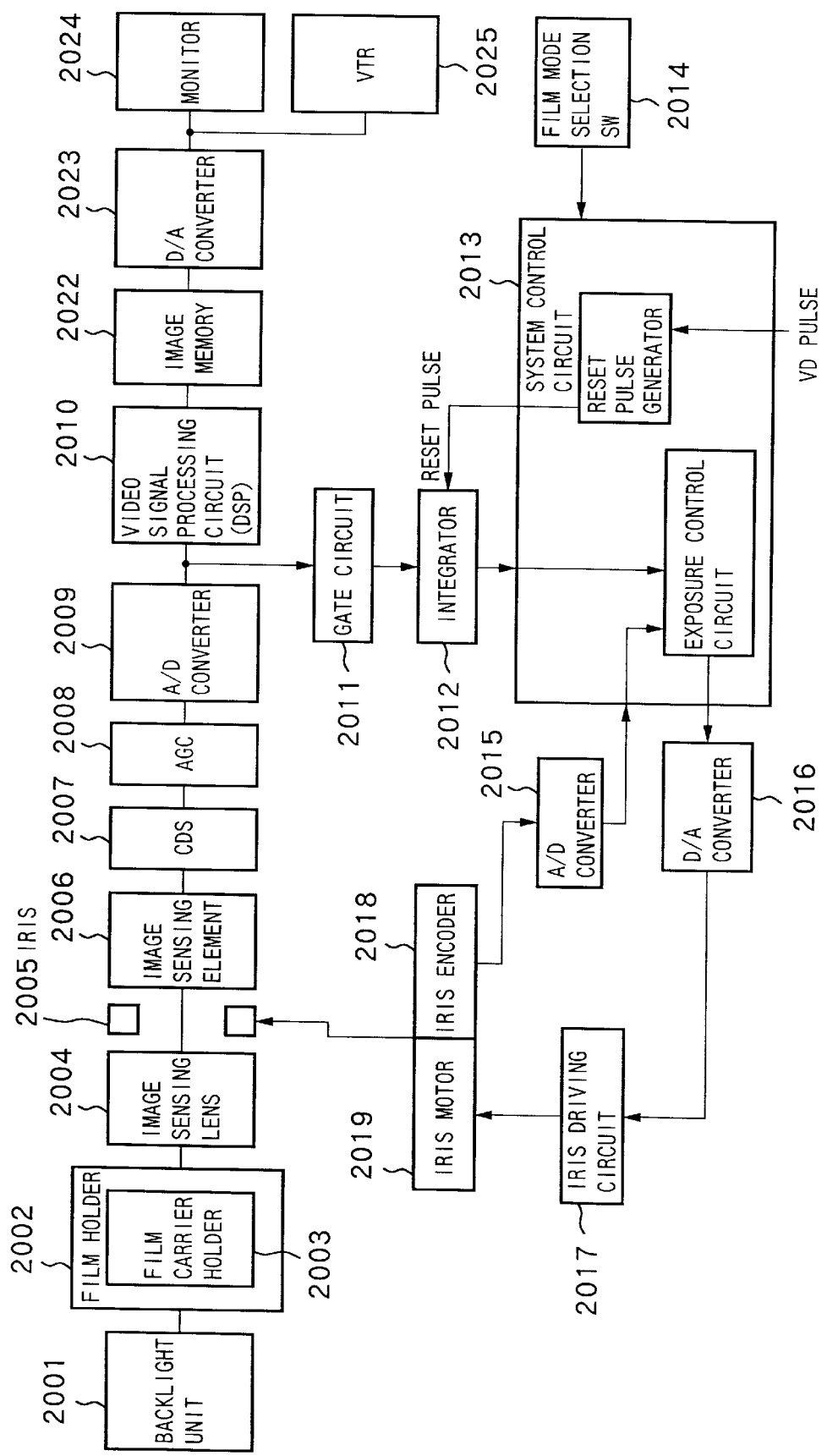
FIG. 39 is a block diagram for explaining the circuit arrangement of a video camera (video built-in type camera) according to the 16th embodiment of the present invention.

FIG. 39 is a block diagram showing the arrangement of a photo video camera system of the 16th embodiment.

In FIG. 39, reference numeral 2001 denotes a backlight unit for illuminating a negative film from the back side; 2002, a film holder for fixing a film to a film carrier holder (to be described below); 2003, a film carrier holder which carries and attaches a film to the image sensing device; 2004, an image sensing lens; 2005, an iris for adjusting the amount of incoming light; 2006, an image sensing element such as a CCD or the like; 2007, a correlated double sampling circuit (CDS circuit) for reducing accumulated charge noise in an output signal from the image sensing element 2005; 2008, an AGC circuit for adjusting the gain of the sensed image signal; 2009, an A/D converter for converting the sensed image signal output from the AGC circuit 2008 into a digital signal; 2010, a video signal processing circuit for converting the output signal from the A/D converter 2009 into a video signal; 2011, a gate circuit for gating the sensed image signal output from the AGC circuit 2008 to divide the image sensing frame into a plurality of regions and extract an image signal corresponding to an arbitrary region; 2012, an integrator for integrating the sensed image signal corresponding to the designated region on the selected image sensing frame, and obtaining its average light amount; 2013, a system control circuit (including an exposure control circuit) which comprises a microcomputer for controlling the overall system; 2014, a negative film mode selection switch; 2016, a D/A converter for converting an iris control digital signal output from the system control circuit 2013 into an analog signal; 2017, an iris driving circuit for driving an iris motor (to be described below); 2018, an iris encoder which comprises, e.g., a Hall element for detecting the opening amount of the iris, i.e., the aperture value; 2019, an iris motor for driving the iris; 2015, an A/D converter for converting the output from the iris encoder 2018 into a digital signal that can be processed by the system control circuit 2013; 2021, a D/A converter for converting an AGC control digital signal output from the system control circuit 2013 into an analog signal; 2022, an image memory for storing and outputting a digital signal from the video signal processing circuit 2010 in accordance with a control signal from the system control circuit 2013; and 2023, a D/A converter for converting a digital signal output from the image memory 2022 into an analog signal.

In the above arrangement, means for controlling exposure comprises two different control means, i.e., the iris 2005 and AGC circuit 2008.

The photo video camera system of the 16th embodiment has the above-mentioned arrangement, and its operation will be described in detail below.

Light emitted by the backlight unit 2001 illuminates one frame on a film, and light transmitted through the frame is photoelectrically converted by the image sensing element 2006 via the image sensing lens 2004. The signal output from the element 2006 is amplified to proper level by the AGC circuit 2008, and the amplified signal is converted into a video signal by the video signal processing circuit 2010. The video signal is converted into an analog signal by the D/A converter 2023 via the image memory 2022, and the analog signal is output.

At this time, in the above-mentioned arrangement, the means for exposure control integrates the sensed image signal output from the AGC circuit 2008 by the integrator 2012, supplies the integrated signal to the internal exposure control circuit of the system control circuit 2013, and controls the iris 2005 and the AGC circuit 2008 using the system control circuit 2013, so that the input signal level matches a predetermined level set in the exposure control circuit.

The integrator 2012 can arbitrarily vary its integral time although it may be implemented by software or hardware, or a combination thereof.

When the system control circuit 2013 detects the film image sensing mode via the film mode selection switch 2014, reset pulses which are generated based on a vertical synchronization signal (VD pulse) input to the system control circuit 2013 and control the integral time of the integrator are output, e.g., once per three VD pulses (in this connection, in a normal image sensing mode, one reset pulse is output in response to one VD pulse), thereby extending the integral time of the integrator. Since the integral time of the integrator is prolonged, even when the sensed image signal level has largely changed instantaneously (upon film movement), the output from the integrator 2012 changes little, and the signal level input to the system control circuit 2013 does not change largely following the output from the integrator 2012. Consequently, since the output from the exposure control circuit does not change, overresponse of the iris 2005 controlled by the exposure control circuit can be suppressed, and changes in brightness that give rise to poor image quality on the monitor can be minimized.

Figure 40A:
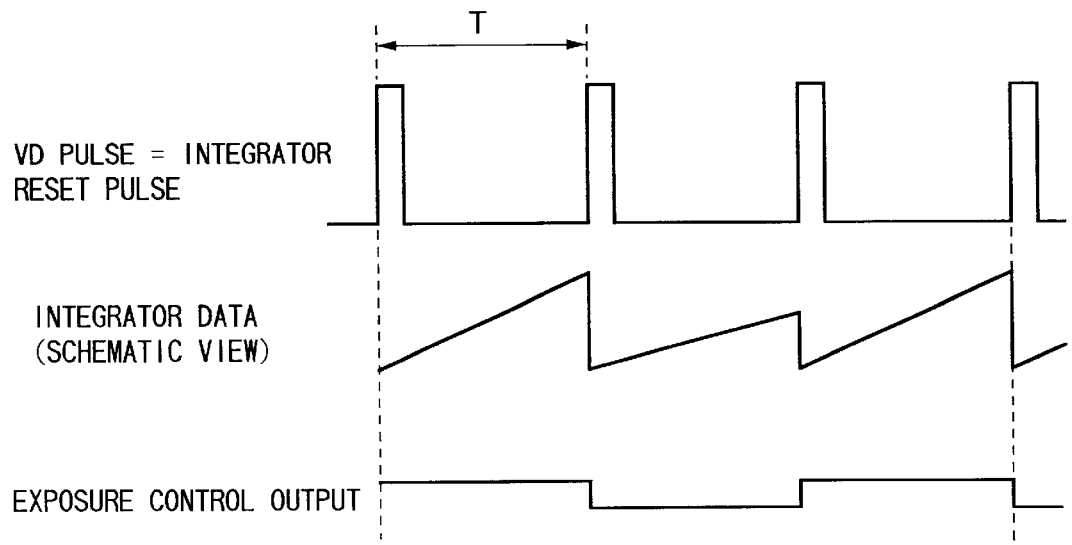
FIGS. 40A and 40B are timing charts in the seventh embodiment of the present invention.
Figure 40B:
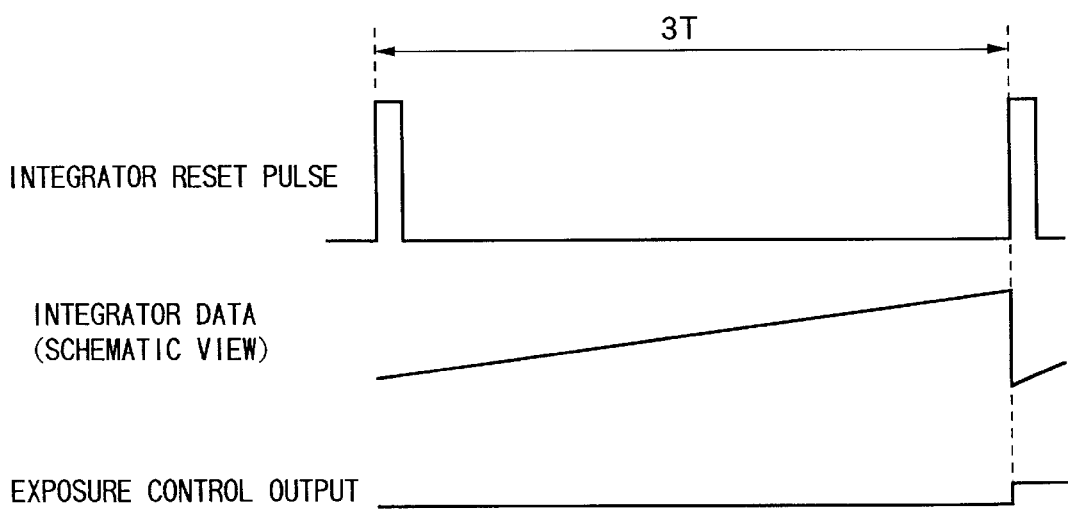

FIGS. 40A and 40B show the outputs from the integrator in these image sensing modes. FIG. 40A shows the output in the normal image sensing mode, and FIG. 40B shows the output in the film image sensing mode.

In the normal image sensing mode, the integrator integrates an input signal in response to every VD pulses, and exposure control is done at the VD pulse periods. On the contrary, in the film image sensing mode, the reset pulse period of the integrator is set three times the VD pulse period, and the integrator is reset at periods 3T, thus prolonging the integral time constant to three times. With this control, abrupt changes in exposure due to frame feeding of a film can be prevented. At this time, the reset pulse timing can be arbitrarily varied as needed by setting a counter.

Figure 41:
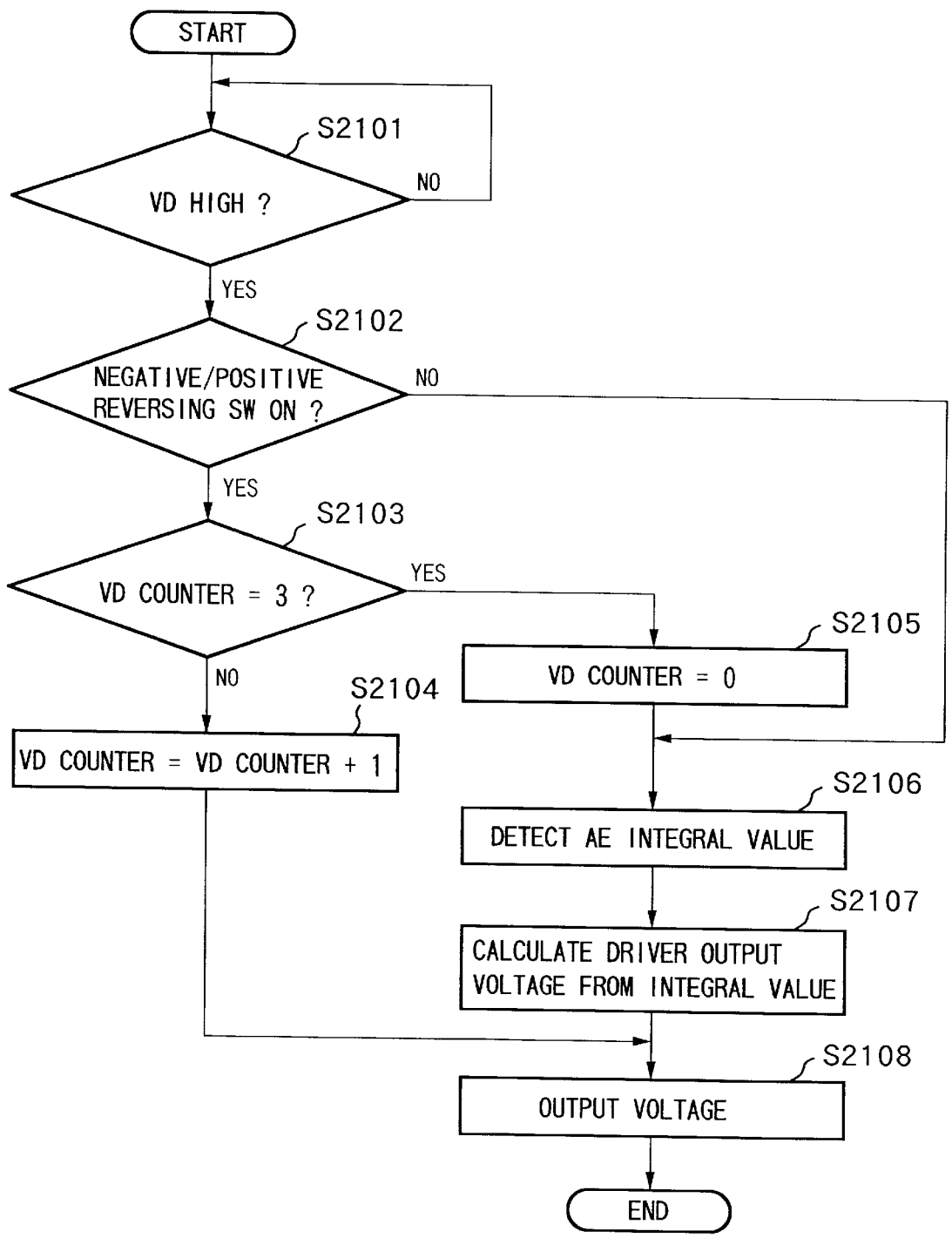
FIG. 41 is a flow chart showing the 16th embodiment of the present invention.

FIG. 41 is a flow chart for explaining the operation for controlling the integral time of the integrator. This processing is executed in the microcomputer (system control circuit) 2013. This control sequence exemplifies operation for controlling the integral time of the integrator when the film mode selection SW is pressed.

In step S2101, it is checked if a vertical synchronization signal pulse (VD pulse) is at Hi level (note that VD pulses in some systems may be Low active). It is then checked in step S2102 if the position of the film mode selection switch is the normal image sensing mode or film image sensing mode. If the film image sensing mode is selected, it is checked in step S2103 if a VD counter has counted a designated number (e.g., 3) of input VD pulses.

In step S2104, the VD counter for counting the VD pulses is incremented until it reaches the designated value. Thereafter, the flow advances to step S2108 to output a current integrated output voltage value without changing output data.

If it is determined in step S2103 that the VD counter has reached the designated value (3), the flow advances to step S2105 to reset the VD counter to zero. In step S2106, data from the integrator is read. In step S2107, the read data is divided by the designated value to generate voltage output data.

Thereafter, exposure control is done by the same processing as in the normal image sensing mode.

If it is determined in step S2102 that the film image sensing mode is not selected, and the normal image sensing mode is selected, the flow jumps to step S2106 to detect an AE integrated value, and a driver-driving voltage is calculated and output (steps S2107 and S2108).

To summarize, when the film image sensing mode is selected, since a large integral time constant is consequently set not to update the exposure control integrated value for a predetermined period, an image with poor quality suffering, e.g., abrupt changes in brightness on the monitor, can be minimized, and proper exposure can be quickly obtained after frame movement.

<17th Embodiment>

Figure 42:
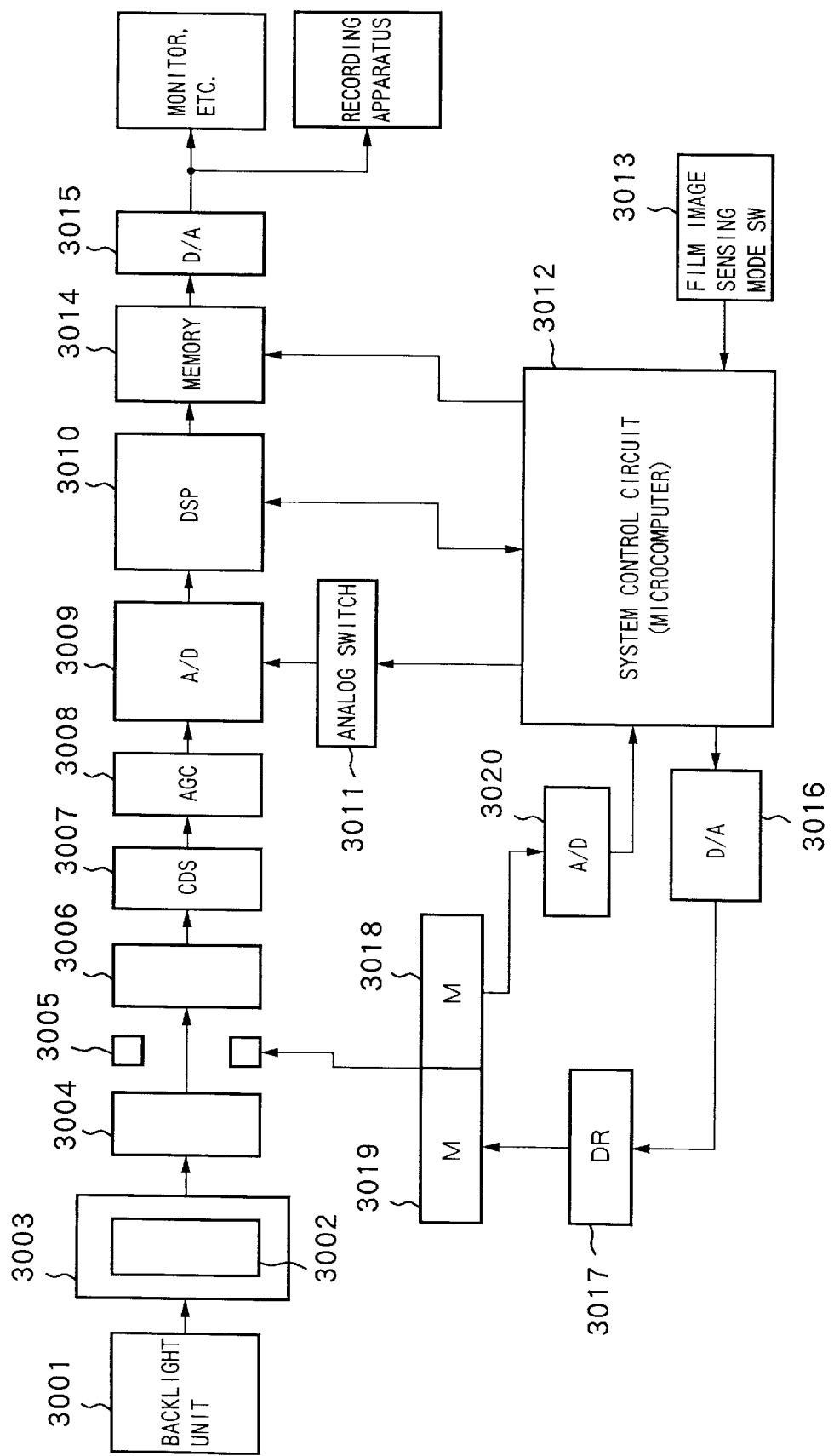
FIG. 42 is a block diagram of an image sensing apparatus according to the 17th embodiment of the present invention.

FIG. 42 is a block diagram of an image sensing apparatus according to the 17th embodiment.

Figure 43:
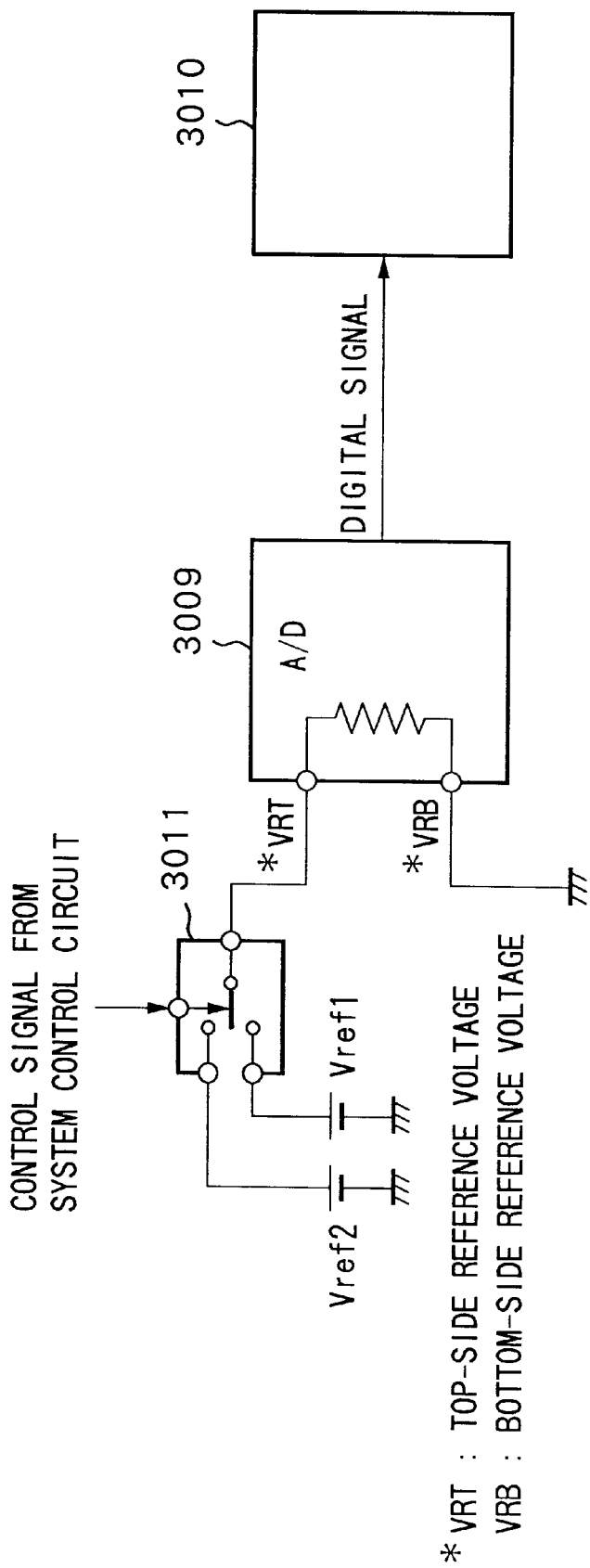
FIG. 43 is a circuit diagram of an A/D converter shown in FIG. 42.

FIG. 43 is a circuit diagram of an A/D converter shown in FIG. 42.

In FIG. 42, reference numeral 3001 denotes a backlight unit for illuminating a negative film from the back side; 3002, a film holder for fixing a film to a film carrier holder (to be described below); 3003, a film carrier holder which carries and attaches a film to the image sensing device; 3004, an image sensing lens; 3005, an iris for adjusting the amount of incoming light; 3006, an image sensing element such as a CCD or the like; 3007, a correlated double sampling circuit (CDS circuit) for reducing accumulated charge noise in an output signal from the image sensing element 3005; 3008, an AGC circuit for adjusting the gain of a sensed image signal; 3009, an A/D converter for converting the sensed image signal output from the AGC circuit 3008 into a digital signal; 3010, a video signal processing circuit (DSP) for converting the output signal from the A/D converter 3009 into a video signal; 3011, an analog switch for switching a top-side reference voltage of the A/D converter 3009 in accordance with a control signal from a system control circuit (microcomputer; to be described below); 3012, a system control circuit which comprises a microcomputer for controlling the overall system; and 3013, a film image sensing mode selection switch.

Reference numeral 3016 denotes a D/A converter for converting an iris control digital signal output from the system control circuit 3012 into an analog signal; 3017, an iris driving circuit for driving an iris motor (to be described below); 3018, an iris encoder which comprises, e.g., a Hall element for detecting the opening amount of the iris, i.e., the aperture value; 3019, an iris motor for driving the iris; and 3020, an A/D converter for converting the output from the iris encoder 3018 into a digital signal that can be processed by the system control circuit 3012.

Reference numeral 3014 denotes an image memory for storing and outputting a digital signal from the video signal processing circuit 3010 in accordance with a control signal from the system control circuit 3012; 3015, a D/A converter for converting a digital signal output from the image memory 3014 into an analog signal. In this arrangement, means for controlling exposure is implemented by controlling two members, i.e., the iris 3005 and AGC 3008.

The operation will be described below.

Light emitted by the backlight unit 3001 illuminates one frame on a film, and light transmitted through the frame is photoelectrically converted by the image sensing element 3006 via the image sensing lens 3004. The signal output from the element 3006 is amplified to proper level by the AGC circuit 3008, and the amplified signal is converted by the A/D converter 3009 into a digital signal that can be processed by the signal processing circuit (DSP) 3010. The digital signal is converted into a video signal by the signal processing circuit 3010, and is then converted into an analog signal by the D/A converter 3015 via the image memory 3014. Thereafter, the analog signal is output to a monitor, recording apparatus, or the like on the output side.

In the film image sensing mode, the system control circuit 3012 detects switching of the film image sensing mode switch 3013, and outputs a control signal for instructing switching to the film image sensing mode to the analog switch 3011 and the like. At this time, the reference voltage switching operation of the A/D converter 3009 is done as shown in the circuit diagram of FIG. 43. Namely, the system control circuit 3012 switches the analog signal 3011 using a control signal for the purpose of setting a reference voltage VR (top side) of the A/D converter 3009 at an optimal voltage value ($V_{ref1}/V_{ref2}$) in correspondence with the normal image sensing mode and film image sensing mode.

For example, let $V_{ref1}$ be an optimal reference voltage (e.g., 3 V) in the normal image sensing mode, and $V_{ref2}$ be an optimal reference voltage (e.g., 2 V) in the film image sensing mode. In this case, in the film image sensing mode in which the dynamic range of the A/D converter 3009 can be narrowed down, the top-side reference voltage is switched to $V_{ref2}$ to set a narrower dynamic range of the A/D converter 3009 than that in the normal image sensing mode and to improve the S/N ratio, thus attaining stable, high-quality film image sensing.

As described above, according to this embodiment, since the dynamic range of the A/D converter is automatically set to be narrower than that in the normal image sensing mode in the film image sensing mode, optimal setting that can most effectively use the dynamic range of the A/D converter 3009 in the film image sensing mode can be done, quantization errors (quantization noise) produced upon A/D conversion can be minimized, and the S/N ratio in the film image sensing mode is consequently improved, thus allowing high-quality film image sensing.

Note that the reference voltages $V_{ref1}$ and $V_{ref2}$ of the A/D converter 3009 that makes up a signal processing system switching means are switched via the analog switch 3011. Alternatively, the microcomputer (system control circuit 3012) may directly switch these voltages without the intermediacy of the analog switch 3011. In this case, the need for the analog switch can be obviated.

As for the film image sensing mode switch 3013 that makes up a film image sensing mode selection means, for example, an operation switch may be arranged to select the film image sensing mode upon depression of it, and the depression of the switch may be detected by the system control circuit 3012 to switch the reference voltage of the A/D converter between $V_{ref1}$ and $V_{ref2}$ or attachment of the backlight unit 3001 for film image sensing to the front surface of the video camera or ON of the backlight unit may be detected by the system control circuit 3012 to automatically select an optimal reference voltage.

As described above, according to the 17th embodiment, the image sensing apparatus which has the normal video image sensing mode and film image sensing mode, comprises the film image sensing mode selection means for detecting film image sensing, and the signal processing system switching means for switching the reference voltage of the A/D converter to an optimal voltage in correspondence with the film image sensing mode and normal image sensing mode, and controls to narrow down the dynamic range of the A/D converter in the film image sensing mode. Hence, the S/N ratio in the film image sensing mode of a negative or positive film can be improved without influencing image quality in the normal image sensing mode, and a higher-quality image can be provided.

<18th Embodiment>

Figure 44:
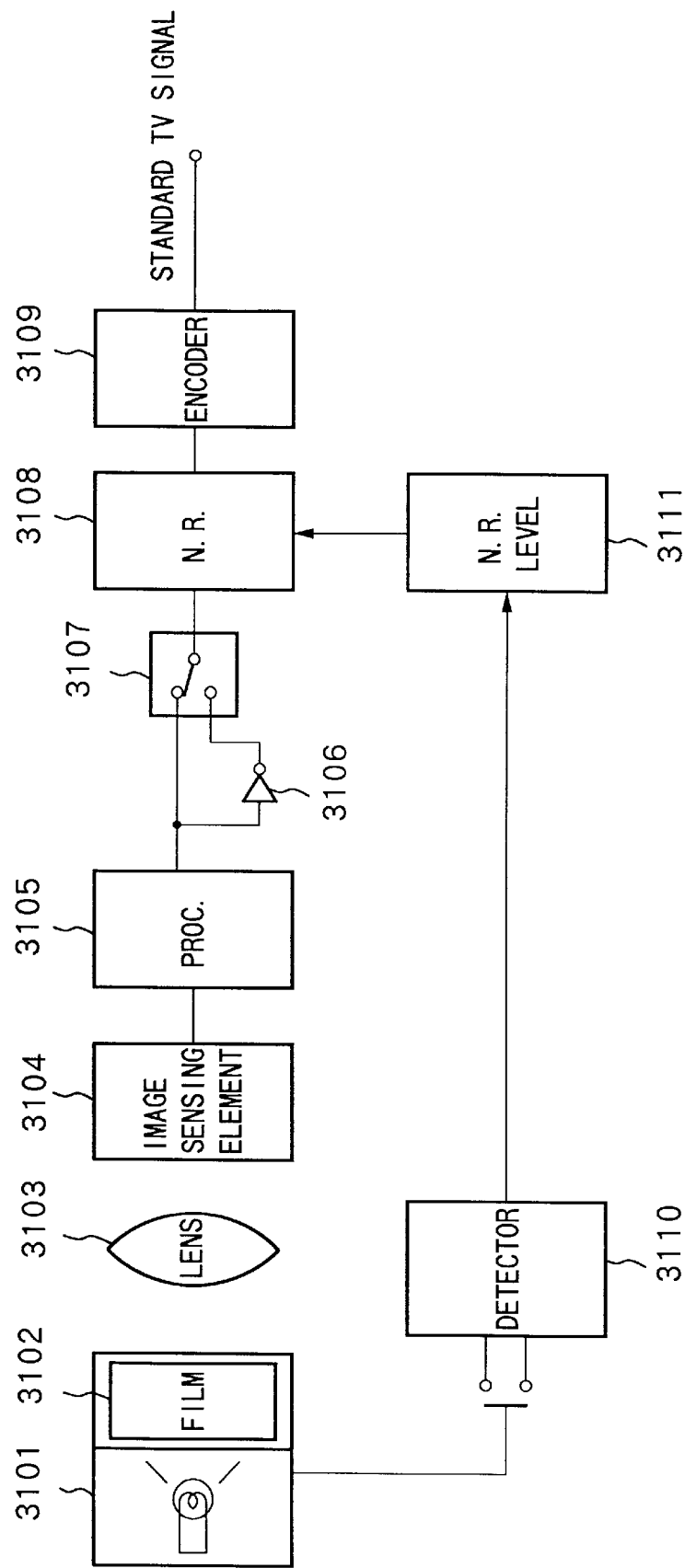
FIG. 44 is a block diagram showing the arrangement according to the 18th embodiment of the present invention.

FIG. 44 is a block diagram showing the arrangement according to the 18th embodiment of the present invention, and shows the schematic arrangement of a video camera having a function of sensing a photographic film image in addition to a normal subject image.

In FIG. 44, reference numeral 3101 denotes a film adapter used for sensing a photographic film image; 3102, a film held by the adapter 3101; 3103, an imaging lens; 3104, an image sensing element for photoelectrically converting incoming light via the lens 3103; 3105, a signal processing circuit for generating luminance and chrominance signals based on signals generated by the image sensing element 3104; 3106, a reversing circuit for reversing a negative image to a positive image; 3107, a switch for selecting whether or not negative/positive reversing is to be done; 3108, a noise reduction circuit; 3109, an encoder circuit for converting the luminance and chrominance signals into a video signal; 3110, a film adapter detector for detecting attachment of the film adapter 3101; and 3111, a level selector for selecting the noise correction amount of the noise reduction circuit 3108.

In the above-mentioned arrangement, the film 3102 is illuminated by a light source arranged in the film adapter 3101, and light transmitted through the film 3102 is imaged on the image sensing element 3104 via the lens 3103. The optical signal that enters the image sensing element 3104 is photoelectrically converted by the element 3104, and the signal processing circuit 3105 generates luminance and chrominance signals based on the signals from the element 3104.

When the film 3102 to be sensed is a positive film, the outputs from the signal processing circuit 3105 are directly input to the noise reduction circuit 3108 by the switch 3107; when the film 3102 is a negative film, the outputs from the signal processing circuit 3105 are reversed to those for a positive image by the reversing circuit 3106, and the reversed signals are input to the noise reduction circuit 3108. A video signal from which noise components are reduced by the noise reduction circuit 3108 is converted into a standard television signal by the encoder circuit 3109, and the converted signal is output.

The arrangement of the noise reduction circuit 3108 is the same as that shown in FIG. 3 above. However, a noise reduction coefficient k is supplied from the level selector 3111 and is switched between at least two values in synchronism with attachment of the film adapter 3101.

Figure 45:
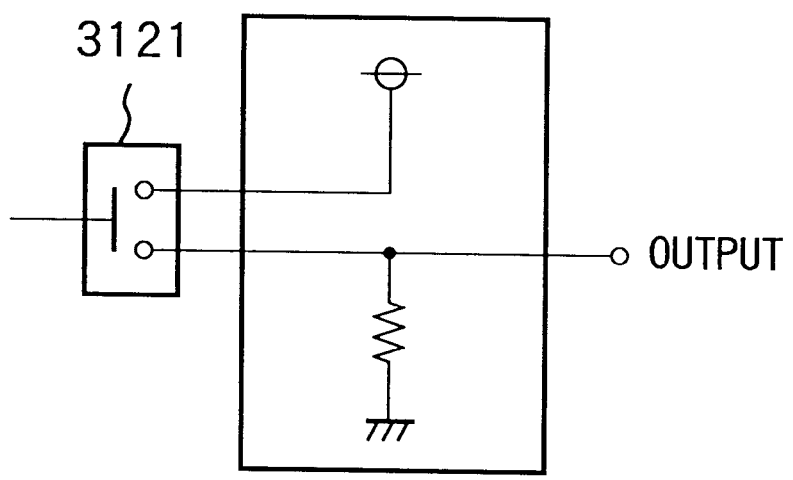
FIG. 45 is a circuit diagram showing an example of a film adapter detection circuit.

The detector 3110 outputs a detection signal when the film adapter 3101 is attached. FIG. 45 shows the simplest example of the film adapter detector 3110.

In FIG. 45, reference numeral 3121 denotes a switch which is turned on (closed) upon detecting attachment of the film adapter 3101. The switch 3121 has electrical contacts respectively on the film adapter side and detector main body side, and when the film adapter 3101 is attached to the video camera, the each other's electrical contacts come into contact with each other. When the switch 3121 is OFF (open), the output from the detector equals the GND level; when the switch 3121 is ON, the output from the detector equals the power supply level.

The detection signal output from the film adapter detector 3110 is input to the noise reduction level selector 3111. The noise reduction level selector 3111 supplies a numerical value corresponding to the coefficient k given by equation (1) in the previously mentioned prior art to the noise reduction circuit 3108. When the film adapter 3101 is not attached, the noise reduction coefficient k is set at 0.8, and a video signal output $(S_{out})n$ of the n-th frame is given by:

$$(S_{out})_n = 0.8 \cdot (S_{in})_n + 0.2 \cdot (S_{out})_{n-1} (0 < k \leq 1) \quad (2)$$

More specifically, noise components produced between the (n−1)-th and n-th frames are improved by −2 dB. The coefficient at that time is set at a well-balanced numerical value in consideration of the noise reduction effect and a decrease in resolution for a subject that moves fast.

On the other hand, upon detecting attachment of the film adapter 3101, the noise reduction coefficient k is set at 0.5, and the video signal output $(S_{out})n$ of the n-th frame is given by:

$$(S_{out})_n = 0.5 \cdot (S_{in})_n + 0.5 \cdot (S_{out})_{n-1} (0 < k \leq 1) \quad (3)$$

In this case, noise components produced between the (n−1)-th and n-th frames are improved by −6 dB. The coefficient at that time is set at a numerical value suitable for sensing a subject that stands still to give priority to the noise reduction effect rather than a decrease in resolution for a subject that moves fast.

As described above, since the noise reduction amount is changed in correspondence with the presence/absence of the film adapter 3101, an optimal noise reduction effect can be expected in correspondence with a normal subject and a photographic film.

Note that the above-mentioned numerical values are merely examples, and different correction amounts may be set when different devices of the image sensing element 3104, signal processing circuit, and the like are used or when a different noise reduction scheme is used. The noise correction amount is switched between two different values. However, the number of values to be selected may be increased. The frame correlation method has been described as the noise reduction method. Alternatively, a field correlation noise reduction method with a field memory, a line correlation noise reduction method with a line memory, and the like may be used. Furthermore, the detection method of the film adapter 3101 is not limited to the above-mentioned method, and a manual switching method may be used.

<19th Embodiment>

Figure 46:
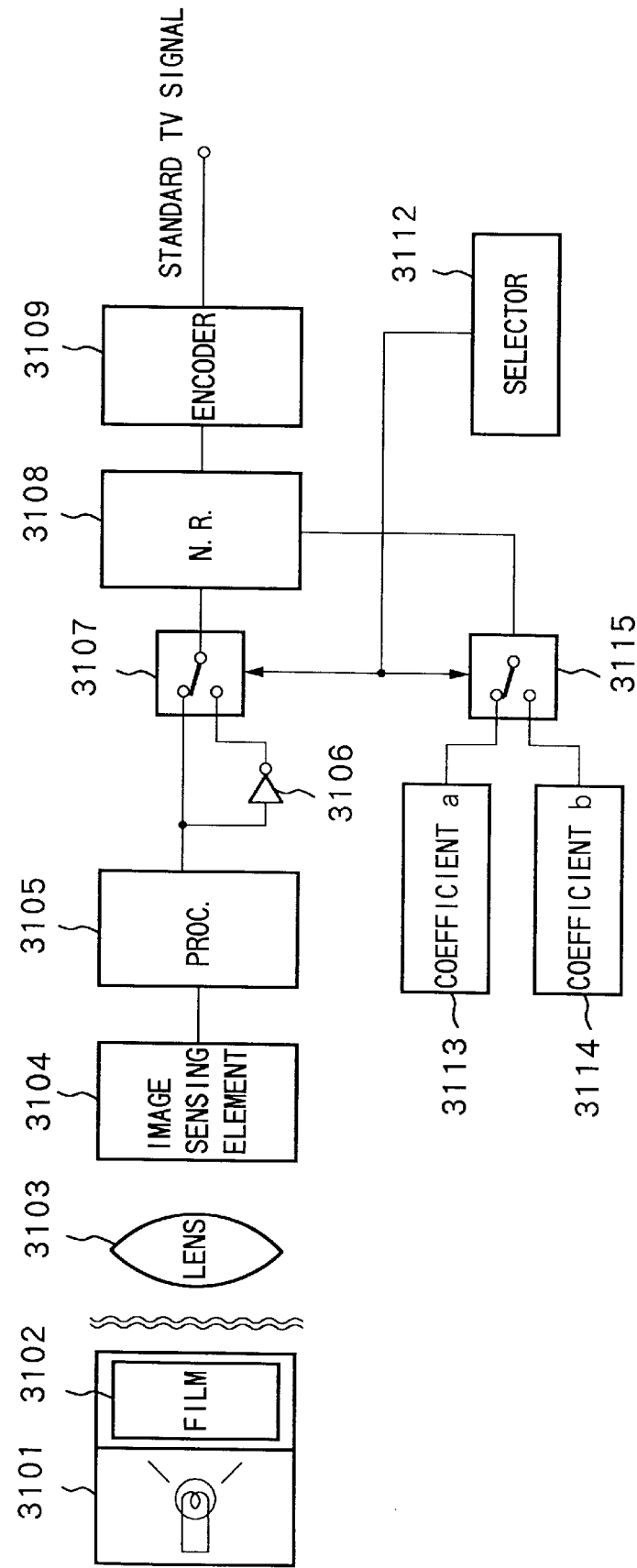
FIG. 46 is a block diagram showing the arrangement according to the 19th embodiment of the present invention.

FIG. 46 is a block diagram showing the arrangement according to the 19th embodiment of the present invention, and the same reference numerals in FIG. 46 denote the same parts as in FIG. 44.

In FIG. 46, reference numeral 3112 denotes a selector for selecting whether or not negative/positive reversing is to be done. The switch 3107 selects the outputs from the reversing circuit 3106 in accordance with the output from the selector 3112. Reference numeral 3113 denotes a coefficient output unit for outputting a noise reduction coefficient a; 3114, a coefficient output unit for outputting a noise reduction coefficient b; and 3115, a switch for switching the noise reduction coefficients in synchronism with reversing of the reversing circuit 3106 depending on the output from the selector 3112.

The selector 3112 can select one of a non-reversing mode and reversing mode. The switch 3115 outputs the coefficient a from the coefficient output unit 3113 in the non-reversing mode, or outputs the coefficient b from the coefficient output unit 3114 in the reversing mode.

In the above-mentioned arrangement, when a normal subject image is to be sensed, the subject image is formed on the image sensing element 3104 via the lens 3103. The optical signal that enters the image sensing element 3104 is photoelectrically converted by the element 3104, and the signal processing circuit 3105 generates luminance and chrominance signals based on the signals from the element 3104. At this time, by selecting the non-reversing mode by the selector 3112, a video signal is directly input to the noise reduction circuit 3108.

The arrangement of the noise reduction circuit 3108 is the same as that shown in FIG. 45, and its noise reduction coefficient k is supplied from the coefficient output unit 3113 as the coefficient a. A video signal from which noise components are reduced by the noise reduction circuit 3108 is converted into a standard television signal by the encoder circuit 3109, and the converted signal is output.

When the film 3102 is to be sensed by attaching the film adapter 3101, it is illuminated by a light source. Light transmitted through the film 3102 is imaged on the image sensing element 3104 by the lens 3103. The optical signal that enters the image sensing element 3104 is photoelectrically converted by the element 3104, and the signal processing circuit 3105 generates luminance and chrominance signals based on the signals from the element 3104.

When the film 3102 to be sensed is a negative film, the selector 3112 selects the reversing mode, and the switch 3107 selects the output from the reversing circuit 3106. As a result, signals converted into those for a positive image by the reversing circuit 3106 are input to the noise reduction circuit 3108. At this time, the noise reduction coefficient k is supplied from the coefficient output unit 3114 as the coefficient b. A video signal from which noise components are reduced by the noise reduction circuit 3108 is converted into a standard television signal by the encoder circuit 3109, and the converted signal is output.

The noise reduction coefficient k output from the coefficient output unit 3113 in the non-reversing mode is set at 0.8, and the video signal output $(S_{out})_n$ of the n-th frame at that time is given by equation (2) above as in the 18th embodiment shown in FIG. 44. That is, noise components produced between the (n−1)-th and n-th frames are improved by −2 dB. The coefficient at that time is set at a well-balanced numerical value in consideration of the noise reduction effect and a decrease in resolution for a subject that moves fast.

On the other hand, in the reversing mode, the noise reduction coefficient output from the coefficient output unit 3114 is set at 0.5, and the video signal output $(S_{out})_n$ of the n-th frame at that time is given by equation (3) above as in the 18th embodiment. In other words, noise components produced between the (n−1)-th and n-th frames are improved by −6 dB. The coefficient at that time is set at a numerical value suitable for sensing a subject that stands still while placing an importance on the noise reduction effect rather than a decrease in resolution for a subject that moves fast.

As described above, since the noise reduction amount is changed between the non-reversing mode and reversing mode, an optimal noise reduction effect can be obtained in correspondence with a normal subject image and a negative film image.

Note that the above-mentioned numerical values are merely examples, and different correction amounts may be set when different devices of the image sensing element 3104, signal processing circuit, and the like are used or when a different noise reduction scheme is used. The noise correction amount is switched between two different values. However, the number of values to be selected may be increased. The frame correlation method has been described as the noise reduction method but other methods may be used. The selector 3112 may be switched manually or a negative film may be automatically detected.

What is claimed is:

1. An image sensing apparatus which has a moving image sensing mode and still image sensing mode, and can sense a close subject image, comprising:

image sensing means for outputting an image signal by photoelectrically converting an optical image of a subject;

detection means for detecting based on a predetermined signal component in the image signal if the subject is close to said apparatus; and control means for switching between the moving image sensing mode and the still image sensing mode in accordance with the detection result by said detector.

2. The apparatus according to claim 1, wherein said detection means detects based on chrominance signal components in the image signal if the subject is a negative film.

3. The apparatus according to claim 2, wherein further comprising:

first luminance component generation means for generating a luminance signal component on the basis of the image signal;

first chrominance component generation means for generating chrominance components on the basis of the image signal;

second luminance component generation means for generating a luminance component by reversing light and dark portions in correspondence with a luminance level of the image signal; and second chrominance component generation means for generating chrominance components in accordance with the chrominance components of the image signal using a predetermined conversion scheme, and wherein when said detection means detects that the subject is not a negative film, said control means controls to generate a video signal using output signals from said first luminance component generation means and first chrominance component generation means, and when said detection means detects that the subject is a negative film, said control means controls to generate a video signal using output signals from said second luminance component generation means and second chrominance component generation means.

4. The apparatus according to claim 1, wherein a film adapter for holding a subject such as a film or the like can be detachably attached to said image sensing apparatus, and when said film adapter is attached, said detector determines that the film held by said film adapter is close to said apparatus.

5. An image sensing apparatus comprising:
image sensing means for outputting a first image signal by photoelectrically converting an optical image formed via an image sensing optical system;
signal processing means for generating a second image signal by performing predetermined processing of the first image signal; and
film image sensing means for sensing a film image by mounting a film image sensing adapter,
wherein said signal processing means comprises:
first luminance component generation means for generating a luminance component of the second image signal in accordance with a luminance level of the first image signal;
first chrominance component generation means for generating chrominance components of the second image signal in accordance with chrominance components of the first image signal;
second luminance component generation means for generating a luminance component of the second image signal by reversing light and dark portions in accordance with a luminance level of the first image signal;
second chrominance component generation means for generating chrominance components of the second image signal in accordance with chrominance components of the first image signal using a predetermined conversion scheme; and
control means which can select one of a moving image sensing mode for sensing a moving image, and a film image sensing mode for sensing a photographic film image using said film image sensing means, and selects the film image sensing mode when the second image signal is generated using output signals from said second luminance component generation means and second chrominance component generation means.

6. The apparatus according to claim 5, further comprising:
color identification means for identifying a color of the subject on the basis of information associated with a color of the first image signal, and
wherein said control means selects on the basis of an identification result of said color identification means whether the second image signal is generated by said first luminance component generation means and first chrominance component generation means, or by said second luminance component generation means and second chrominance component generation means, and selects the film image sensing mode upon selecting second image signal generation using said second luminance component generation means and second chrominance component generation means.

7. The apparatus according to claim 5, wherein said second luminance component generation means and second chrominance component generation means output a negative-to-positive reversed second image signal.

8. An image sensing apparatus comprising:
an image sensing optical system which changes a position of a lens in correspondence with a subject distance;
a position detector adapted to detect the position of the lens;
an image sensor adapted to output a first image signal by photoelectrically converting an optical image of a subject, including an image of a film mounted on a film image adapter, imaged via said image sensing optical system; and
a controller which can select one of a plurality of image sensing modes said plurality including a moving image sensing mode for sensing a moving image and a film image sensing mode for sensing a film, in accordance with the detection result by said detector.

9. The apparatus according to claim 8, wherein said controller sets the film image sensing mode when the lens is located within a predetermined range on the closest distance side.

10. The apparatus according to claim 9, wherein said image sensing optical system comprises a magnification lens, and said controller sets the film image sensing mode when said magnification lens is located at a predetermined position on the wide-angle side, and the lens is located within a predetermined range on the closest distance side.

11. The apparatus according to claim 8, wherein the film image adapter can be detachably attached to a predetermined position of a front portion of said image sensing optical system, and the film image sensing mode is enabled by attaching said film image adapter.

12. An image sensing apparatus comprising:
an image sensing optical system which changes a position of a lens in correspondence with a subject distance;
a position detector adapted to detect the position of the lens;
an image sensor adapted to output an image signal by photoelectrically converting an optical image of a subject, including an image of a film mounted on a film image adapter, imaged via said image sensing optical system; and
a controller which can select one of a plurality of image sensing modes said plurality including a moving image sensing mode for sensing a moving image and a still image sensing mode for sensing a still image, in accordance with the detection result by said detector.

13. The apparatus according to claim 12, wherein said controller sets the still image sensing mode when the lens is located with a predetermined range on the closest distance side.

14. The apparatus according to claim 13, wherein said image sensing optical system comprises a magnification lens, and said controller sets the still image sensing mode when said magnification lens is located at a predetermined position on the wide-angle side, and the lens is located within the predetermined range on the closest distance side.

15. The apparatus according to claim 12, wherein the film image adapter can be detachably attached to a predetermined position of a front portion of said image sensing is allowed in the still image sensing mode by attaching-said film image adapter.

16. An image sensing apparatus comprising:
an image sensing apparatus comprising an image sensing optical system which changes a position of a lens in correspondence with a subject distance;
position detection means for detecting the position of the lens;
image sensing means for outputting an image signal by photoelectrically converting an optical image of a subject imaged via said image sensing optical system;

signal processing means for generating a video signal on the basis of the image signal, said signal processing means comprising first luminance component generation means for generating a luminance component of the video signal in accordance with a luminance component of the first image signal, first chrominance component generation means for generating chrominance components of the video signal in accordance with chrominance components of the first image signal, second luminance component generation means for generating a luminance component of the video signal by reversing light and dark portions in accordance with a luminance level of the first image signal, and second chrominance component generation means for generating chrominance components of the video signal in accordance with chrominance components of the first image signal using a predetermined conversion scheme; and control means which can select one of a moving image sensing mode for sensing an image of a normal subject and a film image sensing mode which allows to sense a film image, and switches an image sensing mode to the film image sensing mode when the lens is located at a predetermined position, and the video signal is generated using output signals from said second luminance component generation means and second chrominance component generation means.

17. The apparatus according to claim 16, wherein the video signal generated using the output signals from said second luminance component generation means and second chrominance component generation means is a negative-to-positive reversed video signal, and the film image sensing mode is set to convert a negative film image into a positive image, and to output the positive image.

18. The apparatus according to claim 16, wherein a film adapter for holding a subject such as a film can be detachably attached to a predetermined position of a front portion of said image sensing optical system, and the film image sensing mode is enabled by attaching said film adapter.

19. The apparatus according to claim 16, wherein said image sensing optical system comprises a magnification lens, and said control means sets the film image sensing mode when said magnification lens is located at a predetermined position on the wide-angle side, and the lens is located within a predetermined range on the closest distance side.

20. An image sensing apparatus comprising:

image sensing means for outputting a sensed image signal by photoelectrically converting a subject image formed via an image sensing optical system; and signal processing means for generating a video signal by performing predetermined processing of the sensed image signal, wherein said signal processing means comprises:

first luminance component generation means for generating a luminance component of the video signal in accordance with a luminance level of the sensed image signal;

first chrominance component generation means for generating chrominance components of the video signal in accordance with chrominance components of the sensed image signal;

second luminance component generation means for generating a luminance component of the video signal by reversing light and dark portions in accordance with the luminance level of the sensed image signal;

second chrominance component generation means for generating chrominance components of the video signal in accordance with the chrominance components of the sensed image signal using a predetermined conversion scheme;

color identification means for identifying a color of the subject on the basis of information associated with a color in the sensed image signal; and selection means for selecting said first luminance component generation means and chrominance component generation means, or said second luminance component generation means and chrominance component generation means, that are to be used upon generating and outputting a video signal, in accordance with an identification result of said color identification means.

21. The apparatus according to claim 20, further comprising:

white balance adjustment means for generating color difference signals based on outputs from said first luminance component generation means and said first chrominance component generation means, and adjusting white balance by controlling gains of the color difference signals.

22. The apparatus according to claim 20, wherein said second luminance component generation means and said second chrominance component generation means output a negative-to-positive reversed video signal.

23. The apparatus according to claim 20, further comprising:

an image sensing optical system; and a film image sensing adapter for holding a film at a predetermined position on a front surface of said image sensing optical system.

24. The apparatus according to claim 20, wherein said color identification means determines a negative film on the basis of color difference signals generated based on the sensed image signal.

25. The apparatus according to claim 20, wherein said color identification means determines a negative film on the basis of R, G, and B signals generated based on the sensed image signal.

26. The apparatus according to claim 20, wherein said color identification means determines a negative film on the basis of outputs from said first luminance component generation means and first chrominance component generation means.

27. The apparatus according to claim 20, wherein said color identification means determines a negative film on the basis of outputs from said second luminance component generation means and second chrominance component generation means.

28. An image sensing apparatus comprising:

image sensing means for outputting a sensed image signal by photoelectrically converting a subject image formed via an image sensing optical system; and signal processing means for generating a video signal by performing predetermined processing of the sensed image signal, wherein said signal processing means comprises:

first luminance component generation means for generating a luminance component of the video signal in accordance with a luminance level of the sensed image signal;

first chrominance component generation means for generating chrominance components of the video signal in accordance with chrominance components of the sensed image signal;

second luminance component generation means for generating a luminance component of the video signal by reversing light and dark portions in accordance with the luminance level of the sensed image signal;

second chrominance component generation means for generating chrominance components of the video signal in accordance with the chrominance components of the sensed image signal using a predetermined conversion scheme;

color identification means for identifying a color of the subject on the basis of information associated with a color in the sensed image signal;

first selection means for selecting said first luminance component generation means and chrominance component generation means, or said second luminance component generation means and chrominance component generation means, that are to be used upon generating and outputting a video signal, in accordance with an identification result of said color identification means; and second selection means for inhibiting an operation of said first selection means.

29. The apparatus according to claim 28, further comprising:

third selection means for, when said second selection means inhibits operation of said first selection means, selecting said first luminance component generation means and chrominance component generation means, or said second luminance component generation means and chrominance component generation means, that are to be used upon generating and outputting a video signal, independently of said first selection means.

30. An image sensing apparatus which has a normal image sensing mode and a film image sensing mode for sensing an image on a film, comprising:

an image sensor;

an exposure controller adapted to make exposure control by extracting a predetermined signal component from a sensed image signal output from said image sensor; and a controller adapted to change response characteristics of said exposure controller in correspondence with the normal image sensing mode and the film image sensing mode.

31. The apparatus according to claim 30, wherein the predetermined signal component is a luminance signal level, said exposure control means comprises an integrator for integrating the luminance signal level during a predetermined period, and said control means sets a large integral time constant of said integrator when the film image sensing mode is selected.

32. An image sensing apparatus which has a moving image sensing mode and still image sensing mode, and can sense a close subject image, comprising:

an image sensor adapted to output an image signal by photoelectrically converting an optical image of a subject;

a detector adapted to detect based on a predetermined signal component in the image signal if the subject is close to said apparatus; and a controller adapted to switch between the moving image sensing mode and the still image sensing mode in accordance with the detection result by said detector.

33. The apparatus according to claim 32, wherein said detector detects based on chrominance signal components in the image signal if the subject is a negative film.

34. The apparatus according to claim 33, wherein further comprising:

a first luminance component generator adapted to generate a luminance signal component on the basis of the image signal;

a first chrominance component generator adapted to generate chrominance components on the basis of the image signal;

a second luminance component generator adapted to generate a luminance component by reversing light and dark portions in correspondence with a luminance level of the image signal; and a second chrominance component generator adapted to generate chrominance components in accordance with the chrominance components of the image signal using a predetermined conversion scheme, and wherein when said detector detects that the subject is not a negative film, said control means controls to generate a video signal using output signals from said first luminance component generator and first chrominance component generator, and when said detector detects that the subject is a negative film, said controller controls to generate a video signal using output signals from said second luminance component generator and second chrominance component generator.

35. The apparatus according to claim 32, wherein a film adapter for holding a subject such as a film or the like can be detachably attached to said image sensing apparatus, and when said film adapter is attached, said detector determines that the film held by said film adapter is close to said apparatus.

36. An image sensing apparatus comprising:

an image sensor adapted to output a first image signal by photoelectrically converting an optical image formed via an image sensing optical system;

a signal processor adapted to generate a second image signal by performing predetermined processing of the first image signal; and a film image sensor adapted to sense a film image by mounting a film image sensing adapter, wherein said signal processor comprises:

a first luminance component generator adapted to generate a luminance component of the second image signal in accordance with a luminance level of the first image signal;

a first chrominance component generator adapted to generate chrominance components of the second image signal in accordance with chrominance components of the first image signal;

a second luminance component generator adapted to generate a luminance component of the second image signal by reversing light and dark portions in accordance with a luminance level of the first image signal;

a second chrominance component generator adapted to generate chrominance components of the second image signal in accordance with chrominance components of the first image signal using a predetermined conversion scheme; and a controller which can select one of a moving image sensing-mode for sensing a moving image, and a film image sensing mode for sensing a photographic film image using said film image sensor, and selects the film image sensing mode when the second image signal is generated using output signals from said second luminance component generator and second chrominance component generator.

37. The apparatus according to claim 36, further comprising:
   a color identification unit adapted to identify a color of the subject on the basis of information associated with a color of the first image signal, and
   wherein said controller selects on the basis of an identification result of said color identification unit whether the second image signal is generated by said first luminance component generator and first chrominance component generator, or by said second luminance component generator and second chrominance component generator, and selects the film image sensing mode upon selecting second image signal generation using said second luminance component generator and second chrominance component generator.

38. The apparatus according to claim 36, wherein said second luminance component generator and second chrominance component generator output a negative-to-positive reversed second image signal.

39. An image sensing apparatus comprising:
   an image sensing apparatus comprising an image sensing optical system which changes a position of a lens in correspondence with a subject distance;
   apposition detector adapted to detect the position of the lens;
   an image sensor adapted to output an image signal by photoelectrically converting an optical image of a subject imaged via said image sensing optical system;
   a signal processor adapted to generate a video signal on the basis of the image signal, said signal processor comprising a first luminance component generator adapted to generate a luminance component of the video signal in accordance with a luminance component of the first image signal, a first chrominance component generator adapted to generate chrominance components of the video signal in accordance with chrominance components of the first image signal, a second luminance component generator adapted to generate a luminance component of the video signal by reversing light and dark portions in accordance with a luminance level of the first image signal, and a second chrominance component generator adapted to generate chrominance components of the video signal in accordance with chrominance components of the first image signal using a predetermined conversion scheme; and
   a controller which can select one of a moving image sensing mode for sensing an image of a normal subject and a film image sensing mode which allows sensing of a film image, and switches an image sensing mode to the film image sensing mode when the lens is located at a predetermined position, and the video signal is generated using output signals from said second luminance component generator and second chrominance component generator.

40. The apparatus according to claim 39, wherein the video signal generated using the output signals from said second luminance component generator and second chrominance component generator is a negative-to-positive reversed video signal, and the film image sensing mode is set to convert a negative film image into a positive image, and to output the positive image.

41. The apparatus according to claim 39, wherein a film adapter for holding a subject such as a film can be detachably attached to a predetermined position of a front portion of said image sensing optical system, and the film image sensing mode is enabled by attaching said film adapter.

42. The apparatus according to claim 39, wherein said image sensing optical system comprises a magnification lens, and said controller sets the film image sensing mode when said magnification lens is located at a predetermined position on the wide-angle side, and the lens is located within a predetermined range on the closest distance side.

43. An image sensing apparatus comprising:
   an image sensor adapted to output a sensed image signal by photoelectrically converting a subject image formed via an image sensing optical system; and
   a signal processor adapted to generate a video signal by performing predetermined processing of the sensed image signal,
   wherein said signal processor comprises:
   a first luminance component generator adapted to generate a luminance component of the video signal in accordance with a luminance level of the sensed image signal;
   a first chrominance component generator adapted to generate chrominance components of the video signal in accordance with chrominance components of the sensed image signal;
   a second luminance component generator adapted to generate a luminance component of the video signal by reversing light and dark portions in accordance with the luminance level of the sensed image signal;
   a second chrominance component generator adapted to generate chrominance components of the video signal in accordance with the chrominance components of the sensed image signal using a predetermined conversion scheme;
   a color identification unit adapted to identify a color of the subject on the basis of information associated with a color in the sensed image signal; and
   a selector adapted to select said first luminance component generator and chrominance component generator, or said second luminance component generator and chrominance component generator, that are to be used upon generating and outputting a video signal, in accordance with an identification result of said color identification unit.

44. The apparatus according to claim 43, further comprising:
   a white balance adjuster adapted to generate color difference signals based on outputs from said first luminance component generator and said first chrominance component generator, and adjusting white balance by controlling gains of the color difference signals.

45. The apparatus according to claim 43, wherein said second luminance component generator and said second chrominance component generator output a negative-to-positive reversed video signal.

46. The apparatus according to claim 43, further comprising:
   an image sensing optical system; and
   a film image sensing adapter for holding a film at a predetermined position on a front surface of said image sensing optical system.

47. The apparatus according to claim 43, wherein said color identification unit determines a negative film on the basis of color difference signals generated based on the sensed image signal.

48. An image sensing apparatus comprising:

an image sensor adapted to output a sensed image signal by photoelectrically converting a subject image formed via an image sensing optical system; and a signal processor adapted to generate a video signal by performing predetermined processing of the sensed image signal, wherein said signal processor comprises:

a first luminance component generator adapted to generate a luminance component of the video signal in accordance with a luminance level of the sensed image signal;

a first chrominance component generator adapted to generate chrominance components of the video signal in accordance with chrominance components of the sensed image signal;

a second luminance component generator adapted to generate a luminance component of the video signal by reversing light and dark portions in accordance with the luminance level of the sensed image signal;

a second chrominance component generator adapted to generate chrominance components of the video signal in accordance with the chrominance components of the sensed image signal using a predetermined conversion scheme;

a color identification unit adapted to identify a color of the subject on the basis of information associated with a color in the sensed image signal;

a first selector adapted to select said first luminance component generator and chrominance component generator, or said second luminance component generator and chrominance component generator, that are to be used upon generating and outputting a video signal, in accordance with an identification result of said color identification unit; and a second selector adapted to inhibit an operation of said first selector.

49. The apparatus according to claim 48, further comprising:

a third selector adapted to, when said second selector inhibits operation of said first selector, select said first luminance component generator and chrominance component generator, or said second luminance component generator and chrominance component generator, that are to be used upon generating and outputting a video signal, independently of said first selector.

* * * * *

UNITED STATES PATENT AND TRADEMARK OFFICE
CERTIFICATE OF CORRECTION

PATENT NO. : 6,456,319 B1
DATED : September 24, 2002
INVENTOR(S) : Masahide Hirasawa et al.

It is certified that error appears in the above-identified patent and that said Letters Patent is hereby corrected as shown below:

Title page,
Item [54], Title should read -- IMAGE SENSING APPARATUS FOR SENSING MOVING AND STILL IMAGES --

Column 53,
Line 24, please delete "apposition" and insert therefor -- a position --

Signed and Sealed this

First Day of April, 2003

JAMES E. ROGAN
*Director of the United States Patent and Trademark Office*